Figure 1:
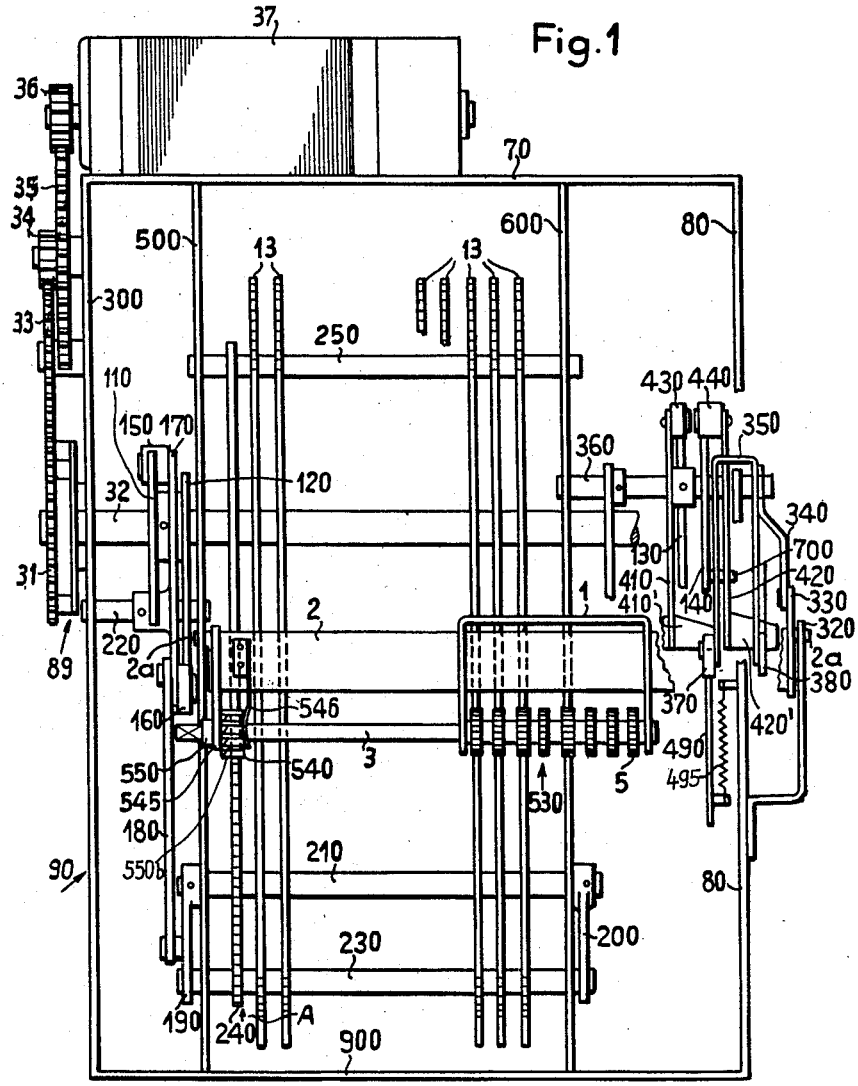

July 30, 1963 W. HEINZE 3,099,391
TEN KEY COMPUTING MACHINE
Filed Sept. 28, 1960 28 Sheets-Sheet 1

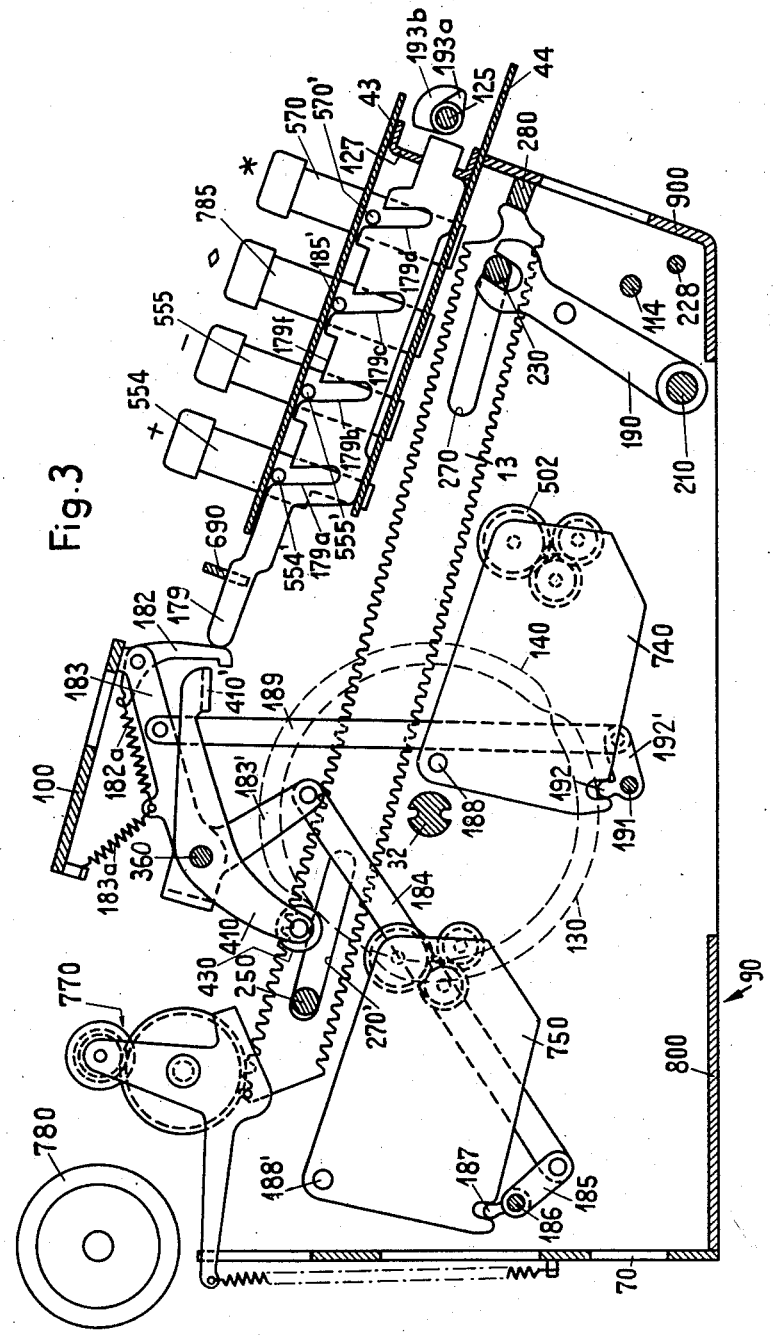

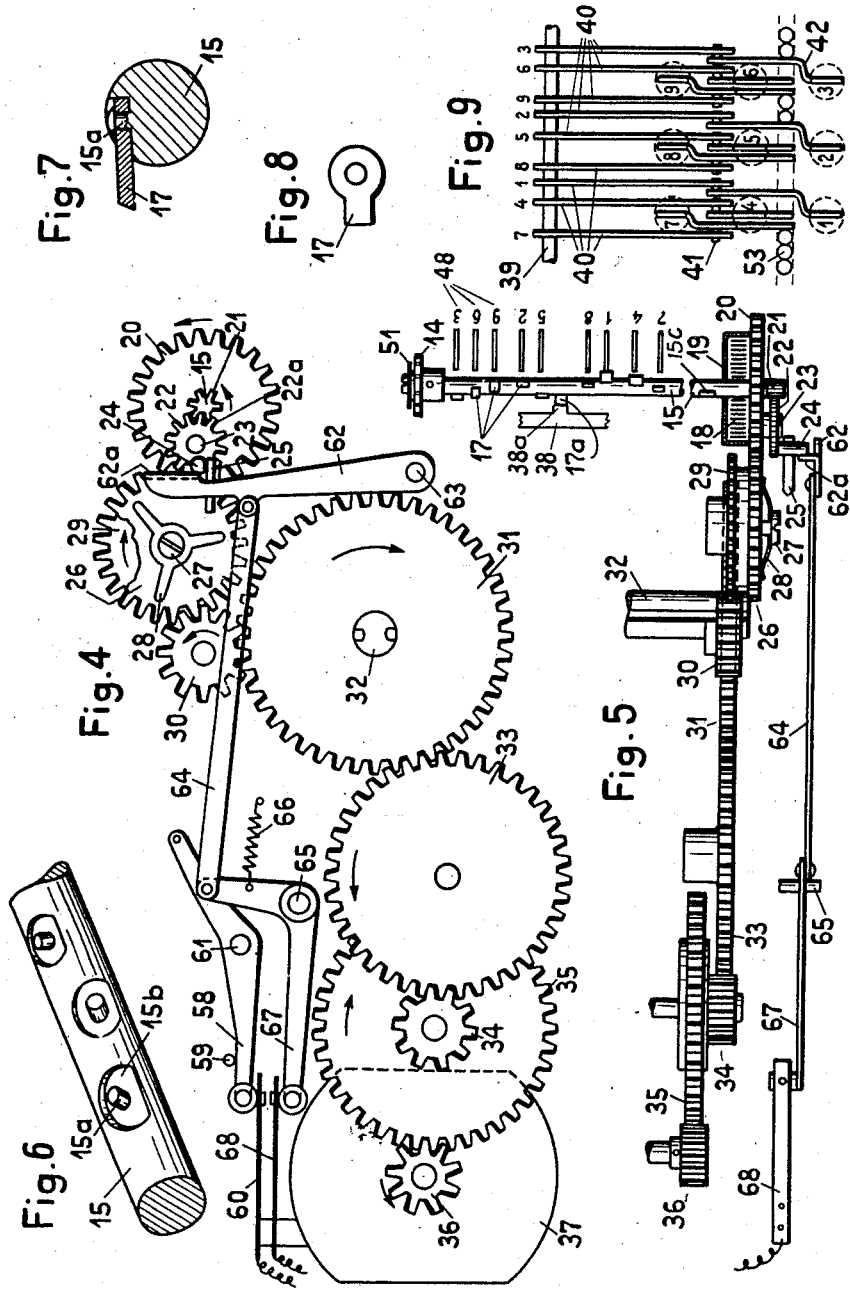

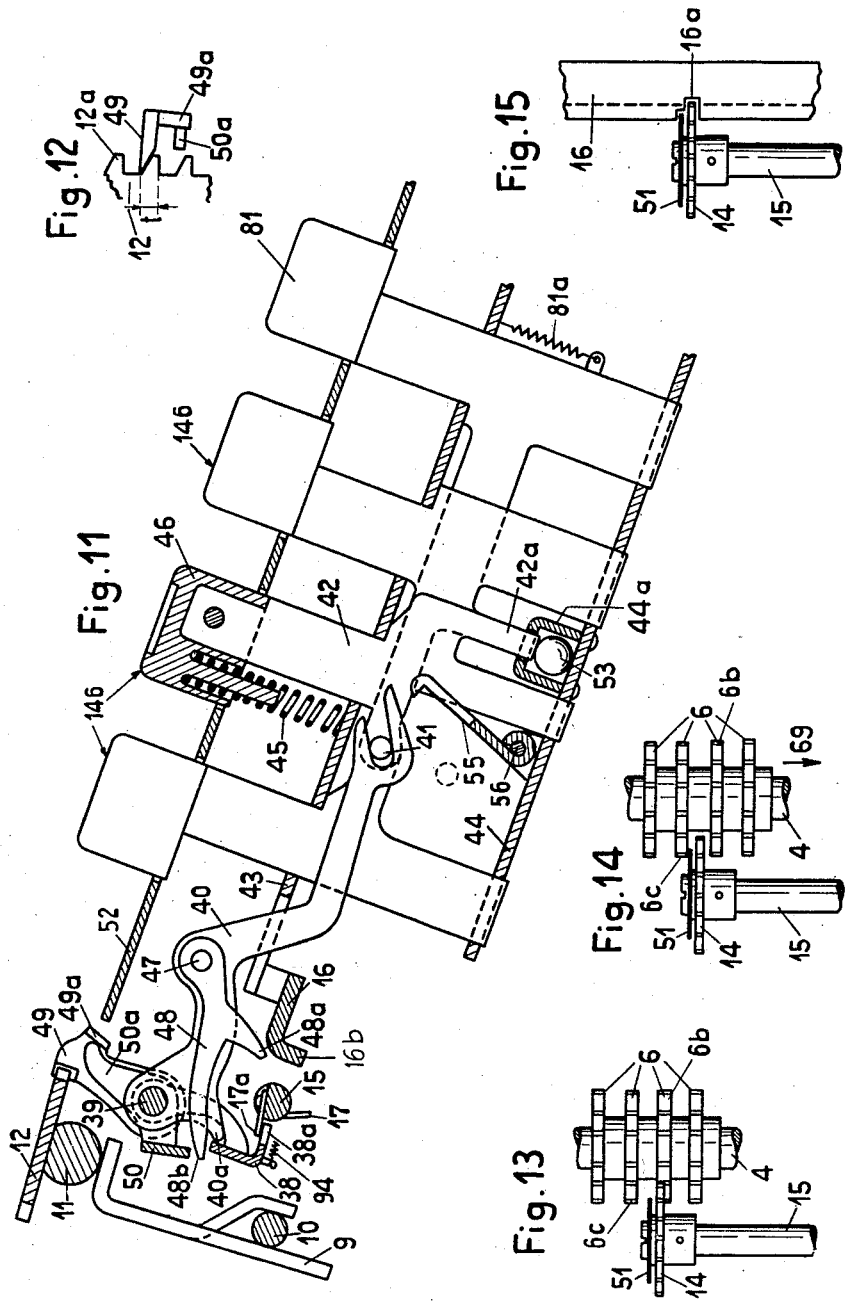

July 30, 1963  W. HEINZE  3,099,391
TEN KEY COMPUTING MACHINE
Filed Sept. 28, 1960  28 Sheets-Sheet 6
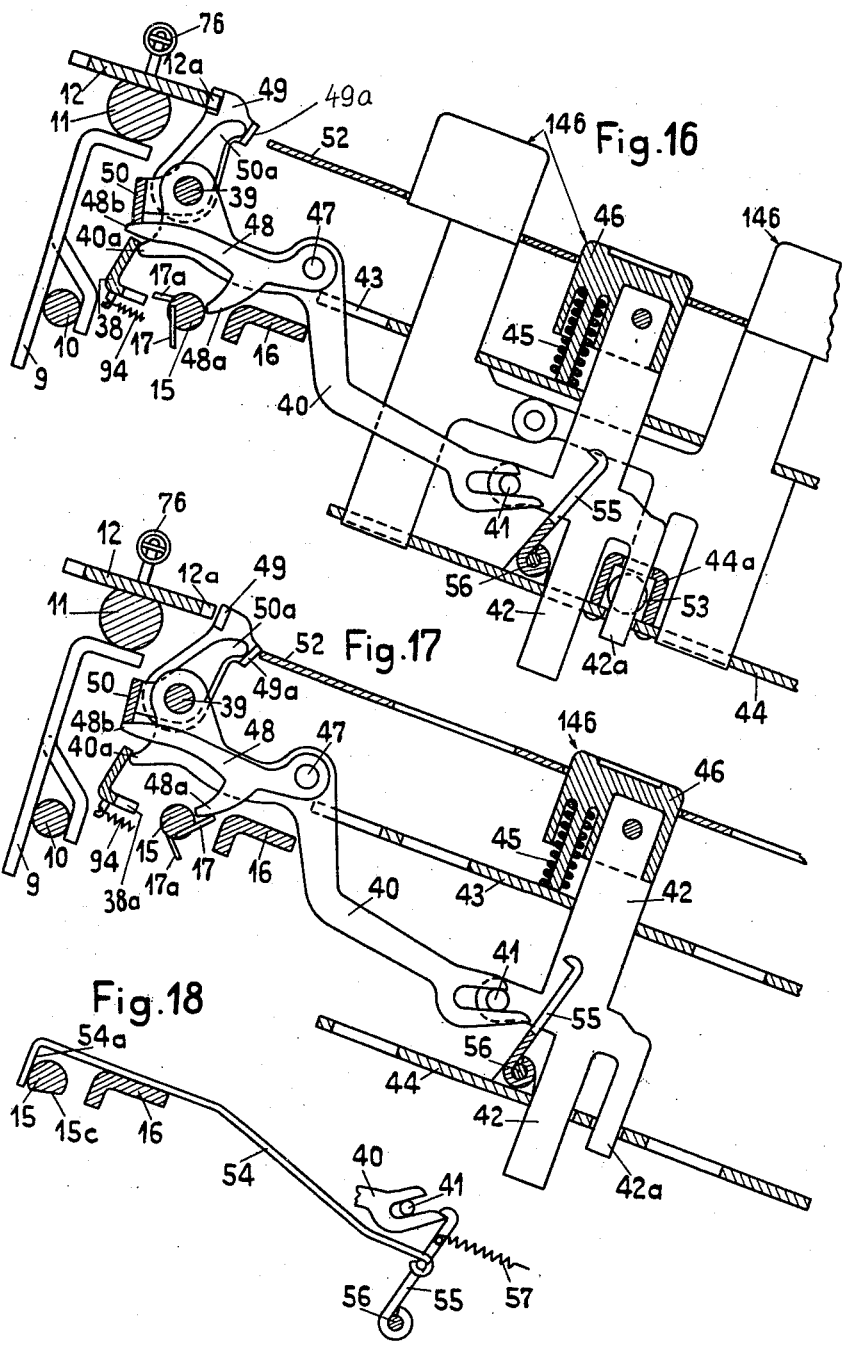

July 30, 1963 W. HEINZE 3,099,391
TEN KEY COMPUTING MACHINE
Filed Sept. 28, 1960 28 Sheets-Sheet 7

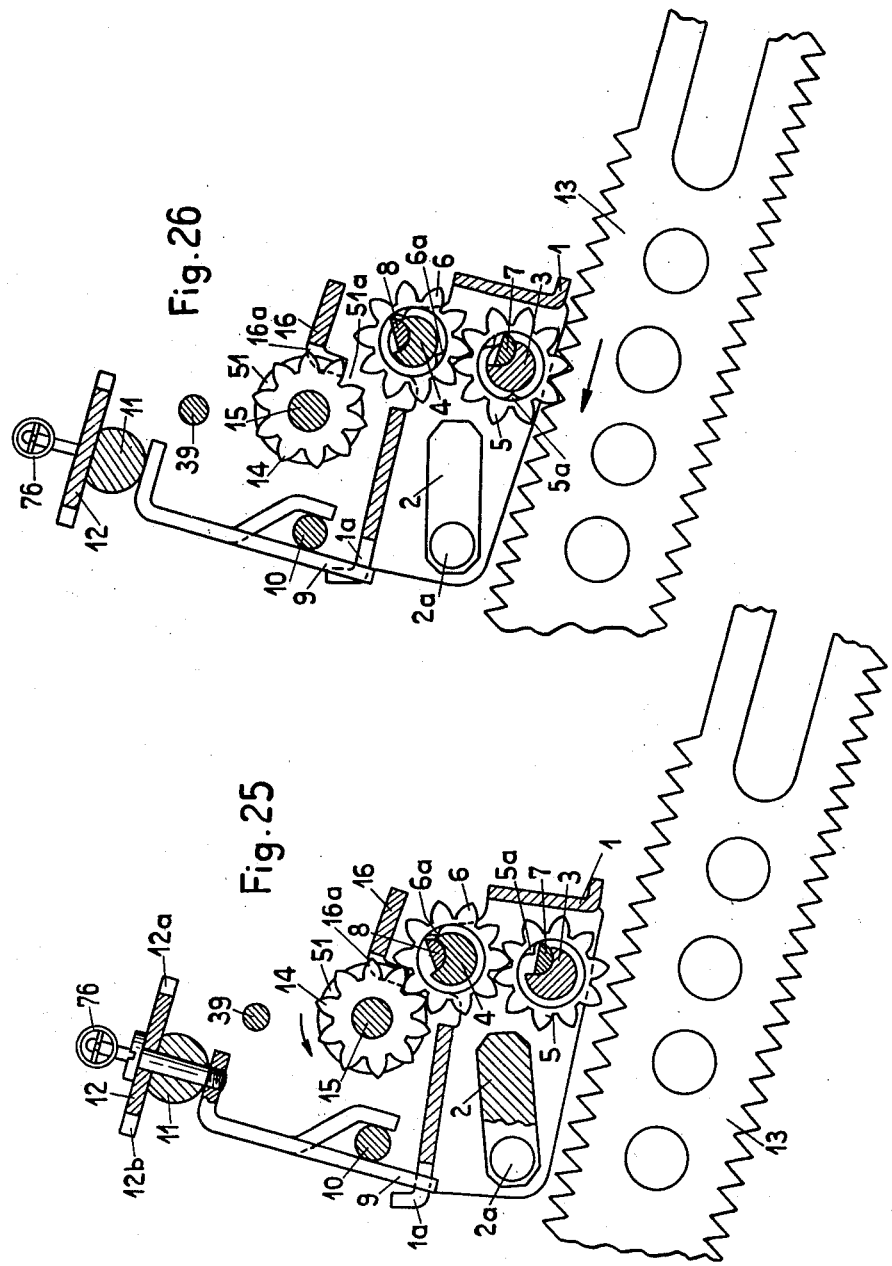

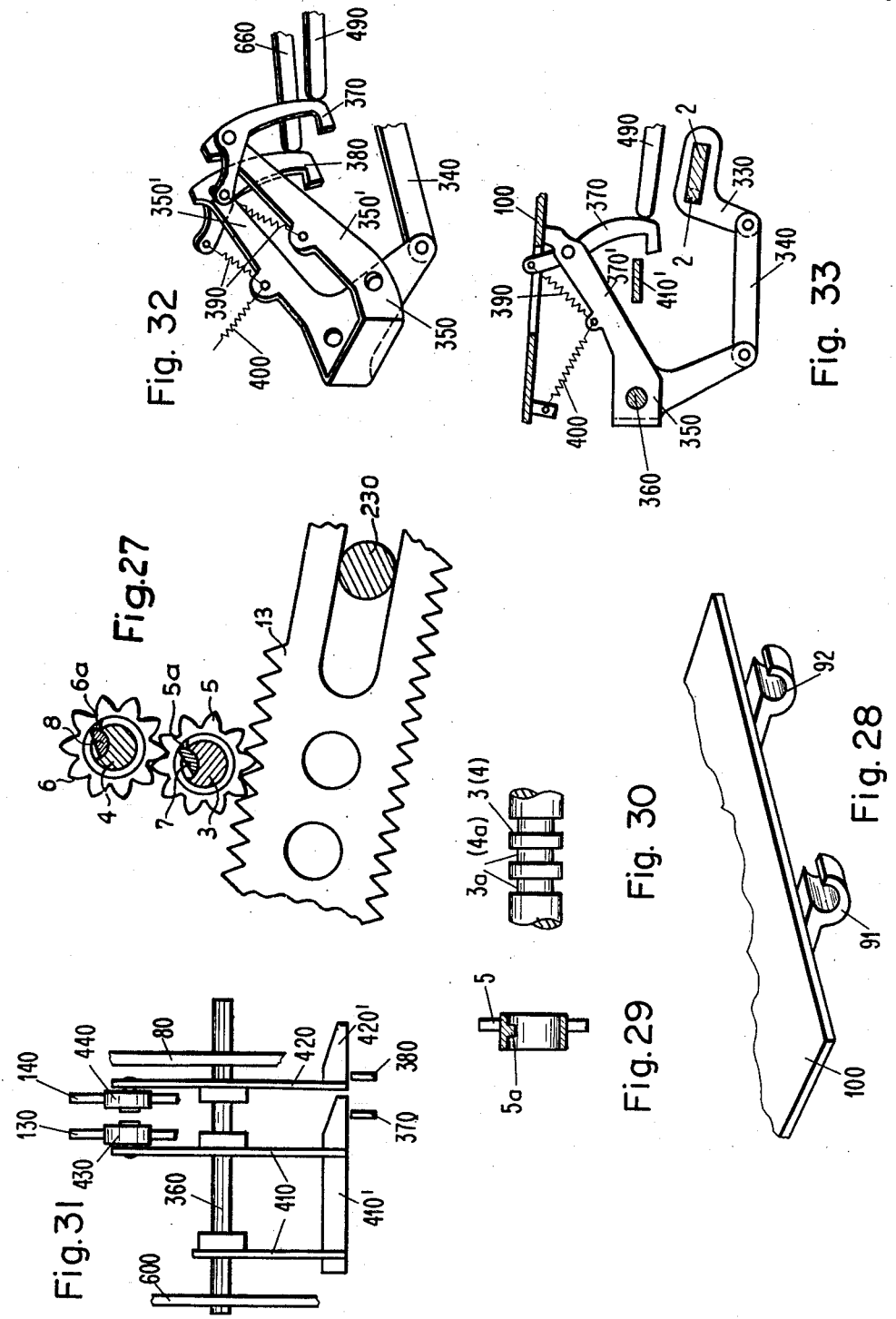

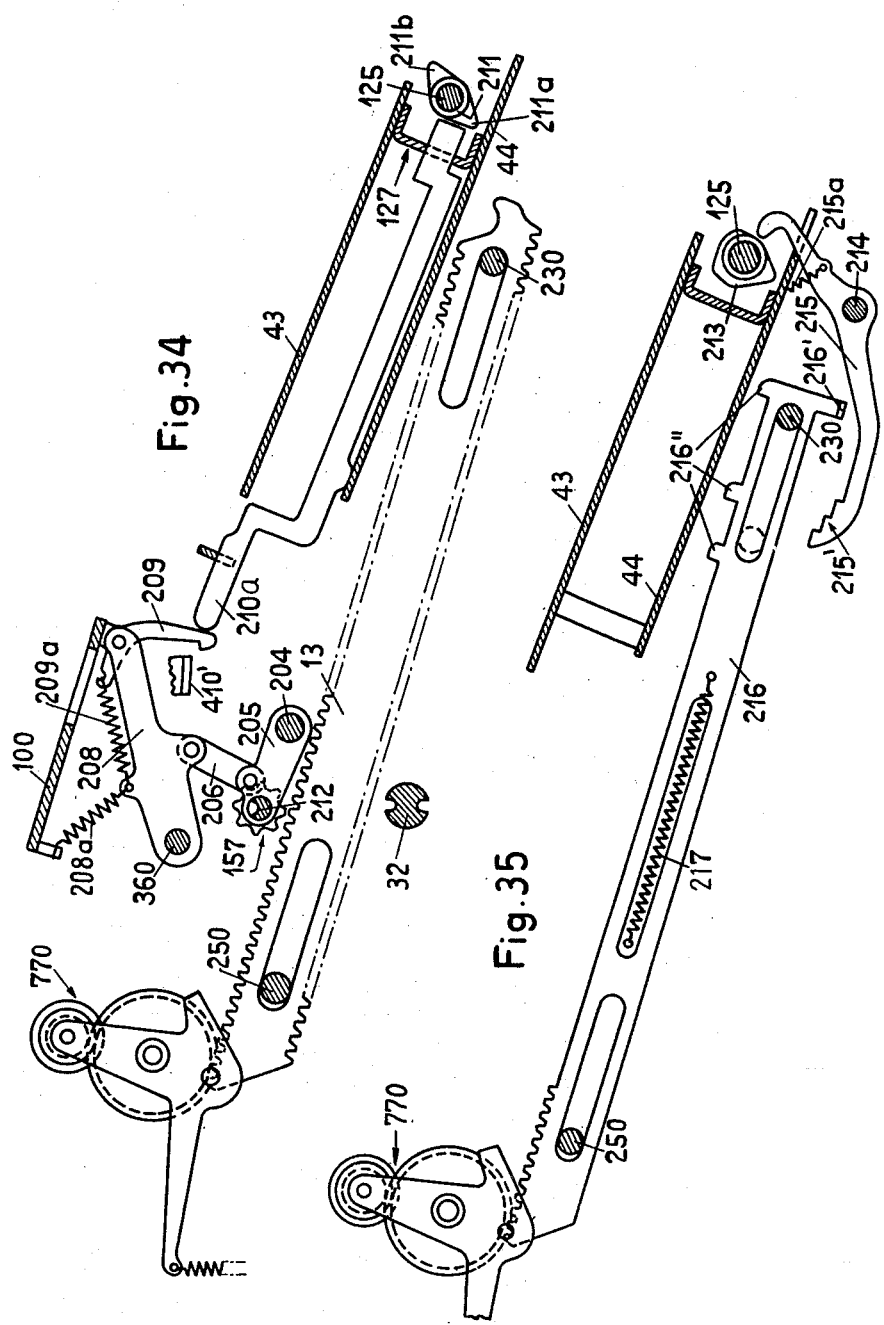

July 30, 1963
W. HEINZE
3,099,391
TEN KEY COMPUTING MACHINE
Filed Sept. 28, 1960
28 Sheets-Sheet 12
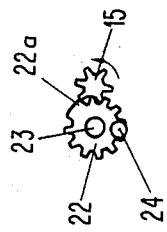
Fig. 37
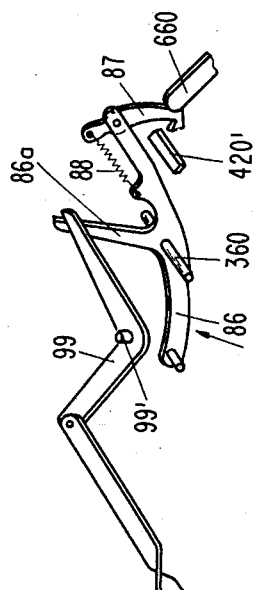
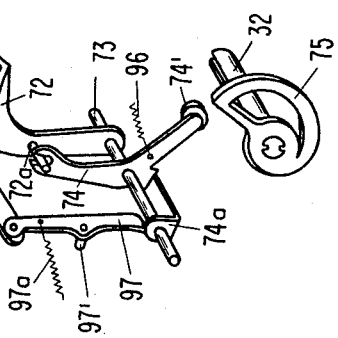
Fig. 38
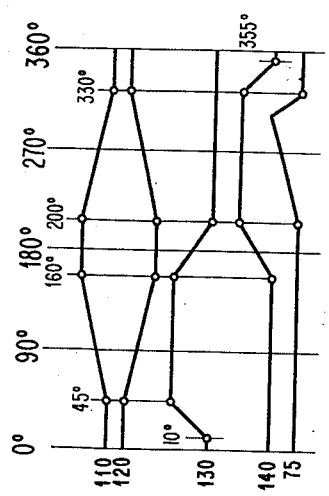
Fig. 36

July 30, 1963 W. HEINZE 3,099,391
TEN KEY COMPUTING MACHINE
Filed Sept. 28, 1960 28 Sheets-Sheet 13

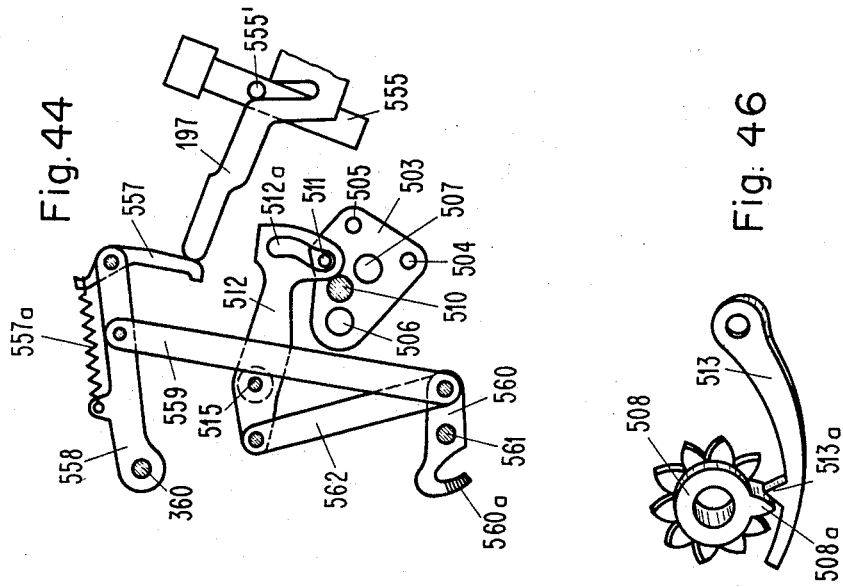
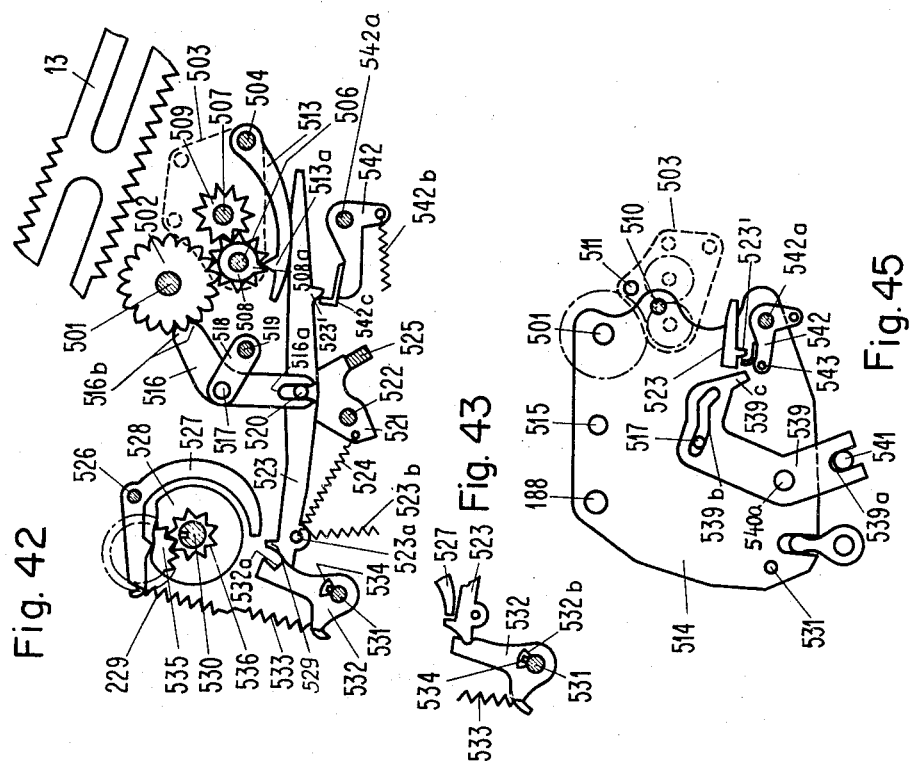

July 30, 1963 W. HEINZE 3,099,391
TEN KEY COMPUTING MACHINE
Filed Sept. 28, 1960 28 Sheets-Sheet 15

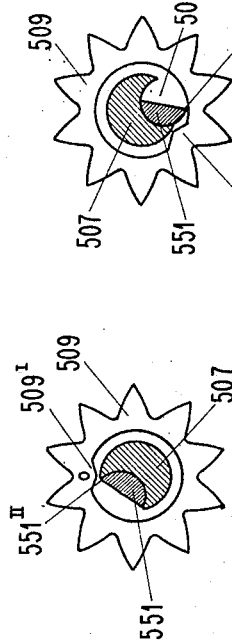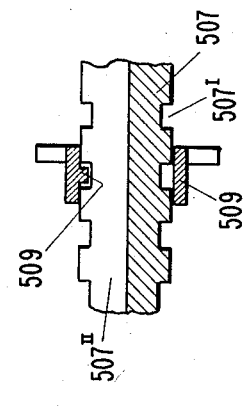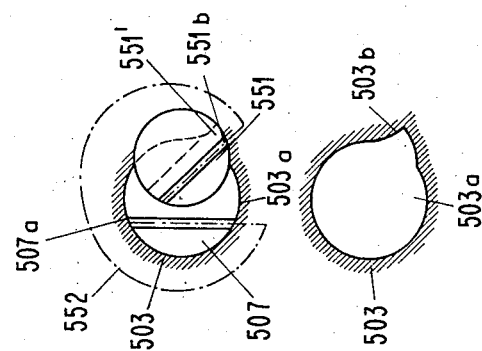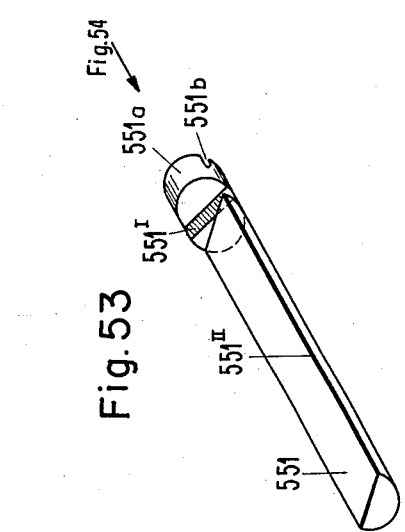

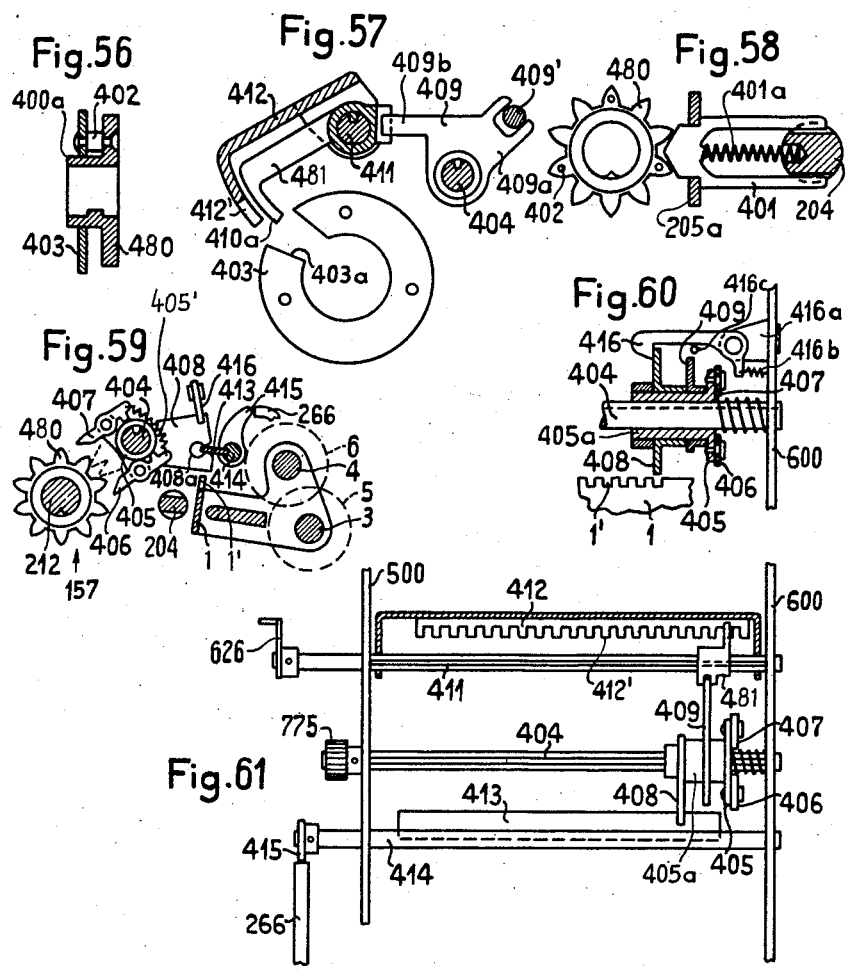

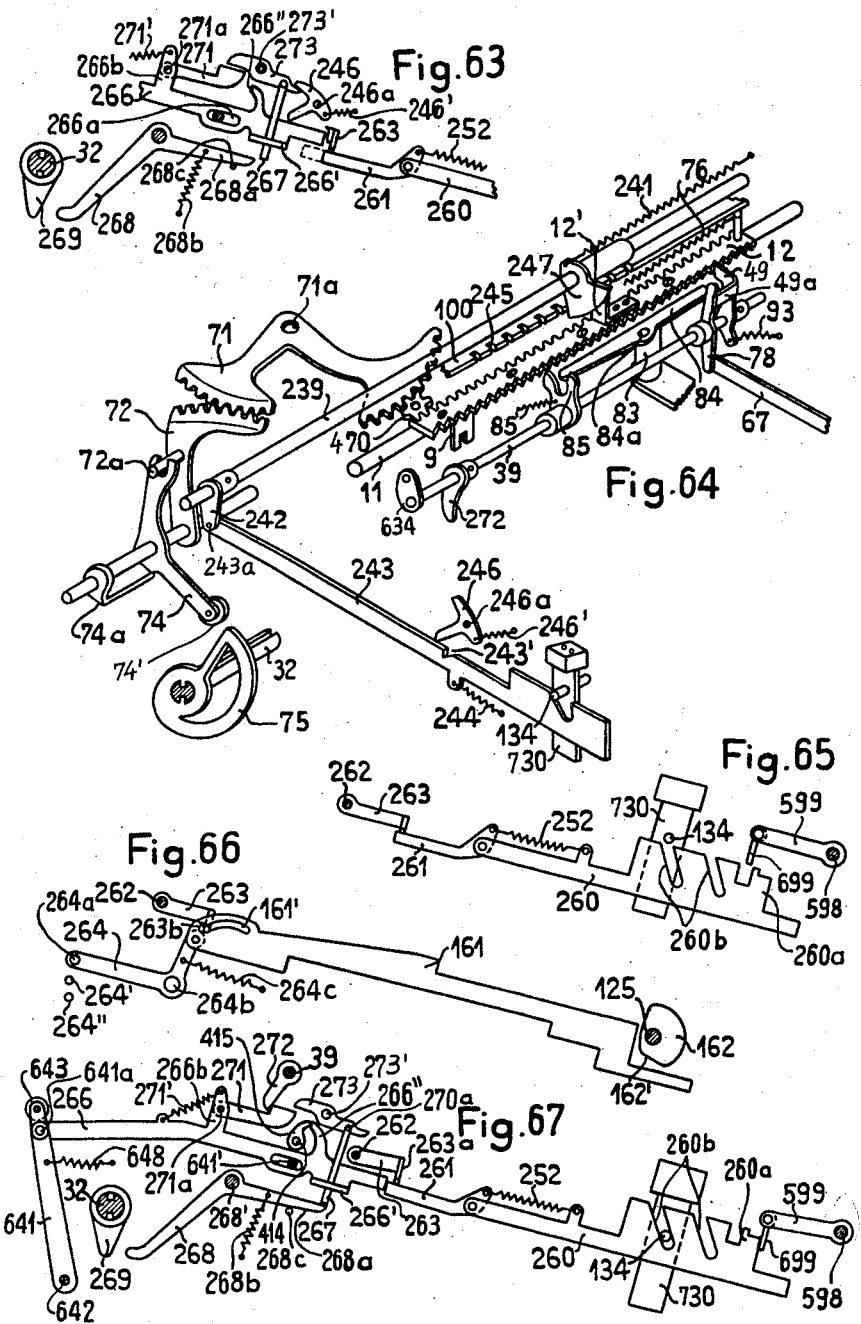

July 30, 1963 W. HEINZE 3,099,391
TEN KEY COMPUTING MACHINE
Filed Sept. 28, 1960 28 Sheets-Sheet 20

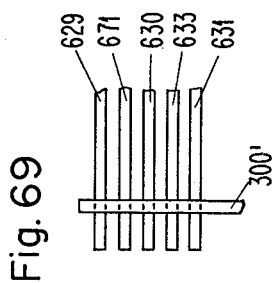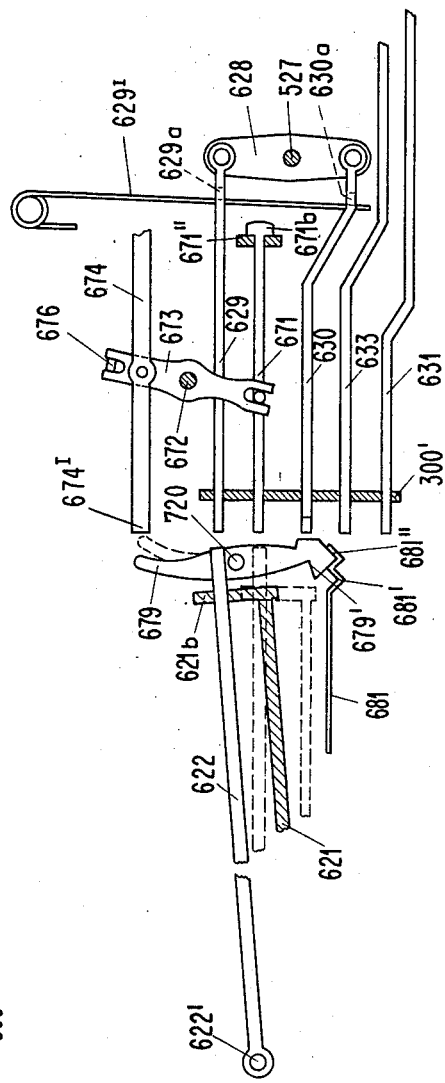

July 30, 1963 W. HEINZE 3,099,391
TEN KEY COMPUTING MACHINE
Filed Sept. 28, 1960 28 Sheets-Sheet 23
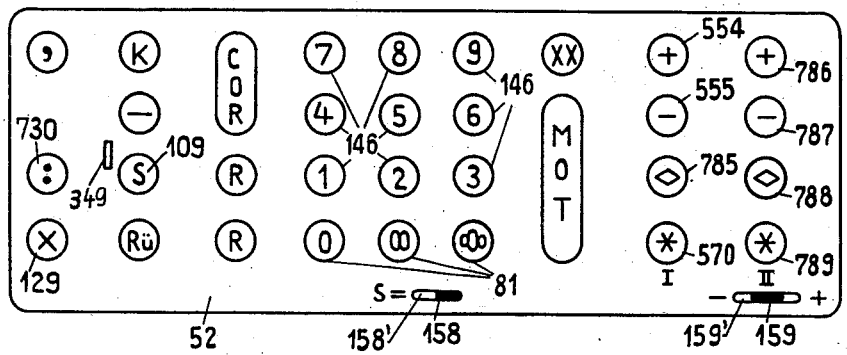
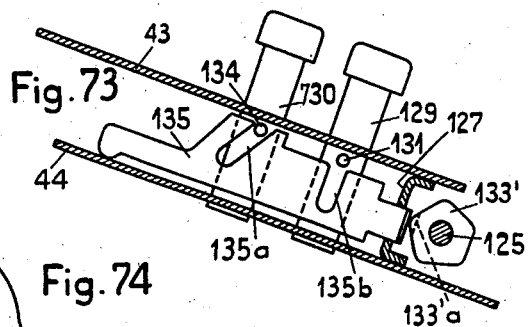
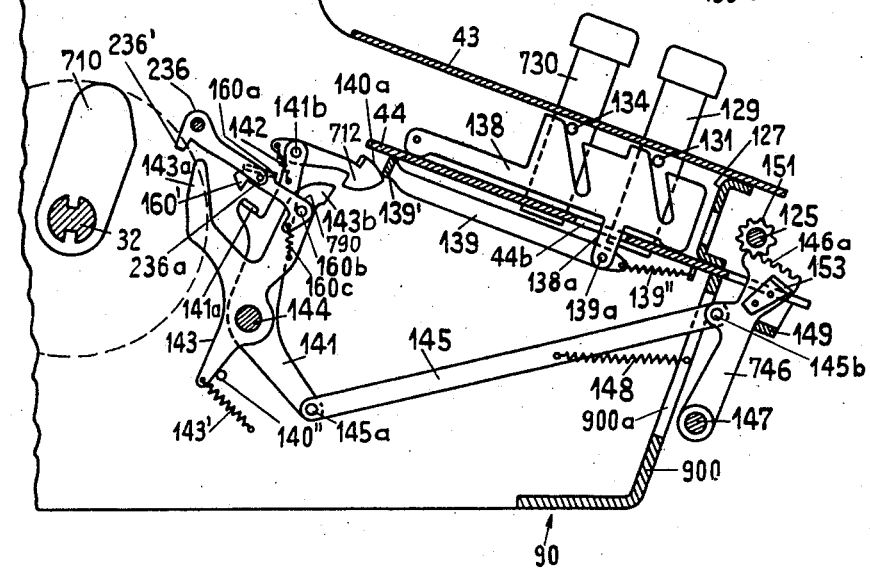

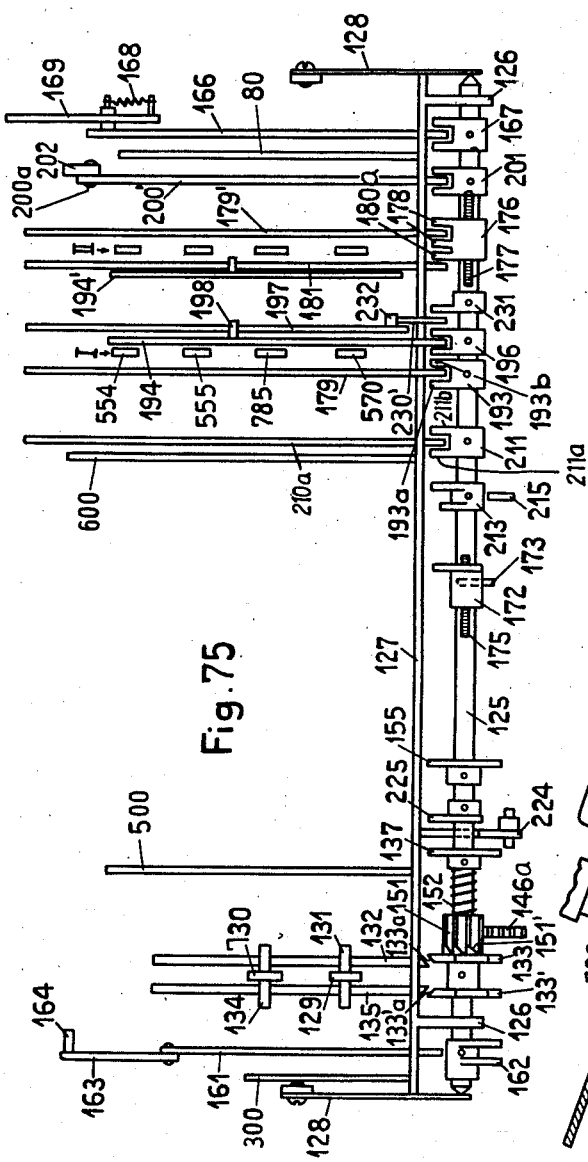
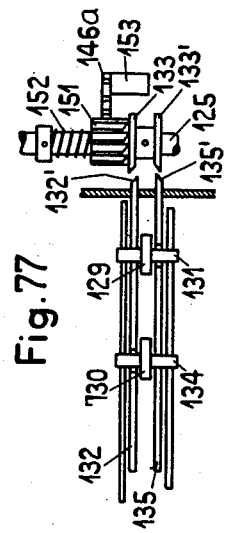
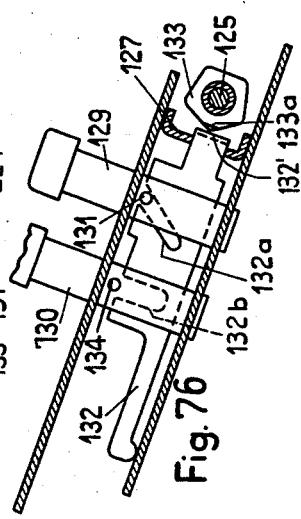

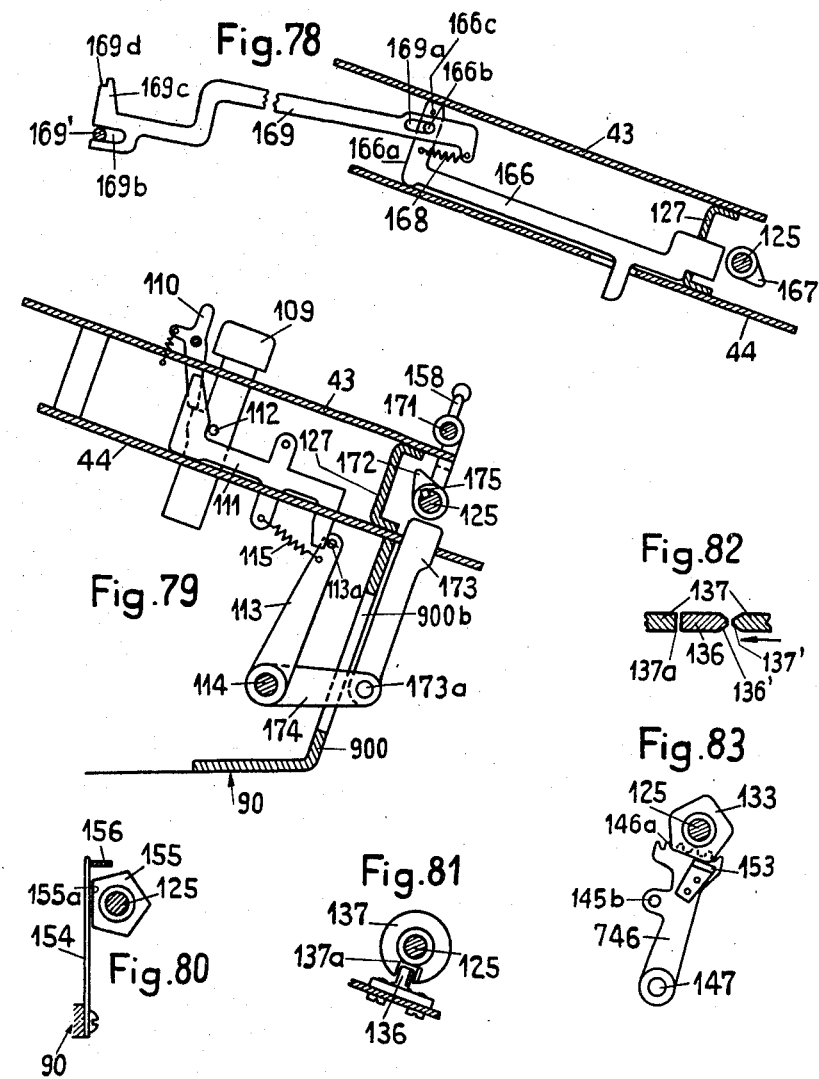

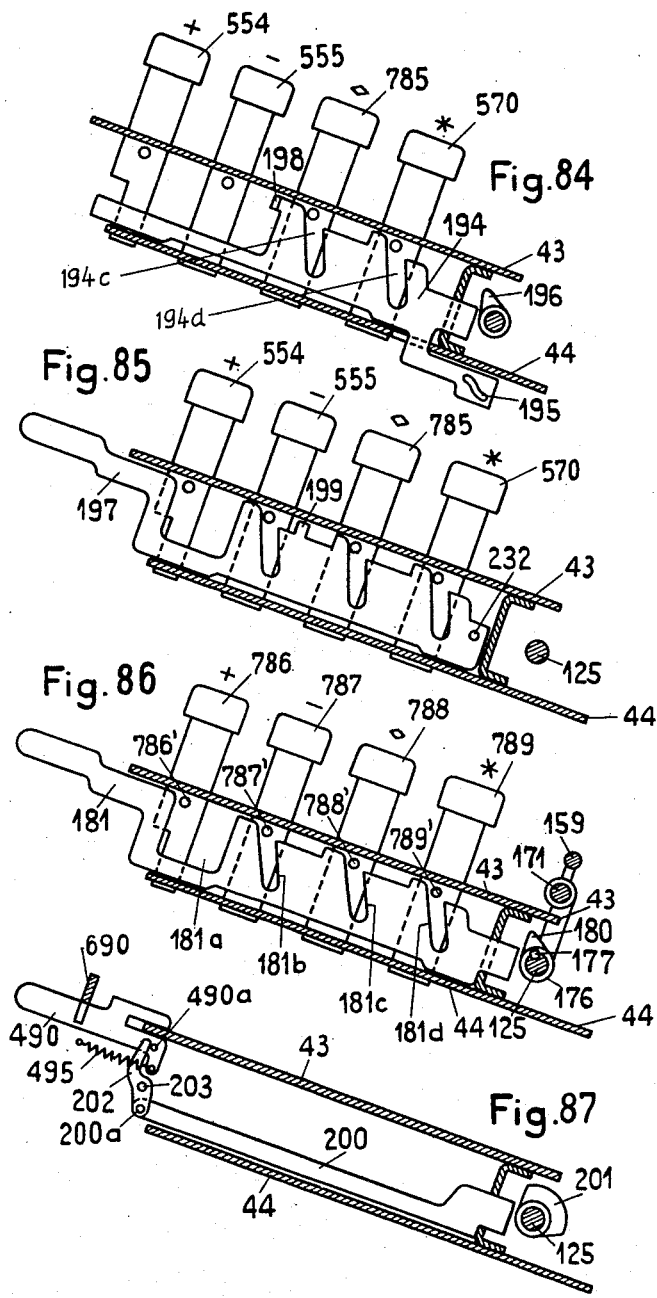

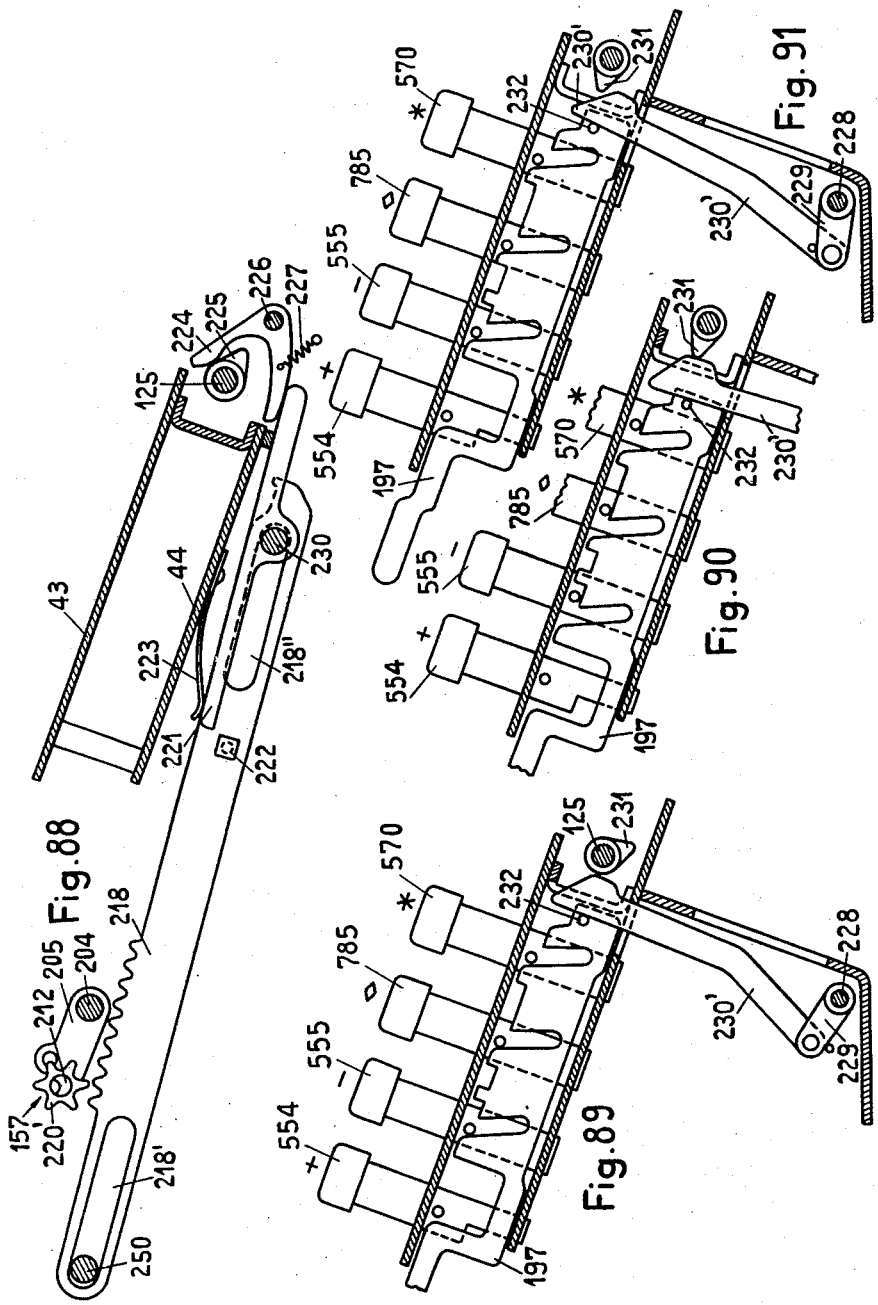

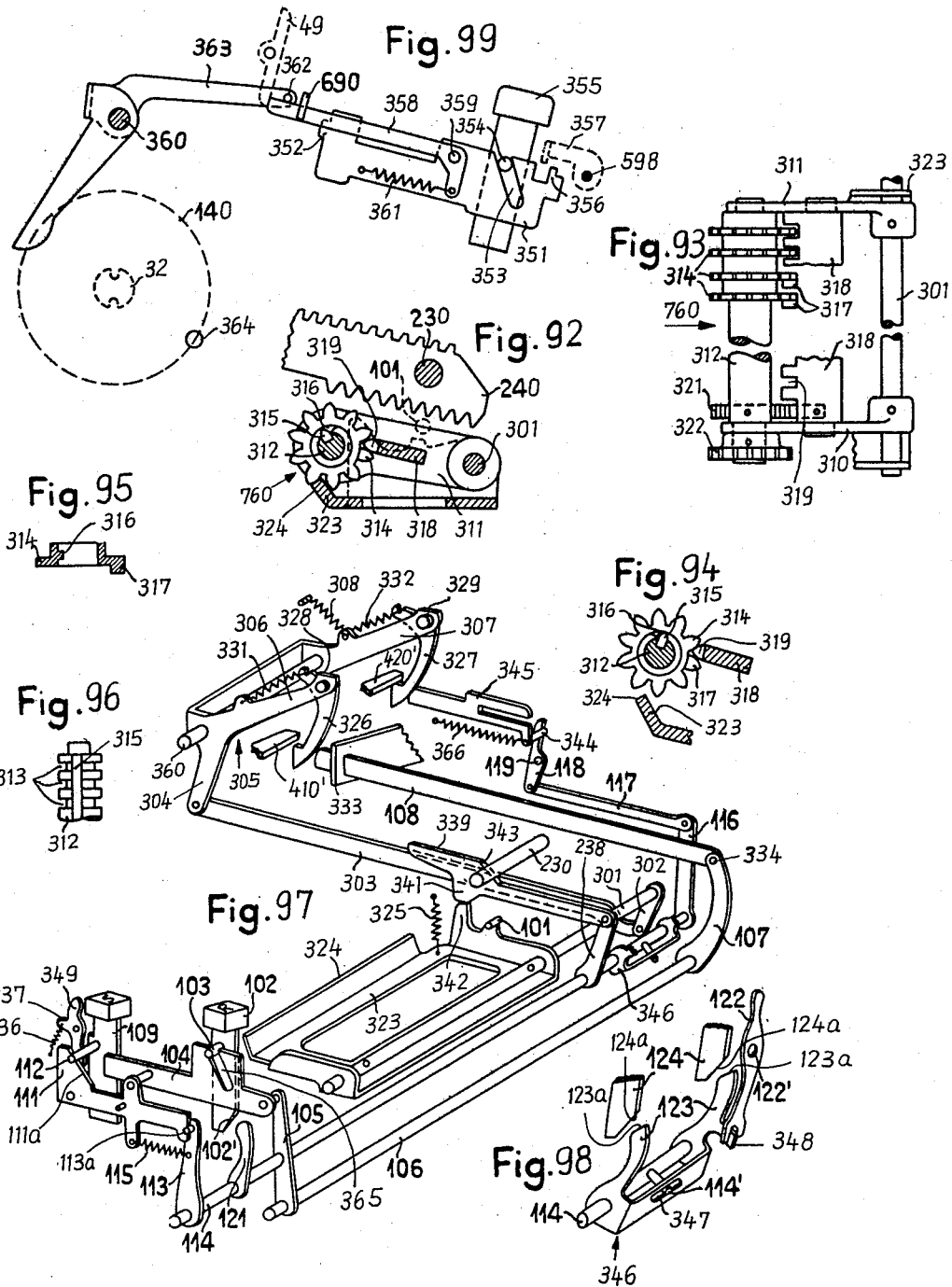

United States Patent Office 3,099,391
Patented July 30, 1963

3,099,391
TEN KEY COMPUTING MACHINE
Werner Heinze, Zurich, Switzerland, assignor to Precisa A.G. Rechenmaschinenfabrik, Zurich, Switzerland
Filed Sept. 28, 1960, Ser. No. 59,039
4 Claims. (Cl. 235—60)

This application is a continuation-in-part of Serial No. 494,332, filed March 15, 1955, now abandoned.

The invention relates to a ten key computing machine of the kind in which all four basic types of computation may be performed, i.e. addition, subtraction, multiplication, and division.

It is an object of the invention to provide a computing machine of the type indicated which includes a repeater mechanism and in which a return transfer of values from any one of the accumulator mechanisms and from the repeater mechanism to the setting mechanism may be effected through the regular transmission means, such as the setting gears, the computing racks, and the like, which are utilized in the abovementioned basic computations. This greatly simplifies and facilitates a number of complex computations, such as multiple multiplications of the general type $a \times b \times c$, and chain computations comprising two or more basic computations in combination.

Another object of the invention is to provide a computing machine of the type indicated in which the repeater mechanism may be utilized as a storage mechanism capable of retaining values temporarily, even while participating in other computing operations.

A further object of the invention is to provide a computing machine of the kind indicated in which the repeater mechanism may be utilized for taking over totals or subtotals from the other accumulator mechanisms, thereby dispensing with the necessity of reintroducing such values into the setting mechanism.

Other objects and advantages of the invention will be apparent from the following description thereof.

Figure 2:
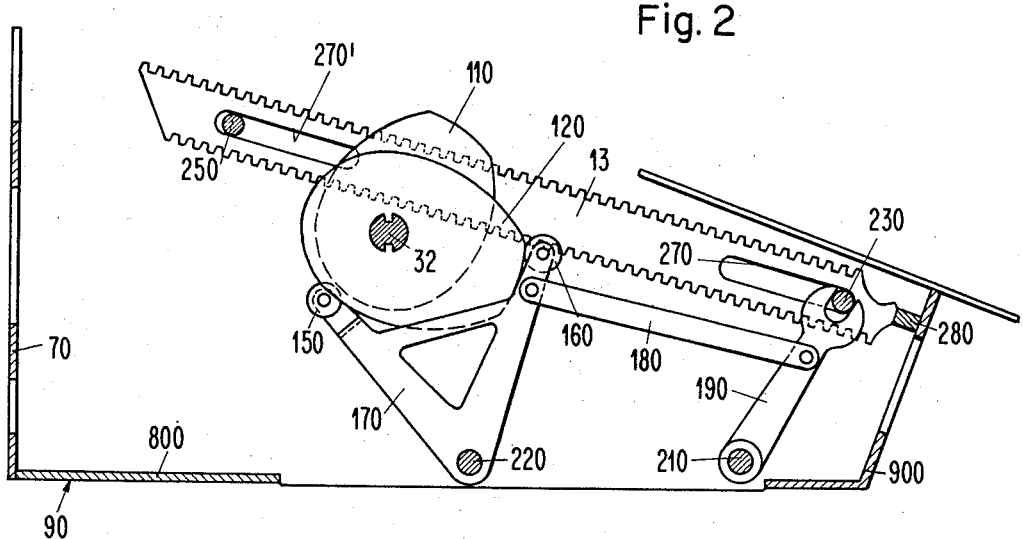
Figure 10:
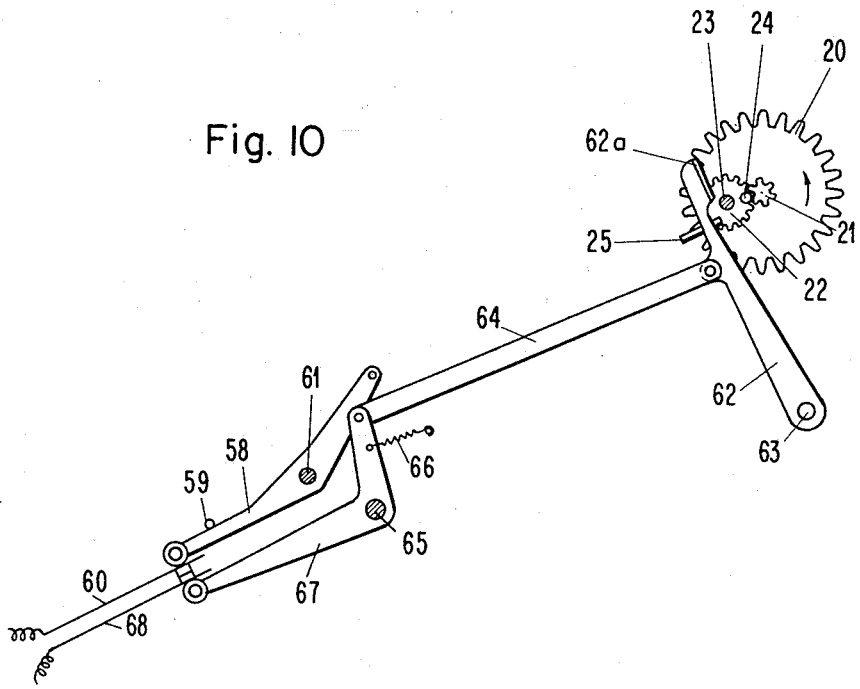
Figure 19:
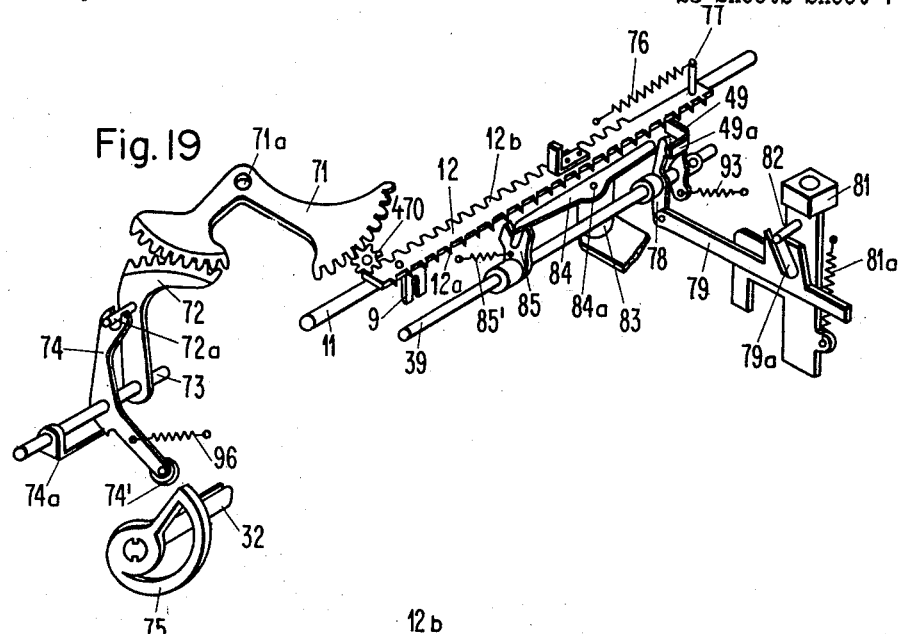
Figure 21:
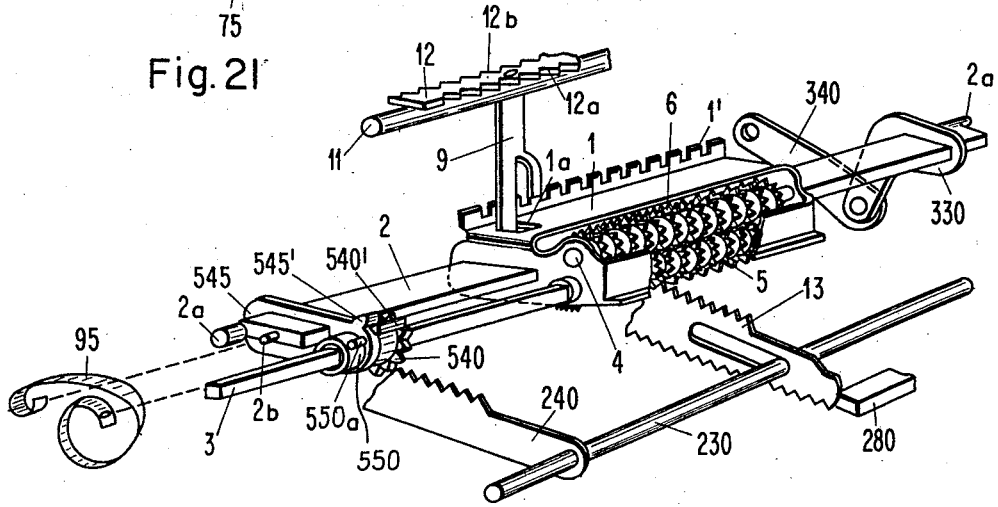
Figure 20:
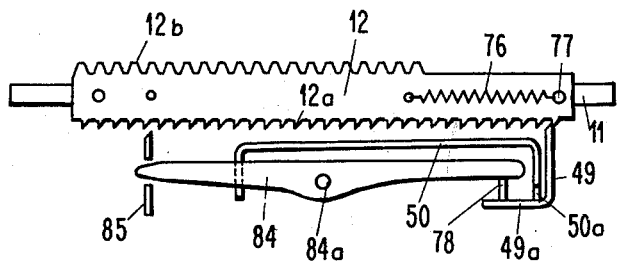
Figure 22:
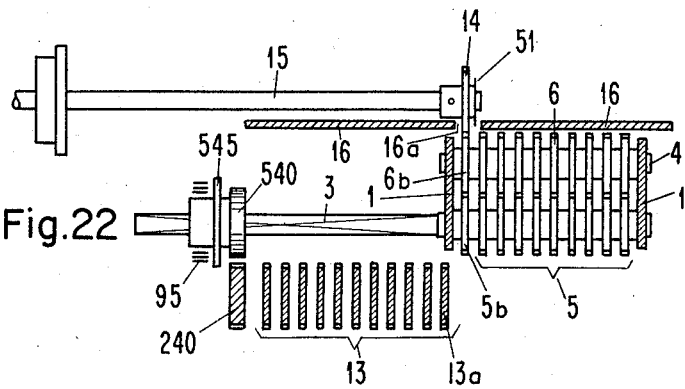
Figure 23:
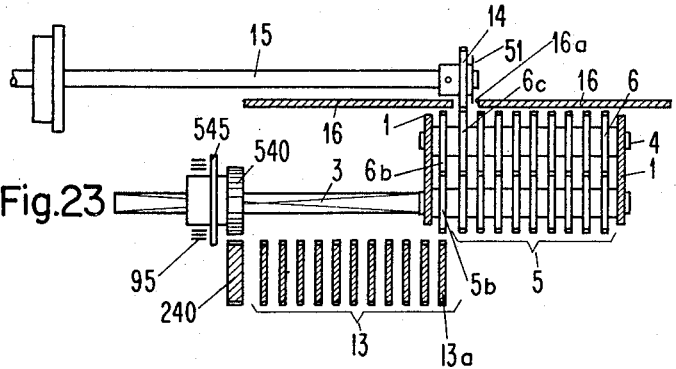
Figure 24:
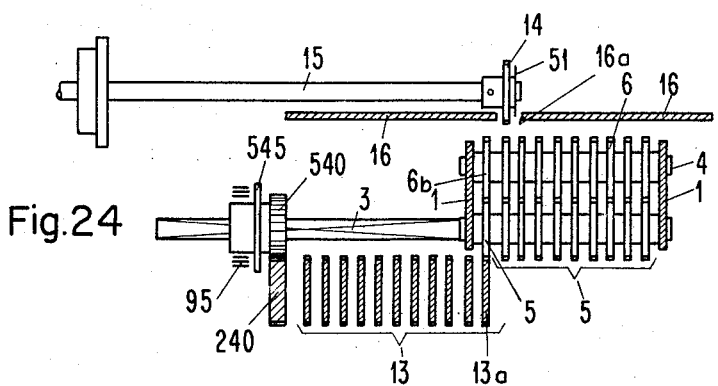
Figure 41:
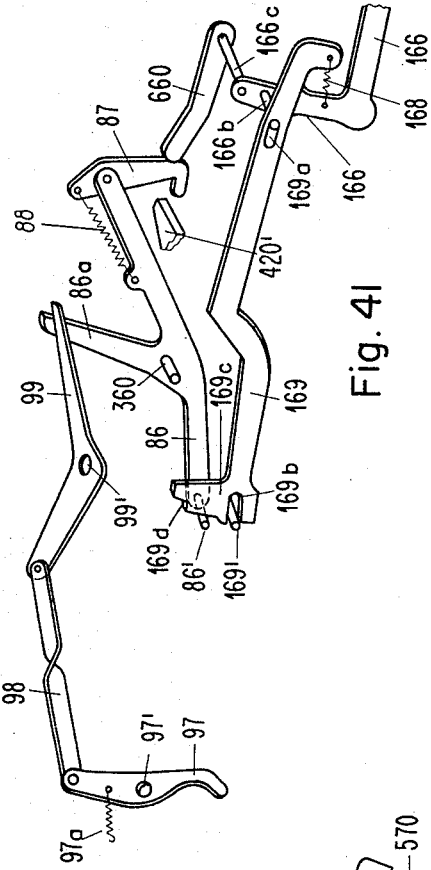
Figure 39:
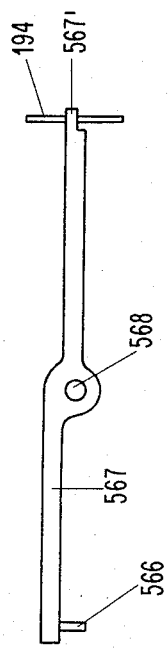
Figure 40:
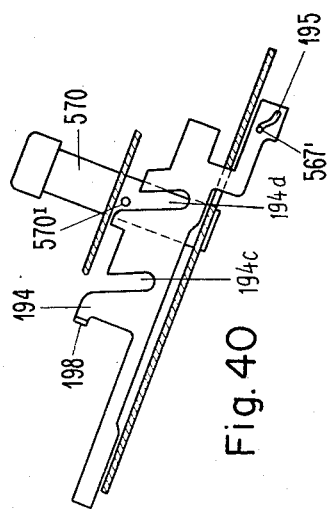
Figure 47:
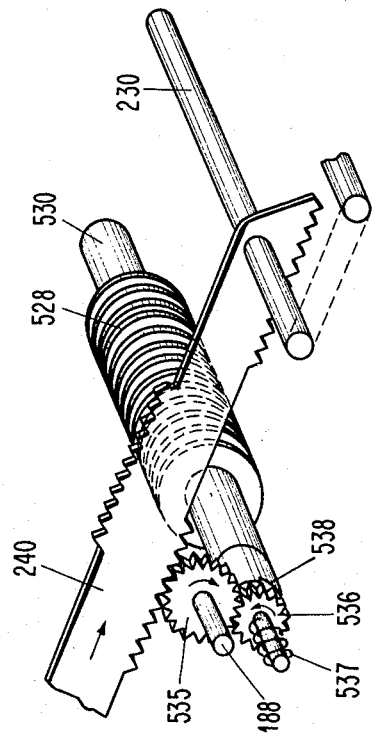
Figure 49:
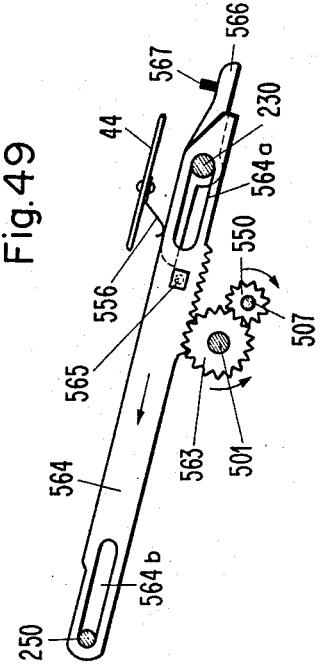
Figure 48:
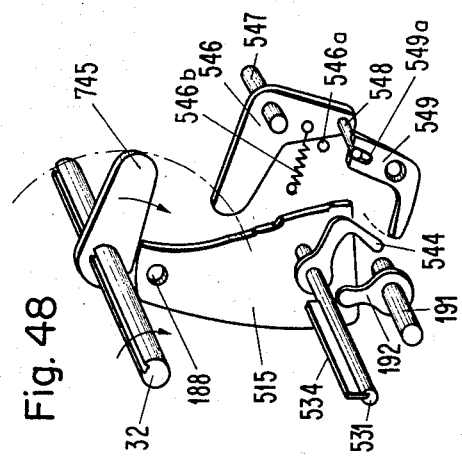

An embodiment of the invention is described below with reference to the accompanying drawings, in which:

FIG. 1 is a plan view of the machine with the top cover removed and with certain parts omitted for clarity of illustration, FIG. 2 shows a vertical longitudinal section of the machine with certain parts omitted, FIG. 3 is a sectional view similar to FIG. 2 but with other parts omitted, FIG. 4 shows an elevation of a mechanism for driving a control shaft for the setting mechanism by an electric motor, FIG. 5 is a plan view of the drive mechanism shown in FIG. 4, FIG. 6 shows a perspective view of the control shaft in FIGS. 4 and 5, FIG. 7 is a cross-sectional view of said control shaft, FIG. 8 is a plan view of a detail of said control shaft, FIG. 9 is a diagrammatic plan view on a smaller scale of the arrangement of key levers associated with the digit keys one to nine, inclusive, FIG. 10 is a partial elevational view of the mechanism shown in FIGS. 4 and 5, FIG. 11 is a vertical cross-section through the keyboard and certain mechanism associated therewith, FIG. 12 shows a plan view of a detail of the mechanism in FIG. 11, FIGS. 13 and 14 are similar illustrations showing, in partial plan view, the setting mechanism in two different positions in relation to the control shaft of FIG. 4, FIG. 15 is a partial plan view of said control shaft in relation to another part of the machine, FIG. 16 is a view similar to FIG. 11 showing the mechanism in a different operational position, FIG. 17 is a view similar to FIG. 11 with the mechanism in another operational position, FIG. 18 is a similar view showing a detail associated with the mechanism of FIG. 11, FIG. 19 shows a perspective view of a part of the mechanism for operating the setting mechanism, FIG. 20 is a plan view of a detail of FIG. 19, FIG. 21 is a perspective view of the setting mechanism and certain mechanism associated therewith, FIGS. 22, 23, and 24 are horizontal cross-sections of the setting mechanism in different positions in relation to associated cooperating parts, FIGS. 25 and 26 show vertical cross-sections of the mechanisms of FIGS. 22, 23, and 24 in two different relative positions, FIG. 27 is a partial view corresponding to FIGS. 25 and 26, also in vertical cross-section, FIG. 28 is a partial perspective view on a larger scale of a detail associated with the setting mechanism, FIG. 29 shows an axial cross-section of one of the gears in the setting mechanism, FIG. 30 is a partial elevational view of one of the shafts supporting said gears, FIG. 31 shows a partial plan view of an actuating mechanism operatively associated with the main drive shaft of the machine, FIG. 32 is a partial perspective view of an actuating mechanism operatively connecting the actuating mechanism of FIG. 31 with the setting mechanism, FIG. 33 is a partial cross-sectional view substantially corresponding to FIG. 32, FIG. 34 shows in vertical cross-section a mechanism for operating an accumulator mechanism and a printing mechanism, FIG. 35 is a similar view of a mechanism for operating a sign printing mechanism, FIG. 36 shows a diagram of cam operation, FIG. 37 is a detail elevational view related to the mechanism shown in FIGS. 4 and 5, FIG. 38 is a perspective view of a mechanism for inactivating a cam on the main drive shaft, FIG. 39 shows a detail of a mechanism associated with a key operated slide, FIG. 40 is an elevation of the slide mentioned in connection with FIG. 39, FIG. 41 is a perspective view of the mechanism of FIG. 38 with some additional associated members, FIG. 42 is a vertical cross-sectional view of an accumulator mechanism, FIG. 43 shows a detail of the accumulator mechanism of FIG. 42, FIG. 44 is a vertical cross-sectional view of a detail of the mechanism of FIG. 42 and associated parts, FIG. 45 is a similar view of another detail mechanism in the accumulator mechanism, FIG. 46 is an enlarged perspective view of a further detail of the accumulator mechanism, FIG. 47 shows a perspective view of a mechanism operatively connecting the accumulator mechanism with actuating means therefor, FIG. 48 is a perspective view of other detail mechanisms associated with the accumulator mechanism, FIG. 49 is a cross-sectional view of other actuating means connected with the accumulator mechanism, FIGS. 50 and 51 are cross-sectional views of a shaft in the accumulator mechanism with a gear supported thereby in different positions.

Figure 62:
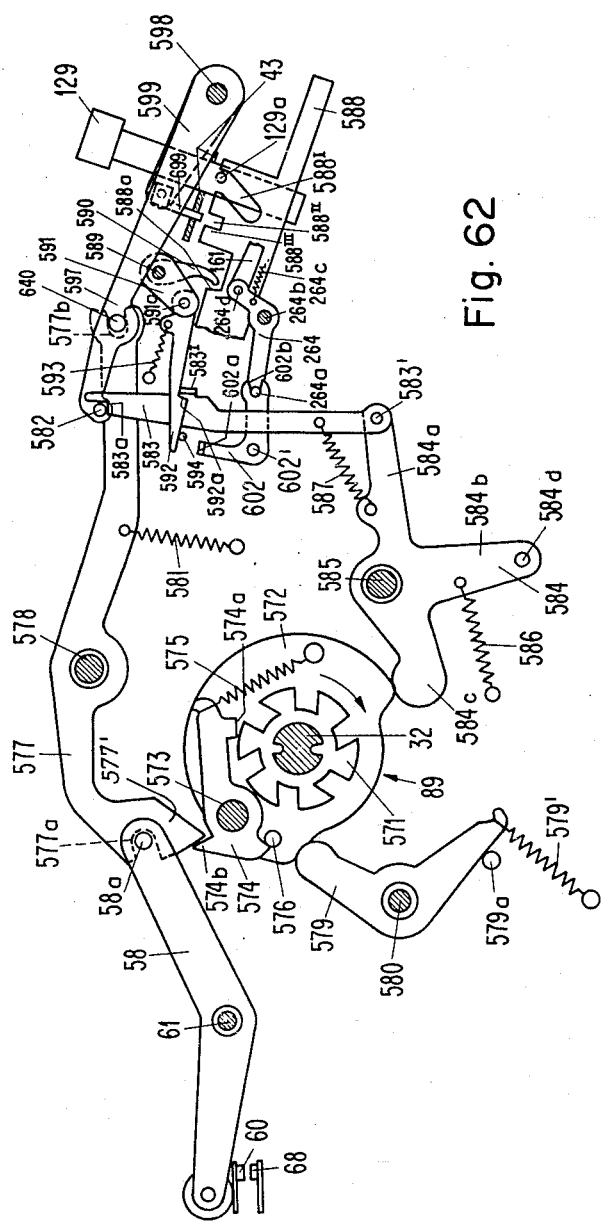
Figure 68:
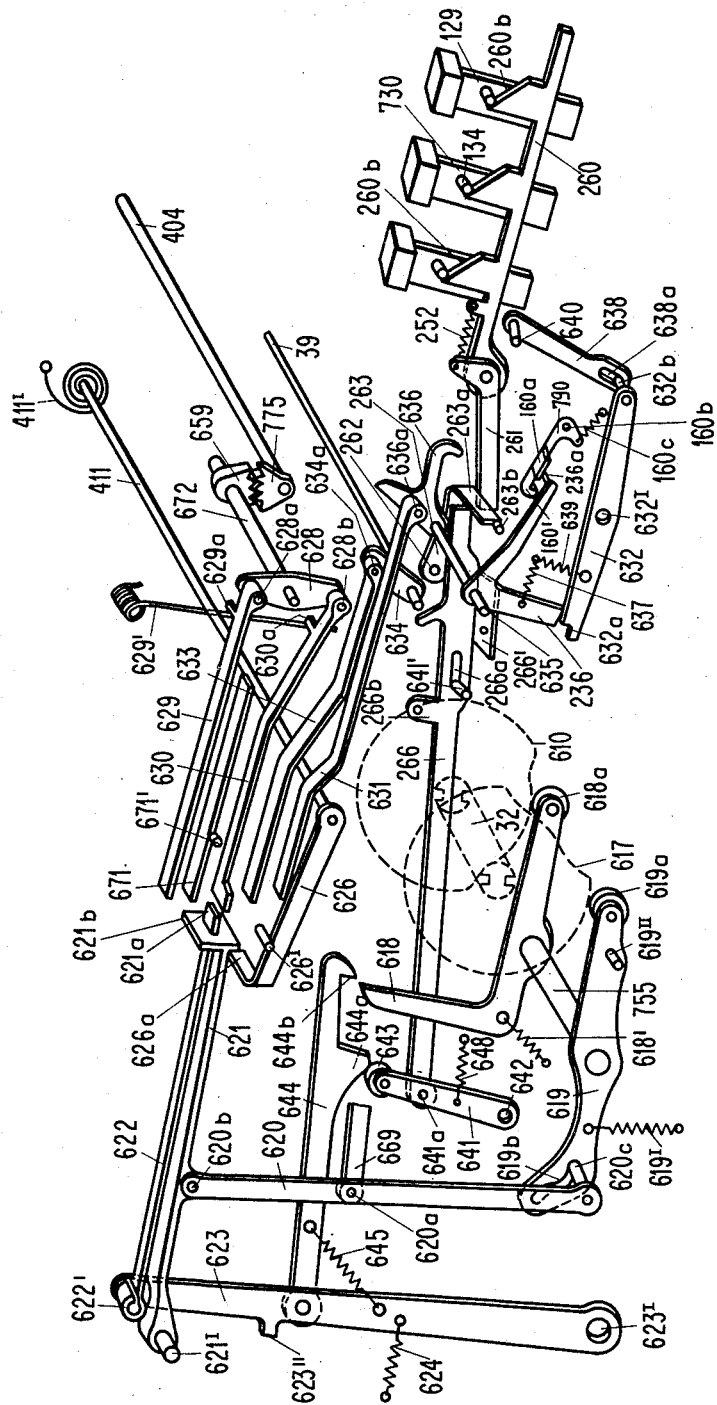
Figure 71:
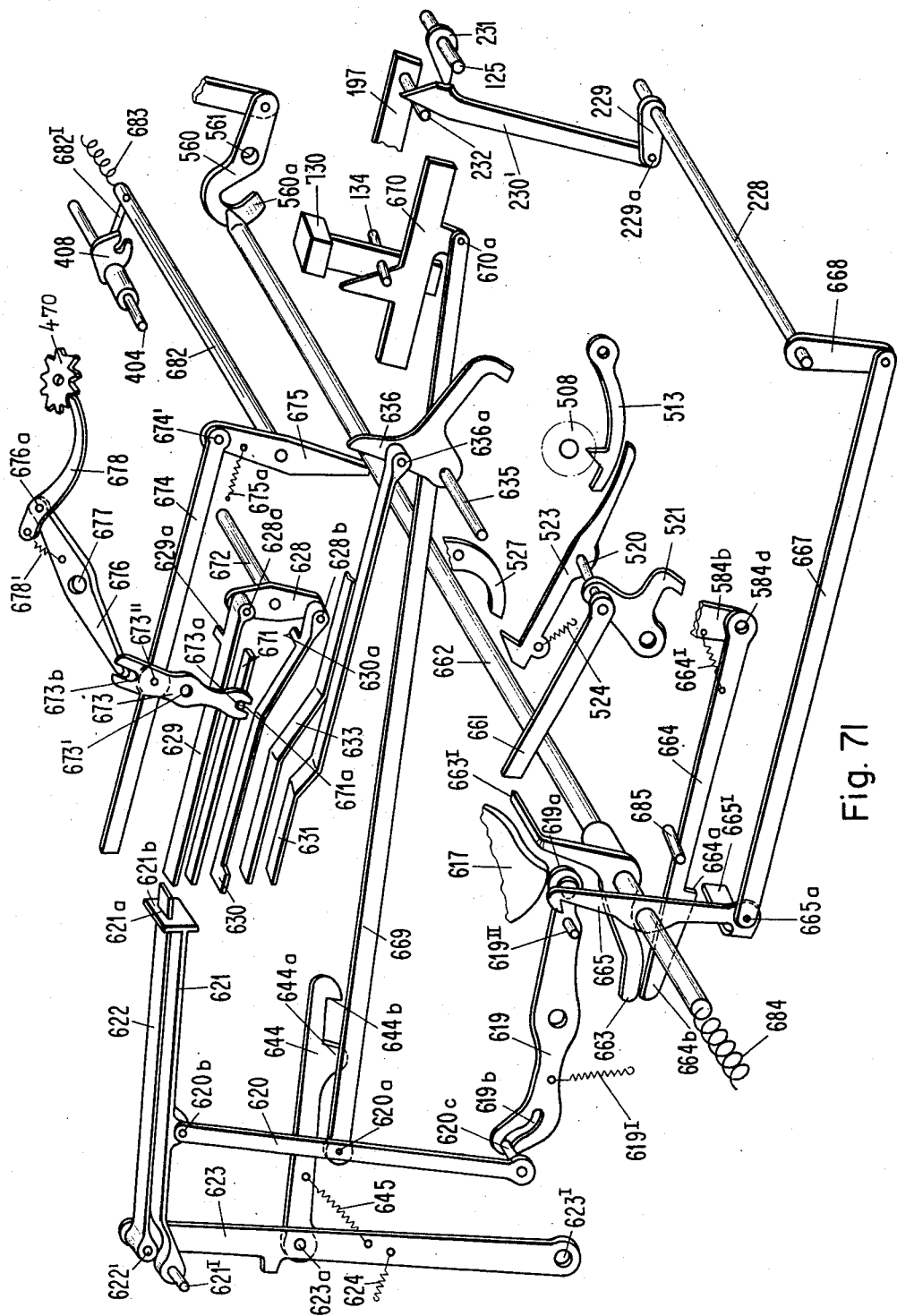

FIG. 52 is a longitudinal section through the shaft and gear of FIGS. 50 and 51, FIG. 53 is a perspective view of a detail associated with said shaft and gear, FIGS. 54 and 55 are further detail sections of parts associated with said shaft and gear, FIG. 56 shows an axial section of a detail of a different accumulator mechanism, FIG. 57 is a vertical cross-section of further details of the lastmentioned accumulator mechanism, FIG. 58 is a similar vertical cross-section of other details of the lastmentioned accumulator mechanism, FIG. 59 is a further similar cross-section of the lastmentioned accumulator mechanism and its connection with the setting mechanism, FIG. 60 shows still another sectional view of details of the lastmentioned accumulator mechanism, FIG. 61 is a plan view of said lastmentioned accumulator mechanism, FIG. 62 shows a vertical sectional view of a mechanism for coupling the drive motor to the main drive shaft of the machine, FIG. 63 is a vertical sectional view of means for controlling the positioning of the setting mechanism, FIG. 64 is a perspective view of the same means and associated mechanisms, FIG. 65 shows a vertical sectional view of details of the means of FIG. 63, FIG. 66 is a further vertical sectional view of such details, FIG. 67 is a partial vertical sectional view of the mechanism for controlling the means shown in FIG. 63, FIG. 68 is a diagrammatic perspective view of other mechanism associated with the means of FIG. 63 and with the accumulator mechanism shown in FIG. 61, FIG. 69 shows an elevational view of a detail of FIG. 68, FIG. 70 is a vertical sectional view of another detail of FIG. 68, FIG. 71 is a diagrammatic perspective view of the mechanism of FIG. 68 and associated means, FIG. 72 is a plan view of the keyboard of the machine, FIG. 73 is a vertical sectional view of a cam control shaft and a slide associated therewith, FIG. 74 is a vertical sectional view of a portion of the machine and shows actuating means for the cam control shaft, FIG. 75 is a plan view of the cam control shaft and associated mechanism, FIG. 76 is a vertical sectional view of the cam control shaft with another associated slide, FIG. 77 is a horizontal sectional view showing the cam control shaft and means associated therewith, FIGS. 78 and 79 are vertical sectional views showing the operative association of the cam control shaft with two further slides, FIGS. 80 to 83, inclusive, are sectional views showing further details in connection with the cam control shaft, FIGS. 84 to 87, inclusive, are vertical sectional views showing the operative association of the cam control shaft with additional actuating slides, FIG. 88 is a vertical sectional view showing the operative association of the cam control shaft with a restoration mechanism for the accumulator mechanism of FIG. 61, FIGS. 89, 90, and 91 are vertical sectional views showing the operational association of the cam control shaft with a further actuating slide, FIG. 92 is a vertical longitudinal section through a further accumulator mechanism, FIG. 93 is a plan view of said further accumulator mechanism, FIGS. 94 and 95 are sectional views of details of said further accumulator mechanism, FIG. 96 is a partial plan view thereof, FIG. 97 shows a perspective view of the operating mechanism for said further accumulator mechanism, FIG. 98 shows on a larger scale a perspective view of a detail of the mechanism of FIG. 97, and FIG. 99 is an elevational view of a return transfer key with associated mechanism.

Referring now particularly to FIGS. 1, 2, and 3, the machine comprises a casing 90 having a bottom 800, side walls 300 and 80, a front end wall 900, and a rear end wall 70. Two vertical partitions 500 and 600 extend lengthwise of the casing from the front to the rear end wall thereof. An electric motor 37 is secured to the casing 90 at the rear end wall 70 and provided on its shaft with a pinion 36 (see also FIGS. 4 and 5) in meshing engagement with a gear 35 that is secured to a second gear 34 concentric with the gear 35. Said second gear 34 is in meshing engagement with a third gear 33 which in turn is in meshing engagement with a fourth gear 31 connectible through a coupling 89 (FIG. 62) with a horizontal drive shaft 32 that is rotatably mounted in the casing 90 transversely thereof. The gears 35, 34, and 33 are rotatably mounted on the side wall 300 of the casing.

As shown in FIGS. 4 and 5, the gear 31 is in meshing engagement with a gear 30 which also is in meshing engagement with another gear 29. Both gears 30 and 29 are mounted on the casing wall 300 for free rotation. On the same stub shaft (not shown) as the gear 29 a gear 26 is rotatably mounted and held in frictional engagement with the gear 29 by means of a spring 28 the tension of which is adjustable by means of a screw 27 threaded into the end of said stub shaft. Obviously, this structure constitutes a variable friction clutch between the gears 29 and 26.

The gear 26 is in meshing engagement with a further gear 20 mounted for free rotation on a control shaft 15 that is rotatably mounted in the casing 90 parallel with the drive shaft 32. A planet gear 22 is rotatably mounted in an eccentric position on the gear 20 by means of a pivot pin 23, and said planet gear 22 is in meshing engagement with a gear ring 21 formed on a projecting end portion of the control shaft 15. The planet gear 22 has the space between two of its teeth filled as indicated at 22a (FIGS. 4 and 37) whereby its rotation on the pivot pin 23 is limited to less than 360°. A pin 24 (see also FIG. 10) projects axially from the planet gear 22 in an eccentric position, and a stop member 25 secured to the machine casing 90 provides an abutment for said pin 24, as will be described below. The gear 20 is provided on its inside with a casing 19 (FIG. 5) secured to said gear 20 and enclosing a coil spring 18 that has one end attached to the casing 19 or gear 20 and the other end secured to the control shaft 15 in such a manner that, when said spring 18 is tensioned, it tends to rotate the control shaft 15 in the counterclockwise direction as viewed in FIG. 4.

A lever 62 (FIGS. 4, 5 and 10) is pivotally mounted on the side wall 300 at 63 and has at its free end an abutment surface 62a for cooperation with the pin 24, as will be described below. A link 64 is pivotally connected with said lever 62 and with one arm of a bell crank 67 that is pivotally mounted on the side wall 300 at 65. A tension spring 66 connecting said bell crank 67 with the machine casing 90 tends to pivot the bell crank 67 in the clockwise direction as viewed in FIGS. 4 and 10. A lever 58 is pivotally mounted on the side wall 300 at 61, and a fixed abutment pin 59 limits clockwise rotation of said lever 58. Two contact springs 60 and 68 extend into the space between the free ends of the lever 58 and bell crank 67 and are maintained by their spring tension in engagement with said lever 58 and bell crank 67, respectively. The contact springs 60, 68 are connected in the electric circuit (not shown) of the drive motor 37.

The control shaft 15 (FIGS. 5–8, 11, 16, and 17) is provided with a plurality of projecting stop fingers 17, 17a (omitted in FIGS. 13–15 and 21–23) spaced longitudinally along the control shaft 15 and also circumferentially around the same. Each of said fingers 17, 17a is shaped as shown in FIGS. 7 and 8 and secured, as by welding, in a recess 15b (FIG. 6) in the control shaft 15. A pin 15a in the center of the recess 15b extends through a hole in the finger and thus determines the exact location of the finger. Adjacent the spring casing 19, the control shaft 15 is provided with a recessed straight surface 15c (FIGS. 5 and 18) and at the opposite end with a setting pinion 14 and a disc 51. Said setting pinion 14 and disc 51 are non-rotatably secured to the control shaft 15, and the disc 51 is provided with a peripheral notch 51a, FIG. 26.

Cams 110, 120, 130, 140 (FIGS. 1–3) are secured to the drive shaft 32. A shaft 220, parallel with the shaft 32, is pivotally mounted in the side wall 300 and the partition 500, and to said shaft 220 a bell crank 170 is secured. One arm of said bell crank 170 carries a rotatably mounted roller 150 in engagement with the cam 110. The other arm of the bell crank 170 carries a rotatably mounted roller 160 in engagement with the cam 120. The cams 110 and 120 are so shaped (compare FIG. 36) that where during a cycle of operation the radius of one cam is increasing, the radius of the other cam is decreasing at the same rate so that the rollers 150, 160 are continuously in engagement with the cams 110, 120, respectively.

The arm of the bell crank 170 carrying the roller 160 has pivotally attached thereto a link 180, the other end of which is pivotally secured to a fork lever 190. Said fork lever 190 as well as a second similar fork lever 200 (FIG. 1) are secured to a shaft 210 parallel with the drive shaft 32 and pivotally supported in the partitions 500 and 600. A drive rod 230 is supported in the forks of the fork levers 190, 200, and the partitions 500, 600 are provided with slots (not shown) in which the drive rod 230 is movable. In the rear portion of the casing 90 and at a higher level, a second rod 250, parallel with the drive rod 230, is fixedly secured in the partitions 500, 600. A drive rack 240 (FIGS. 1, 21–24, 47) is secured with one end to the drive rod 230 and has adjacent to its other end a longitudinal slot (not shown) through which the rod 250 extends. Accordingly, the drive rack 240 is supported in an inclined position on the rods 230, 250 and reciprocable longitudinally by means of the drive rod 230.

A number of computing racks 13 (FIGS. 1–3 and 21–24) are supported on the rods 230, 250 which extend through longitudinal slots 270, 270′ (FIGS. 2 and 3) in said racks 13 so that said racks are individually slidable in their longitudinal direction on said rods 230, 250 to the extent permitted by the length of said slots 270, 270′. An abutment member 280 (FIGS. 2 and 3) secured to the front end wall 900 of the casing limits the movement of the racks 13 towards the right in FIGS. 2 and 3. The computing racks 13 are provided with teeth on their upper and lower edges, and the upper teeth are in permanent meshing engagement with gears in a printing mechanism 770 mounted on the top rear portion of the machine and adapted to pull a strip of printing paper (not shown) from a paper roll 780. Various other mechanisms are adapted for temporary meshing engagement with the racks 13, as will be described in detail, below.

The cam 130 is in engagement with a roller 430 rotatably mounted on an arm of a lever 410 rotatably carried by a shaft 360 that is mounted in the partition 600 and the casing wall 80. The cam 140 is in engagement with a roller 440 (FIG. 1) pivotally mounted on a lever 420 rotatably carried by said shaft 360. The levers 410, 420 are provided on their free arms with lateral projections 410′, 420′, respectively, for a purpose to be explained below (compare FIG. 31).

A keyboard occupies the front part of the top cover of the machine (see particularly FIGS. 3, 11, and 72), and the keys project upwardly through apertures in a cover plate 52 (FIGS. 11, 16 and 17). There are nine number keys 146, ranging from 1 to 9, and a zero key 81. In addition, there are a plurality of function and sign keys, such as 109, 129, 730, 554, 555, and 570. The arrangement of the number keys 146, representing the digits 1–9, is shown in dotted lines in FIG. 9, and the arrangement of the keyboard generally is shown in FIG. 72.

Each digit key extends through an aperture in the cover plate 52 and is guided in registering apertures in two plates 43, 44 parallel with said cover plate 52 and disposed below the same. An inverted channel member 44a (FIGS. 11 and 16) is secured to the plate 44 and provided with end closures (not shown) and with a number of apertures in its web portion. Each of the digit keys is provided with an offset leg, such as 42a, extending down through one of said apertures in the web portion of the channel member 44a, and the inverted channel member 44a is filled with a row of balls 53 to such an extent as to permit depression of only one of said digit keys at a time.

As shown in FIGS. 11, 16, and 17, each of the keys 146 comprises a stem 42 to which a head member 46 is secured, and a compression spring 45 is inserted between said head member 46 and the plate 43 to bias the key towards its normal undepressed position. Each key 146 is also provided with a laterally projecting pin 41 in permanent engagement with the forked end portion of a key lever 40 the mounting and function of which will be explained below. The zero key 81 (FIGS. 11 and 19) is similarly biased towards its normal undepressed position by means of a tension spring 81a secured to the key and the plate 43, as indicated. Said zero key 81 also has a laterally projecting pin 82 for a purpose to be explained below.

The key levers 40 are pivotally mounted on a shaft 39 (see particularly FIGS. 9, 11, 16, and 17) parallel with the drive shaft 32. A pawl 49 is pivotally mounted on said shaft 39 and biased in the counterclockwise direction by a tension spring 93 (FIG. 19) connecting an arm of said pawl 49 with the machine casing 90. Also pivotally mounted on the shaft 39 is a substantially U-shaped lever 50 (see also FIG. 20) one leg 50a of which is engageable with a lateral projection 49a on the pawl 49. A lever 38 is rotatably mounted on the shaft 39 (see particularly FIG. 11) and biased in the counterclockwise direction by a tension spring 94 secured to the lever 38 and the machine casing 90. Said lever 38 has a projection 38a (see also FIG. 5) engageable with the stop finger 17a on the control shaft 15, as indicated in FIGS. 5 and 11. The levers 38 and 50 extend across the entire width occupied by the key levers 40, and each of said key levers 40 has an extension 40a in position for engagement with said lever 38. An auxiliary lever 48 is pivotally mounted on each key lever 40 and provided with an arm 48a positioned for cooperation with an individual one of the stop fingers 17 on the control shaft 15. Another arm 48b of the auxiliary lever 48 is adapted for cooperation with the lever 50, all as described below. The auxiliary lever 48 is limited in its downward movement by a bar 16 extending laterally of the machine casing 90 and secured thereto. The bar 16 is provided with a recess 16a (FIGS. 15 and 22–26) adapted to accommodate the setting pinion 14 and the disc 51, and a depending flange 16b (FIG. 11) extending along a portion of the length of the bar 16 is provided for a purpose to be explained.

On the plate 44 a latch member 55 is mounted for pivotal movement on a horizontal shaft 56 and biased in the clockwise direction by a tension spring 57 (FIG. 18) secured to the latch member 55 and to the machine casing 90. Said latch member 55 is adapted for cooperation with the key levers 40, as will be explained below. A lever 54 is pivotally connected to the latch member 55 and has a depending projection 54a engaging over the control shaft 15 at the point of said control shaft where the recess 15c (FIGS. 5 and 18) is disposed.

The pin 82 projecting laterally from the key 81 extends into a slot 79a (FIG. 19) in a link 79 that is slidable in the casing 90 and pivotally connected with one arm of a lever 78 pivotally mounted on the shaft 39 (see also FIGS. 20 and 64), and the other arm of said lever 78 is positioned for engagement with the lateral projection 49a of the pawl 49 and with an arm of a lever 84 pivotally mounted on a vertical pin 84a secured to a post 83 that is fixedly connected with the machine casing 90. The other arm of the lever 84 is in operative engagement with a pawl 85 which is pivotally mounted on the shaft 39 and biased in the counterclockwise direction (FIGS. 19 and 64) by a tension spring 85' secured to said pawl 85 and to the machine casing 90. The pawls 49 and 85 serve a purpose to be described in detail below.

A setting mechanism comprises a setting carriage 1 (particularly FIGS. 1 and 21) having its end walls provided with slots embracing a cross-bar 2 so that the carriage 1 is slidable transversely of the machine on said cross-bar 2. A rod 11 is supported on hooks 91, 92 (FIG. 28) secured to a cross-plate 100 and slidable longitudinally on said hooks 91, 92. The cross-plate 100 (see also FIGS. 3, 34, and 74) is secured to the casing 90. A combined tooth and gear rack 12 is secured to the rod 11 longitudinally thereof and provided on one edge with gear teeth 12b and on the opposite edge with teeth 12a (also FIGS. 19 and 20) adapted for cooperation with the pawls 49 and 85, as will be explained. A post 9 is secured to the rod 11 and rack 12 and extends downwardly into an aperture 1a (FIGS. 21, 25, and 26) in the top wall of the setting carriage 1. The post 9 is slidably guided on a rod 10 secured to the machine casing 90, and a tension spring 76 is secured to the machine casing 90 and to a pin 77 (FIGS. 19 and 20) on the rack 12 to bias said rack 12 and thereby the setting carriage 1 towards the left in FIGS. 1, 19, and 21.

In the end walls of the setting carriage 1, a shaft 4 (FIGS. 21–27) is fixedly secured, and a number of setting gears 6 are rotatably mounted side by side on said shaft 4, each in permanent engagement with a similar gear 5 rotatably mounted on a setting shaft 3 that is rotatably mounted in the end walls of the carriage 1 and parallel with the fixed shaft 4. Each of the shafts 3, 4 is provided with a fixed longitudinal key 7, 8, respectively, extending through all the gears on the respective shaft, and each gear 5, 6 has an internally projecting lug 5a, 6a, respectively (see also FIG. 29), adapted for cooperation with the respective key 7, 8. The shafts 3, 4 are provided with circumferential grooves 3a, 4a (FIG. 30) each accommodating one of said lugs 5a, 6a.

The shaft 3 extends to the left of the setting carriage 1 (FIGS. 1 and 21–24), and the extension is square in cross-section and slidably supported in a corresponding square aperture in a coupling member 550 which is rotatably mounted in a member 545 secured to the cross-bar 2. The coupling member 550 is provided with teeth 550b (FIG. 1) on its end surface adapted to cooperate with matching teeth on the adjacent end surface of a gear 540 which is rotatably mounted in the member 545 and urged towards the coupling member 550 by a leaf spring 546 secured to the cross-bar 2. The shaft 3 is freely rotatable in the gear 540. As shown in FIG. 1 the cooperating teeth on the coupling member 550 and gear 540 are adapted to be operative in one direction only and to override each other in the opposite direction during yielding of the leaf spring 546.

The coupling member 550 is provided with a projecting pin 550a to which is secured one end of a coil spring 95 (FIGS. 21–24), the other end of which is secured to a pin 2b projecting from the end of the cross-bar 2. The spring 95 is tensioned to bias the coupling member 550 in the counterclockwise direction (FIG. 21). One of the teeth 540' of the gear 540 extends laterally across the member 545 which has a projection 545' serving as an abutment shoulder for said tooth 540'. The gear 540 is disposed straight above the drive rack 240.

The cross-bar 2 is provided with pivot pins 2a projecting one from each end thereof (FIGS. 1, 21, 25, and 26) adjacent to the rear edge of the cross-bar 2. One of said pivot pins 2a is journalled in the partition 500 (FIG. 1) and the other in a bracket 320 secured to the side wall 80 of the casing 90. An arm 330 is secured to the cross-bar 2 and pivotally connected with a link 340 (FIGS. 21, 32 and 33) which, in turn, is pivotally connected with a bell crank 350 rotatably mounted on the shaft 360. The bell crank 350 has an upper arm 350' that is substantially U-shaped in a plan view (FIG. 1), and at the end of each leg of this U-shaped arm 350' a latch 370, 380 (also FIG. 31) is pivotally mounted and biased in the counterclockwise direction (FIGS. 32 and 33) by tension springs 390 secured to the arm 350' and to an extension of the respective latch 370, 380. A tension spring 400 secured to the arm 350' and the stationary cross-plate 100 biases the bell crank 350 in the counterclockwise direction (FIG. 33). The latches 370, 380 are in a position to engage the lateral projections 410' and 420', respectively, from below under certain conditions set forth later in this description.

A lever 183 (FIG. 3) is rotatably mounted on the shaft 360 and provided with a pivotal latch 182 similar to the latches 370, 380 and positioned to be similarly engaged by the lateral projection 410' of the lever 410. Both the lever 183 and the latch 182 are spring biased in the same manner as the bell crank 350 and the latches 370, 380 by tension springs 183a, 182a, respectively. The lever 183 has pivotally attached thereto a link 189 which is pivotally connected with an arm 192' secured to a shaft 191 that also has secured thereto an arm 192 extending into a recess in the frame of an accumulator mechanism 740 that is pivotally supported in the partitions 500 and 600 on pins 188.

A bell crank 183' is rotatably mounted on the shaft 360 and has an arm (not shown) which is identical with the lever 183 and positioned behind the same in FIG. 3. Said arm carries a latch (not shown) engageable with the lateral projection 420' of the lever 420, and both the bell crank 183' and the latch carried thereby are spring biased in the same manner as the lever 183 and the latch 182. A link 184 is pivotally connected with the bell crank 183' and with an arm 185 secured to a shaft 186 supported in the casing 90. An arm 187 is also secured to the shaft 186 and extends into a recess in the frame of an accumulator mechanism 750 which is pivotally supported in the partitions 500 and 600 on pins 188'.

A third accumulator mechanism (multiplication-division-mechanism) 157 (FIG. 34) is pivotally mounted in the casing 90 on a shaft 204 and connected through a link 206 with a lever 208 that is rotatably mounted on the shaft 360 and provided with a pivotal latch 209 similar to the latches 370, 380 and 182 and positioned for engagement with the lateral projection 410' of the lever 410. The lever 208 and the latch 209 are spring biased in the same manner as the lever 183 and the latch 182 through tension springs 208a and 209a, respectively.

Also mounted on the shaft 360 is a bell crank 86 (FIGS. 38 and 41) one arm of which carries a latch member 87 pivotally mounted and biased in the counterclockwise direction by a tension spring 88 secured to said one arm and to the latch member 87. The latch member 87 is in position for cooperation with the lateral projection 420' of the lever 420. A second bell crank 99 is pivotally mounted on a vertical pin 99' connected with the machine casing 90. Said bell crank 99 has one arm pivotally connected with one end of a link 98 and the other arm disposed for engagement with an arm 86a of the bell crank 86, as shown. The other end of the link 98 is pivotally connected with a lever 97 mounted in the machine casing 90 to pivot on a horizontal pivot pin 97' and engaging with its free end a lateral extension 74a of a bell crank 74. The lever 97 is spring biased in the counterclockwise direction by a tension spring 97a secured to said lever 97 and the casing 90. The bell crank 74 is slidably mounted on a horizontal shaft 73 which is rotatably supported by the machine casing 90, and the bell crank 74 is biased towards the right in FIG. 38 by a tension spring 96 secured to said bell crank 74 and to the casing 90.

A gear segment 72 (also FIGS. 19 and 64) is secured to the shaft 73 and provided with a pin 72a engaged in the fork-shaped end of one arm of the bell-crank 74. The other arm of said bell crank 74 carries a roller 74' adapted to cooperate with a cam 75 on the drive shaft 32, as will be explained below. The gear segment 72 is in meshing engagement with a gear segment on one arm of a bell crank 71 mounted for pivotal movement on a vertical pin 71a connected with the machine casing 90. The other arm of said bell crank 71 forms another gear segment in meshing engagement with a gear 470 mounted on the machine casing 90 for rotation on a vertical axis and being in meshing engagement with the gear teeth 12b on the gear rack 12.

A further lever 558 (FIG. 44) is mounted on the shaft 360 and has pivoted thereto a latch 557 similar to the latches 370, 380 and adapted for engagement with the lateral projection 410' of the lever 410. The latch 557 is biased in the counterclockwise direction by means of a tension spring 557a secured to said latch 557 and the lever 558. A link 559 connects the lever 558 with a lever 560 and is pivotally attached to both said levers. The lever 560 is pivotally mounted on a pin 561 secured to the partition 600. Also pivoted to the lever 560 is a link 562 that has one end pivotally connected with an arm of a lever 512.

The lever 512 is pivotally mounted on a pin 515 that spans the space between two identical plates 514, one of which is shown in FIG. 45. Said plates 514 form the side walls of the accumulator mechanism 740 (FIG. 3), and the pivot pins 118 are secured to said plates 514. The other end of the lever 512 is provided with a slot 512a through which a pin 511 extends, and said pin 511 spans the space between two identical plates 503 pivotally mounted together on a pin 510 secured to the plates 514. Accordingly, the plates 503 are pivotable as a unit on the pin 510 in the space between the side plates 514. The plates 503 are additionally held together by pins 504 and 505 and by shafts 506 and 507. Gears 508, equal in number to the racks 13, are mounted for free rotation on the shaft 506 and spaced from each other the same distance as said racks 13. An equal number of gears 509 are mounted in the same manner on the shaft 507 and permanently in meshing engagement with the gears 508. On a shaft 501 mounted in the side plates 514 an equal number of gears 502 are mounted in the same manner, each in inactive position disposed closely below one of the racks 13 but out of engagement therewith.

On the pin 504 extending between the plates 503 a number of levers 513 are pivotally mounted, and each of said levers 513 has a nose 513a positioned for engagement with a wide tooth 508a (FIG. 42 and 46) on the corresponding gear 508. Each lever 513 has a curved lower edge resting upon one arm of a lever 523 that is pivotally mounted on a pin 520 secured to a further lever 521 which, in turn, is pivotally mounted on a shaft 522 secured to the side plates 514. The lever 521 is connected with a pin 523a on the other arm of the lever 523 by means of a tension spring 524 and biased by said spring towards engagement with a cross-bar 525 secured to the side plates 514. Another tension spring 523b connects the pin 523a with the side plates 514 and thereby biases the lever 523 towards engagement with the curved edge of the lever 513.

A shaft 519 mounted in the side plates 514 carries a number of levers 518, and to each of said levers 518 another lever 516 is pivotally secured on a pivot pin 517. Said lever 516 has a slot 516a at the end of one of its arms, said slot 516a embracing the pin 520 on the lever 521. The other arm of the lever 516 has two teeth 516b between which a tooth of the corresponding gear 502 is engageable. A shaft 530 is rotatably mounted in the side plates 514, and a number of cam discs 528 (see also FIG. 47), one for each lever 523, are non-rotatably secured to said shaft 530. The cam discs 528 are identical in shape but mounted on the shaft 530 in an angularly staggered relation of such arrangement that at a certain stage of the rotation of the shaft 530 all of a corresponding number of levers 527 simultaneously occupy the position shown in FIG. 42. Said levers 527, one for each cam disc 528, are pivotally mounted on a shaft 526 secured to the side plates 514, and each of the levers 527 is biased towards engagement with the respective cam disc 528 by a tension spring 229 secured to the lever 527 and to the side plates 514. Each lever 523 has a shoulder 529 in position to be engaged by one of the levers 527 under conditions explained below.

On the shaft 530, a gear 536 (also FIG. 47) is mounted for free rotation, and said gear 536 is in meshing engagement with a gear 535, freely rotatable on one of the pivot pins 188. The gear 535 is in meshing engagement with teeth on the lower edge of the drive rack 240. The gear 536 is biased toward a shoulder on the shaft 530 by a compression spring 537, and said shoulder and the facing end surface of the gear 536 are provided with cooperating members forming a claw coupling, one indicated at 538 in FIG. 47, adapted to become active in one direction of rotation only.

A number of support arms 532, one for each lever 523, are pivotally mounted on a shaft 531 journalled in the side plates 514, and each support arm 532 is biased towards the lever 523 by means of a tension spring 533 secured to the support arm 532 and the side plates 514. Each support arm 532 has a shoulder 532a adapted for cooperation with the respective lever 523, as described below. The shaft 531 is provided with a key 534 (see also FIGS. 43 and 48) which has a limited freedom of angular movement in key grooves 532b in the arms 532. A lever 544 (FIG. 48) is secured to the shaft 531 and disposed in the path of movement of a bell crank 549 when the accumulator mechanism 740 is in its active position, as explained below. The bell crank 549 as well as a further bell crank 546 are pivotally mounted on the partition 600 in the casing 90 and interconnected through a pin 548 secured to the bell crank 546 and engaging in a slot 549a in the bell crank 549. The bell crank 546 is biased towards a fixed pin 546a by a tension spring 546b secured to the bell crank 546 and to the partition 600. One arm of the bell crank 546 is disposed in the path of movement of an arm 745 secured to the machine drive shaft 32.

A bell crank 542 (FIGS. 42 and 45) is pivotally mounted on a shaft 542a secured to the side plates 514, and said bell crank 542 is biased towards the levers 523 by a tension spring 542b secured to the bell crank 542 and the side plates 514. One arm of the bell crank 542 is provided with a latch member 542c extending transversely below the levers 523 and positioned for cooperation with a nose 523' on each lever 523.

A lever 539 is pivotally mounted on a pin 540a secured to the side plates 514, and one arm of said lever 539 has a slot 539a embracing a pin 541 secured to the partition 500. The other arm of the lever 539 is provided with a slot 539b embracing an extension of the pivot pin 517, and an extension 539c of the last mentioned arm is positioned for cooperation with a pin 543 on the bell crank 542 under conditions explained below.

Referring now particularly to FIGS. 50 to 55, inclusive, the shaft 507 is provided with a number of circumferential grooves $507^I$, and each gear wheel 509 is provided with an interior projection $509^I$ movable in the respective groove $507^I$. The shaft 507 also has a longitudinal groove $507^{II}$ in which a key 551 is disposed. Said grove $507^{II}$ and key 551 are semicircular in cross-section, as shown, except that at one end the key is circular, as shown at 551a in FIG. 53, and between the semicircular portion and the circular portion 551a the key is provided with a nose 551¹. One of the plates 503 has an aperture 503a (FIGS. 54 and 55), serving as bearing for the shaft 507. The aperture 503a is provided with a notch 503b shaped to receive the nose 551¹ of the key 551 under circumstances specified below. A spring 552 is disposed with one end portion in a slot 551b in the key portion 551a and with the other end portion in a similar slot 507a in the shaft 507. Said spring biases the key 551 towards the position in relation to the shaft 507 indicated in FIG. 54.

On the end of the shaft 507, a gear 550 (FIG. 49) is secured, and said gear 550 is in meshing engagement with a gear 563 that is freely rotatable on the shaft 501. In the active position of the accumulator mechanism 740, the gear wheel 563 is in meshing engagement with a restorer rack 564 which has slots 564a and 564b through which the drive rod 230 and the support rod 250 extend, respectively. A square pin 565 projects from one side surface of the rack 564, and a lever 566 is pivotally mounted on the drive rod 230 with one end disposed adjacent to said pin 565. A leaf spring 556 secured to the plate 44 (FIG. 3) is in engagement with the lever 566 and biases the same in the counterclockwise direction, as viewed in FIG. 49. Another lever 567 (see also FIG. 39) pivotally secured at 568 to the front wall 900 of the casing 90 and extending transversely of the lever 566 engages said lever 566 so as to counteract the action of the leaf spring 556 thereon. One end of the lever 567 extends into a slot 195 (FIGS. 40 and 84) provided in a slide 194 to be further described below.

The structure and arrangement of the accumulator mechanism 750 are substantially identical with those of the accumulator mechanism 740.

The accumulator mechanism 157, FIGS. 34, 56–61, and 88, includes side walls 205 in which a shaft 212 is secured. A number of gears 480, one for each setting rack 13, are rotatably mounted on said shaft 212 and spaced as said racks 13. An equal number of latch members 401, each adapted for cooperation with one of said gears 480, are slidably mounted on flattened portions of the shaft 204 (FIG. 58) and biased by compression springs 401a towards a bar 205a extending between the side walls 205 and provided with apertures for the latch members 401. On the hub 400a (FIG. 56) of each gear 480 an annular disc member 403 is provided which is secured to the gear wheel 480 by means of three space bolts 402. Said disc member 403 has a gap 403a (FIG. 57) therein which breaks its circumferential continuity.

On a shaft 411 rotatably mounted in the partitions 500 and 600 (FIG. 61), a sensing finger 481 is shiftably and non-rotatably mounted and on the same shaft a sensing rack 412 is non-rotatably mounted. The finger 481 and rack 412 are separately spring biased towards the shaft 212. A lateral extension 410a of the sensing finger 481 and a number of teeth 412' along an edge of the sensing rack 412 are capable of entering the gap 403a in the disc member 403 under circumstances to be explained. The number of teeth 412' equals the number of gear wheels 480.

A further shaft 404 is rotatably mounted in the partitions 500, 600 parallel with the shaft 411. On the shaft 404 a member 405 is shiftably and non-rotatably mounted and provided with arms on which pawls 406, 407 are pivotally mounted. The pawls 406, 407 are biased towards the position shown in FIG. 59 by a tension spring 405' which interconnects said pawls, as shown. The member 405 is provided with an elongated hub 405a upon which a lever 408 and an actuating member 409 are rotatably mounted. The lever 408 has a recess 408a into which a radial blade 413 on a shaft 414 extends. The shaft 414 is rotatably mounted in the partitions 500, 600 parallel with the shaft 404.

The actuating member 409 has an arm 409a which has a fork-shaped end portion slidably embracing a fixed rod 409'. Another arm 409b of the actuating member 409 is in engagement with a slot in the sensing finger 481. The shaft 414 also carries a non-rotatably secured lever 415, and on a bracket 416a secured to the partition 600 a latch 416 is pivotally mounted and biased towards the lever 408 by a tension spring 416b. A fixed pin 416c limits the movement of the latch 416. The lower edge of the lever 408 (FIGS. 59 and 60) is adapted for cooperation with a tooth rack 1' which forms part of the setting carriage 1 and extends longitudinally thereof (compare FIG. 21).

A further accumulator mechanism 760 (FIGS. 92, 93) is secured to a shaft 301 which is pivotally mounted in the partitions 500, 600 and the side wall 80 parallel with the drive shaft 32. The approximate location of said shaft 301 in the casing 90 is evident from a comparison of FIG. 3 with FIG. 97 which both show a shaft 114, the latter figure also showing the shaft 301. FIG. 92 also shows the location of the shaft 301 in relation to the drive rod 230 and drive rack 240 when said members 230, 240 are in their normal position, as shown in FIG. 3.

To the shaft 301 two arms 310, 311 are secured in which a shaft 312 is journalled parallel with the shaft 301. The shaft 312 is provided with a number of circumferential grooves 313 (FIG. 96) corresponding in number to the number of setting racks 13 in the machine, and in each of said grooves 313 a gear 314 is rotatably mounted. A longitudinal key 315 secured to the shaft 312 extends across the grooves 313 and is adapted for cooperation with an interior lug 316 in each of the gears 314, as will be explained. Each gear 314 is provided with one tooth 317 (FIGS. 93–95) which is wider than the other teeth and projects axially from the gear. A cross-bar 318 extends parallel with the shafts 301, 312 between the arms 310, 311 and is secured to said arms. The cross-bar 318 is provided with recesses 319 in one of its edges, each recess accommodating one of the gears 314 but being too narrow to permit the wide tooth 317 to pass therethrough. A helically wound tension spring 321 (FIG. 93) is secured with one end to the cross-bar 318 and with its other end to the shaft 312 and tends to urge the shaft 312 in the counterclockwise direction, as viewed in FIG. 92, thereby tending to rotate the gears 314 until the wide teeth 317 thereof abut the cross-bar 318 on the underside thereof. On the end of the shaft 312 extending through the arm 310 a gear 322 is secured, and said gear 322 is disposed straight below the drive rack 240, while each of the gears 314 is located straight below one of the computing racks 13.

A stop lever 323 (FIGS. 92–94, 97) is rotatably mounted on the shaft 301 and has an edge 324 which extends axially below the gears 314, 322 and is urged by a spring 325 towards engagement with said gears between two adjacent teeth thereof, as shown in FIG. 92. The spring 325 is secured with one end to the stop lever 323 and with the other end to the casing 90. A stop pin 101 secured to the casing limits the movement of the stop lever 323 towards such engagement.

An arm 302 (FIG. 97) is secured to the shaft 301 and connected by means of a link 303 to one arm 304 of a substantially U-shaped bell crank 305 rotatably mounted on the shaft 360. A tension spring 308 secured to the bell crank 305 and the cross-plate 100 (e.g., FIG. 3) tends to rotate the bell crank in the counterclockwise direction (FIG. 97) until surfaces 328, 329 on the bell crank engage the cross-plate 100. To a pair of arms 306, 307 of said bell crank 305 a pair of latches 326, 327 are pivotally secured and urged by tension springs 331 and 332, respectively, in the counterclockwise direction (FIG. 97). Each of said springs 331, 332 is secured to an extension of the respective latch and to the respective arm 306, 307, as shown. The latches 326, 327 are similar to the latches 370, 380 (FIGS. 32, 33) and arranged in similar positions in relation to the projections 410', 420' of the levers 410, 420. A bar 108 is slidably mounted in a fixed part 333 of the casing 90 in a position to engage the latch 326. The bar 108 is pivotally connected at 334 to an arm 107 secured to a rod 106 which is also connected with one arm of a lever 105 mounted on the shaft 114 and having its other arm pivotally connected with a slide 104 which similarly to another slide 111 is mounted in the casing 90 for longitudinal sliding motions (compare also FIG. 79).

An arm 113 secured to the shaft 114 is provided with a laterally projecting pin 113a which by means of a tension spring 115 is urged towards engagement with the end surface of the slide 111. The spring 115 has one end secured to the arm 113 and the other end secured to the slide 111, as shown in FIGS. 79 and 97. An inclined surface 111a on the slide 111 is in position to be engaged by a pin 112 extending laterally from a storage key 109 (see also FIG. 72) which by means of a spring actuated lever 349, pivotally mounted in the casing 90, is lockable in depressed position. The lever 349 projects upwardly through the keyboard (FIG. 72), and its spring 336 is secured to a stationary part of the casing 90 and to an arm 337 on the lever 349.

The slide 104 is provided with an inclined slot 365 adapted for cooperation with a pin 103 projecting laterally from a repeater key 102. The stem of the key 102 has a inclined surface 102′ at its lower end which is in position for cooperation with an arm 121 secured to the shaft 114, as will be explained.

Also secured to the shaft 114 is another arm 338, and to the end of said arm 338 a further arm 339 is pivotally secured which has a depending lug 341 in engagement with an upwardly extending projection 342 on the stop lever 323. On its top edge the arm 339 has an inclined surface 343 disposed to be engaged by the drive rod 230, as will be described below.

An arm 116 is secured to the shaft 114 and pivotally connected with one end of a link 117 which has its other end pivotally connected with one arm of a lever 118 that is pivotally mounted at 119 in the casing 90. The other arm of the lever is in engagement with the rear side of a pin 344 secured to a member 345 which is slidably mounted in the casing 90 in position for engagement with the latch 327. A tension spring 366 is secured to the member 345 and the casing 90 in such a manner as to urge said member 345 towards such engagement.

A substantially U-shaped member 346 having two arms 123 (FIG. 98) is loosely mounted on the shaft 114. A pin 114′ secured to the shaft 114 and extending laterally therefrom is in engagement with a slot 347 in the portion of the member 346 connecting the two arms 123, and the slot 347 is of such configuration as to permit a limited axial movement of the member 346 on the shaft 114 and at the same time prevent rotary movement of said member 346 in relation to the shaft 114. A lever 122 is pivotally mounted at 122′ in the casing 90 and has an upper arm which is accessible from the outside of said casing, while the lower arm of the lever 122 is forked and embraces a lug 348 projecting from one of the arms 123. The pivot axis of the lever 122 (at 122′) is perpendicular to the shaft 114. The arms 123 have inclined surfaces 123a adapted to be engaged in predetermined axial positions of the member 346 by inclined surfaces 124a on the lower ends of keys 124 of which only the lower portions are shown in FIG. 98. One of said keys 124 is a "total" key and the other is a "subtotal" key.

The lever 58, FIG. 62 (compare also FIGS. 4 and 10) carries a pin 58a received in a slot 577a of a lever 577 which is pivotally mounted on a pin 578 secured to the side wall 300 of the casing 90. The lever 577 is biased in the clockwise direction by a tension spring 581 secured to the lever 577 and to the wall 300. The end of the lever 577 has a slot 577b embracing a pin 640 secured to a lever 597 which is non-rotatably secured to a shaft 598 pivotally mounted in the casing 90 transversely thereof.

A pin 582 secured to the lever 597 is disposed to cooperate with a shoulder 583a at the end of an arm 583 which is pivotally connected at 583′ with an arm 584a of a three-armed lever 584 pivotally mounted on the wall 300 at 585. A tension spring 587 connects the arm 583 with the arm 584a, as shown. Another tension spring 586 connects a second arm 584b of the lever 584 with the wall 300 so as to bias the lever 584 in the clockwise direction (FIG. 62).

A third arm 584c of the lever 584 is in engagement with a cam disc 572 which is non-rotatably secured to the drive shaft 32 and engaged by a bell crank 579 pivotally mounted on the wall 300 at 580 and biased in the clockwise direction by a tension spring 579′ interconnecting the bell crank 579 and the wall 300. A pin 579a secured to the wall 300 limits the movement of the bell crank in the clockwise direction. The cam disc 572 carries a pawl 574 pivotally mounted thereon at 573 and restricted in its counterclockwise movement by engagement with a pin 576 secured to the cam disc 572. The pawl 574 is biased in the clockwise direction by a tension spring 575 secured to the pawl 574 and the cam disc 572, as shown.

The pawl 574 is provided with a tooth 574a in position to cooperate with a toothed disc 571 which is rotatably mounted on the drive shaft 32 and secured to the gear 31 (FIGS. 4 and 5) by any suitable means (not shown). The pawl 574 also has a second tooth 574b disposed for cooperation with an extension 577′ of the lever 577, as shown.

A shaft 589, extending across the width of the machine, is pivotally mounted in the casing 90 and has non-rotatably secured thereto an arm 591 and a plurality of levers 590 corresponding in number to the number of rows of keys extending transversely of the drive shaft 32 and containing one or more function keys such as a multiplication key 129. The arm 591 is pivotally connected at 591a with a latch 592 having a latch tooth 592a adapted for cooperation with a lateral projection 583$^I$ on the arm 583. Counterclockwise movement (FIG. 62) of the latch 592 is limited by engagement with a pin 594 secured to the wall 300 of the casing 90, and the latch 592 is biased in the counterclockwise direction by a tension spring 593 secured to said latch and to the wall 300. Said spring 593, accordingly, also biases the arm 591 in the clockwise direction together with the shaft 589.

On a shaft 602′ carried in the casing 90 parallel to the drive shaft 32, a bell crank 602 is mounted. Said bell crank has a lateral projection 602a at the end of one of its arms, said projection being in position to engage the arm 583 as described below. The other arm of the bell crank 602 has a slot 602b in which a pin 264a secured to a bell crank 264 is movably received. The bell crank 264 (compare FIG. 66) is pivotally mounted on the wall 300 at 264b and biased in the counterclockwise direction by a tension spring 264c secured to said bell crank 264 and the wall 300. An arm of the bell crank 264 has a pivotal connection at 264d with a slide 161 to be further described below.

Each of the levers 590 is in engagement with a shoulder 588a in the top edge of a slide 588 which is mounted in the casing 90 for movement transversely of the drive shaft 32. Each of said slides 588 is provided in its top edge with an inclined slot 588$^I$ in which a pin 129a extending laterally from the corresponding key, in the case illustrated the key 129, is movable. A second slot 588$^{II}$ in the top edge of the slide 588 leaves an upwardly extending tooth 588$^{III}$ at said top edge.

A plurality of arms 599 (see also FIGS. 65 and 67), equal in number to the slides 588, are non-rotatably secured to the shaft 598, and each of said arms 599 carries pivotally secured thereto a depending lever 699 guided in an aperture in the plate 43 which also has a guide opening for the key 129, as shown. Obviously, the lever 699 is movable downwardly on either side of the tooth 588^III depending upon the momentary position of the slide 588. In passing it may be remarked here that the plate 43 is, as a rule, not necessarily the same as the plate 43 shown, for example, in FIGS. 11, 16, and 17 since what has been marked 43 for convenience and clearness of description comprises a series of plates, one for each lengthwise row of keys, which are separately removable but lie between the same parallel planes.

A slide 260 (FIGS. 63, 65, 67 and 68), similar to the slide 588 (FIG. 62) and parallel thereto, is slidably supported in the casing 90 and provided with a tooth 260a adapted for cooperation with one of the levers 699 in a manner similar to the tooth 588^III. The slide 260 is disposed close to the keys 129, 730 (compare FIG. 68) and laterally extending pins secured to said keys, such as the pin 134 of the key 730, are engageable with inclined surfaces 260b on the slide 260.

A lever 261 is pivotally secured to the rear end of the slide 260 and biased in the counterclockwise direction by a tension spring 252 secured to the slide 260 and to an arm of the lever 261. A lever 263 is pivotally mounted on the partition 500 at 262 and has a lateral extension 263a which engages the top edge of the lever 261. The lateral extension 263a has at its end a pin 263b (FIGS. 66 and 68) which projects into a slot 161' in the slide 161.

A pin 641' (FIGS. 63, 67, and 68) is secured to the wall 300 and extends into a slot 266a in a link 266 disposed, generally speaking, in the prolongation of the lever 261 and pivotally connected at 641a with a lever 641 which is pivotally supported on a pin 642 secured to the wall 300 of the casing 90. The lever 641 is biased in the clockwise direction by a tension spring 648 secured to the lever 641 and to the wall 300. At its free end said lever 641 carries a rotatably mounted roller 643.

The link 266 is provided with an upwardly projecting lug 266b, and a latch 271 is pivotally connected to said lug 266b at 271a and biased in the counterclockwise direction by a tension spring 271' secured to said latch 271 and to the link 266, as shown in FIG. 67. The latch 271 is disposed for engagement with a lever 272 which is nonrotatably secured to the shaft 39 (FIG. 64).

A further lever 273 is pivotally mounted on the wall 300 at 273' in position for cooperation with the latch 271 (FIGS. 63 and 67), and a rod 267 is pivotally connected at 270a to said lever 273 and extends downwardly therefrom through an aperture (not shown) in a lateral projection 266' of the link 266. The lower end of the rod 267 is adapted for cooperation with an arm 268a of a bell crank 268 which is pivotally mounted on the wall 300 at 268' and biased in the clockwise direction by a tension spring 268b secured to said bell crank 268 and to the wall 300. The movement of the bell crank 268 is limited by engagement with a pin 268c secured to the wall 300, and the other arm of the bell crank 268 is in position for cooperation with an arm 269 which is secured to the drive shaft 32.

The link 266 has a second upwardly projecting lug 266'' which is adapted for cooperation with the lever 415 secured to the shaft 414 (compare FIGS. 59 and 61).

Another slide 243 (FIG. 64) is slidably mounted adjacent to the key 730, and the pin 134 on said key 730 is adapted to cooperate with said slide 243 in the same manner as with the slide 260. The slide 243 is biased towards the right in FIG. 64 by a tension spring 244 secured to the slide 243 and to the wall 300 of the casing 90. The rear end of the slide 243 is pivotally connected at 243a to an arm 242 which is secured to a shaft 239 pivotally mounted in the casing 90 parallel to the drive shaft 32.

An arm 247 is non-rotatably and slidably mounted on the shaft 239 and biased towards the right in FIG. 64 by a tension spring 241 secured to the arm 247 and to the casing 90. Movement of the arm 247 under the influence of said spring 241 is limited by engagement with a lug 12' secured to the rack 12, and through rotation of the shaft 239 the arm 247 may be brought into and out of engagement with any one of a plurality of recesses 245 in the front edge of the cross-plate 100.

The slide 243 is provided in its upper edge with a recess 243' for cooperation with an arm of a bell crank 246 (FIGS. 63 and 64) which is pivotally mounted at 246a on the wall 300 and biased in the counterclockwise direction by a tension spring 246' secured to the bell crank 246 and to the wall 300. An arm of the bell crank 246 is in position to be engaged by the lever 273 (FIG. 63) under circumstances set forth below.

A third slide 670 (FIG. 71) is slidably mounted in the casing 90 for cooperation with the pin 134 on the key 730 in the same way as the slides 260 and 243. A link 669 is pivotally connected with the slide 670 at 670a and with a lever 620 at 620a (also FIG. 68). The upper end of the lever 620 is pivotally connected at 620b with a lever 621 which is pivotally mounted at 621^I on the wall 300 of the casing 90. A slide 622 extends through a slot 621a in a lateral projection 621b of the lever 621 and is pivotally connected at 622' with an arm 623 which is pivotally mounted in the casing 90 at 623^I and biased in the counterclockwise direction by a tension spring 624 secured to the arm 623 and the casing 90.

A latch arm 644 is pivotally connected at 623a with the arm 623 and biased in the clockwise direction by a tension spring 645 secured to the latch arm 644 and to the arm 623, as shown. The latch arm 644 has on its lower edge a cam member 644a adapted for engagement with the roller 643 on the lever 641 (FIG. 68). The latch arm 644 is also provided with a shoulder 644b adapted for cooperating with an arm of a bell crank 618 which is pivotally mounted on a shaft 755 supported in the casing 90 parallel to the drive shaft 32. The bell crank 618 is biased in the counterclockwise direction by a tension spring 618' secured to said bell crank 618 and to the casing 90. The other arm of the bell crank 618 has rotatably mounted thereon a roller 618a adapted for engagement with a cam disc 610 secured to the drive shaft 32.

A lever 619 is also mounted on the shaft 755 and biased in the counterclockwise direction by a tension spring 619^I secured to said lever 619 and to the casing 90. An arm of the lever 619 has rotatably mounted thereon a roller 619a adapted for cooperation with a cam disc 617 which is secured to the drive shaft 32. In its other end portion, the lever 619 has a slot 619b in which a pin 620c secured to the lever 620 is movable. Adjacent to the roller 619a, the lever 619 has a laterally projecting pin 619^II in position to be engaged by a latch lever 665 which is rotatably supported on a shaft 662 pivotally mounted in the casing 90 and extending parallel with the drive shaft 32.

The latch lever 665 is pivotally connected at 665a with a link 667 which has its other end pivotally connected with an arm 668 secured to a shaft 228 (also shown in FIG. 3) which also has another arm 729 secured thereto. Said arm 729 is pivotally connected at 229a to a lever 230' whose arrangement and function will be explained below. The latch lever 665 is provided on its lower arm with a lateral projection 665^I adapted for cooperation with a shoulder 664a on the lower edge of a latch lever 664 which is pivotally connected at 584d with the arm 584b of the lever 584 (FIG. 62) and biased in the clockwise direction (FIG. 71) by a tension spring 664^I secured to the latch lever 664 and the lever 584, as shown. Movement of the latch lever 664 in the clockwise direction is limited by a pin 685 secured to the casing 90.

The latch lever 664 has an extension 664b disposed straight below an arm of a bell crank 663 and adapted to cooperate therewith in a manner to be described. The bell crank 663 is non-rotatably secured to the shaft 662, and its other arm has a lateral extension 663^I positionable in the path of movement of an arm 661 which is secured to the pin 520 (compare FIG. 42). The shaft 662 extends to the lever 560 (compare FIG. 44) and has at its left end a compression spring 684 acting against a part of the casing 90 so as to hold the righthand end of the shaft 662 lightly pressed against an inclined surface 560a on an arm of the lever 560. Accordingly, pivotal movement of the lever 560 results in some degree of translatory movement of the shaft 662 to place the extension 663$^I$ of the bell crank 663 into or out of position for engagement by the arm 661.

Five slides 629, 672, 630, 633, and 631 are guided in an equal number of apertures (not shown) in a vertical support member 300′ (FIGS. 69 and 70) disposed near the lefthand ends of said slides and secured to the casing 90. The slide 629 is pivotally connected at 628a to the upper arm of a lever 628 which is secured to a shaft 672 pivotally mounted in the casing 90. The slide 630 is similarily pivotally secured at 628b to the lower arm of the lever 628. The shaft 672 has at its righthand end in FIG. 68 a gear segment 659 which is in meshing engagement with a gear segment 775 secured to the shaft 404 (compare FIG. 61).

The slide 631 is pivotally connected at 636a to a bell crank 636 which is secured to a shaft 635 pivotally mounted in the casing 90 parallel with the drive shaft 32. Also secured to said shaft 635 is a bell crank 236 (FIG. 68), and a tension spring 637 secured to the bell crank 236 and the casing 90 serves to bias the shaft 635 together with the bell cranks 636 and 236 in the counterclockwise direction (FIG. 68). Below an arm of the bell crank 236 is one arm of a lever 632 which is pivotally mounted at 632$^I$ in the casing 90 and biased by a tension spring 639 in the clockwise direction. The spring 639 is secured to the lever 632 and to the casing 90.

On the arm disposed below the bell crank 236, the lever 632 has a shoulder 632a adapted for engagement with the bell crank 236 under circumstances explained below. The other arm of the lever 632 carries a laterally projecting pin 632b received and movable in a slot 638a in a link 638 which at its upper end is supported on the pin 640 (see FIG. 62). The second are of the bell crank 236 (see also FIG. 74 which shows a portion of the bell crank 236) carries a laterally extending pin 236a disposed below a lateral extension 160a of a latch lever 790 which is pivotally connected at 160b with a bell crank 143 (FIG. 74) and biased in the counterclockwise direction by a tension spring 160c secured to said members 790 and 143. The latch lever 790 has a hook-shaped end portion 160′ adapted to cooperate with a lateral extension 141a on a lever 141 under circumstances set forth below.

The bell crank 143 is mounted on a shaft 144 supported in the casing 90 parallel with the drive shaft 32. The bell crank 143 is biased in the counterclockwise direction by a tension spring 143′ secured to the bell crank 143 and to the casing 90. A pin 140″ secured to the casing 90 limits the movement of the bell crank 143 under the action of the spring 143′. An arm 143a of the bell crank 143 as well as a projection 236′ of the knee lever 236 extend under certain operating conditions into the path of an arm 710 secured to the drive shaft 32.

Another arm 143b of the knee lever 143 is in position to be engaged by a latch 712 which is pivotally mounted on the lever 141 at 141a and biased in the counterclockwise direction (FIG. 74) by a tension spring 142 secured to the latch 712 and the lever 141. The latch 712 has an inclined surface 140a in engagement with a lateral extension 139′ of a lever 139 which is pivotally connected at 139a with a lug 138a of a slide 138 disposed between the plates 43 and 44. The lug 138a is movable in a slot 44b in the plate 44, and the lever 139 together with the slide 138 are biased towards the right in FIG. 74 by a tension spring 139″ secured to the lever 139 and to the plate 44. The slide 138 is engageable with and movable by means of either one of the keys 129 and 730 in the same manner as the slide 260 in FIG. 68.

The lower arm of the lever 141 is pivotally connected at 145a with a link 145, the other end of which is pivotally connected at 145b with a lever 746 pivotally mounted on a shaft 147 carried by the casing 90 and parallel with the drive shaft 32. The link 145, together with the levers 141 and 746, are biased towards the right in FIG. 74 by a tension spring 148 secured to the link 145 and the front end wall 900 of the casing 90. The link 145 extends through a slot 900a in said front wall 900. The upper end of the lever 746 forms a gear segment 146a which is in meshing engagement with a gear 151 supported on a control shaft 125 to be described below.

Returning now to FIGS. 68 and 71, the slide 671 is slidably supported on a pin 671′ (FIG. 68) and has a laterally projecting pin 671a (FIG. 71) received in a slot 673a in an arm of a lever 673 which is pivotally supported in the casing 90 at 673′. At 673″ the lever 673 is pivotally connected with a link 674 which is also pivotally connected at 674′ with a lever 675 supported on a shaft 682 and biased in the counterclockwise direction by a tension spring 675a secured to the lever 675 and the casing 90. The lower end of the lever 675 is engageable by the bell crank 636 which has a pivotal connection at 636a with the slide 631.

The shaft 682 is rotatably mounted in the casing 90 parallel with the drive shaft 32 and biased towards the left in FIG. 71 by a compression spring 683 acting between the righthand end of the shaft 682 and the partition 600. A pin 682$^I$ is secured to the shaft 682 and bears against the member 405 on the shaft 404 (FIGS. 60 and 61), thereby limiting movement of the shaft 682 under the action of the spring 683. The shaft 411 is biased in the clockwise direction (FIG. 68) by a coil spring 411$^I$ secured to the shaft 411 and the casing 90. An arm 626 (FIGS. 61 and 68) is secured to the shaft 411 in position to engage a pin 626$^I$ under the action of the spring 411$^I$. The pin is secured to the casing 90. A lateral extension 626a of the arm 626 is disposed transversely of the lever 621 and below the same.

The upper arm of the lever 673 has a slot 673b engaged by an arm of a lever 676 which is pivotally mounted on the casing 90 at 677 for movement in the horizontal plane. The other arm of the lever 676 carries a pawl 678 pivotally mounted at 676a and biased in the counterclockwise direction by a tension spring 678′ secured to the lever 676 and the pawl 678, as shown. The pawl 678 is engageable with the gear 470 (FIGS. 19 and 64).

The slide 629 is provided with a laterally extending lug 629a, and the slide 630 has a similar lug 630a projecting in the same direction as the lug 629a. A spring 629′ mounted in the casing 90 and biased in the counterclockwise direction (FIGS. 68 and 70) engages said lugs 629a and 630a, as shown. The slide 671 extends through a slot in a bar 671″ which is fixedly mounted in the casing 90, and the slide 671 has a head 671b at its righthand end (FIG. 70) whereby movement of the slide 671 towards the left is limited. The slide 633 is pivotally connected at 634a (FIG. 68) with an arm 634 secured to the shaft 39.

On a shaft 720 (FIG. 70) supported in the casing 90 parallel with the drive shaft 32, a lever 679 is pivotally mounted in such a position as to have its upper arm engageable with the end 674$^I$ of the link 674. The lower arm of the lever 679 is in engagement with a spring 681 which is secured to the casing 90 and biased in the counterclockwise direction. The spring 681 has two bends 681′ and 681″, and a correspondingly shaped end portion of the lower arm of the lever 679 is engageable in either of said bends. Said lower arm also has a shoulder 679′ which, when the lever 679 is in engagement with the bend 681′, is disposed straight below the extension 621b of the lever 621. Obviously, when the extension 621b rests on said shoulder 679′, the end of the slide 622 is in position to abut against the end of the slide 671, as indicated in dotted lines in FIG. 70.

The control shaft 125 (FIGS. 3, 34, 35 and 73–91) is rotatably mounted in forwardly projecting lugs 126 (FIG. 75) on a bar 127 which is secured across the front portion of the casing 90 between the plates 43 and 44 (FIGS. 73, 74). Two leaf springs 128 (FIG. 75) are secured at their rear ends to the casing 90 and are biased against the ends of the bar 127 and the ends of the control shaft 125 which is displaceable longitudinally in the lugs 126. Obviously, the springs 128 tend to maintain the control shaft 125 in the position shown in FIG. 75 and one or the other of the springs 128 tends to return the control shaft 125 to said position when it has been displaced towards one side of the machine or the other.

A disc 137 (FIGS. 75, 81 and 82) is non-rotatably secured to the shaft 125 and provided with a peripheral recess 137a into which a lug 136 extends when the control shaft is in the normal position shown in FIG. 75. The lug 136 is secured to the casing 90, and one of the edges 137' of the disc 137, as well as the adjacent edge 136' of the lug 136, are bevelled as shown in FIG. 82 for a purpose which will be apparent from the description below.

A second disc 155 (FIGS. 75 and 80) is secured to the control shaft 125, and adjacent said disc a leaf spring 154 is secured to the casing 90, as shown in FIG. 80. The disc 155 is of pentagonal shape with one of the sides 155a slightly closer to the center of the disc than the other four sides. In FIG. 80, the shaft 125 occupies its normal inactive position, and the spring 154 bears against a fixed abutment 156 leaving a slight clearance between the spring and the side 155a of the disc 155. In four other rotary positions of the shaft 124, the spring 154 is in engagement with one or the other of the four remaining sides of the disc 155 and tends to restrain rotary motion of the shaft 125.

Two pentagonal discs 133 and 133' are secured to the control shaft 125. Said discs are bevelled in opposite directions as indicated at 133a and 133'a, respectively (FIGS. 73 and 75–77), and disposed opposite the rear ends of slides 132 and 135, respectively, which are correspondingly bevelled. The slides 132, 135 extend through apertures in the bar 127 and are disposed slidably between the plates 43 and 44 and one at each side of a multiplication key 129 and the division key 730 which are provided with the laterally extending pins 131 and 134, respectively.

The slide 132 is provided with a slot 132a which extends downwardly and rearwardly from the upper edge of the slide so that depression of the key 129 forces the pin 131 to enter the slot 132a and move the slide 132 to the right (FIGS. 76 and 77) into engagement with the bevelled surface 133a of the disc 133, thereby forcing the control shaft 125 to the right in FIG. 75.

As shown in FIG. 73, the slide 135 has a slot 135b which extends downwardly from the upper edge of the slide 135 parallel with the key 129. Accordingly, the depression of the key 129 moves the pin 131 into the slot 135b and locks the slide 135 in the position shown in FIG. 73, thereby rendering depression of the key 730 into an inclined slot 135a in the slide 135 impossible when the key 129 is depressed. The slide 132 has a slot 132b (FIG. 76) similar to the slot 135b and adapted to cooperate with the pin 134 on the key 730 in a similar manner, whereby depression of the key 129 is prevented when the key 730 occupies its depressed position. Thus, only one of the keys 129 and 730 can be depressed at a time. Longitudinal movement of the shaft 125 through depression of one of the keys 129, 730 causes the disc 137 to move sideways out of registry with the lug 136 (FIGS. 81 and 82) thereby releasing the control shaft 125 for rotary movement. The bevelled surfaces 136' and 137' ensure this effect even if the longitudinal movement of the shaft 125 should be very slight, and as soon as some rotary motion of the shaft 125 occurs, one end surface or the other of the disc 137 engages the corresponding side of the lug 136 so that reverse longitudinal movement of the shaft 125 is prevented until the lug 136 again is in the recess 137a even if the respective slide 132 or 135 should in the meantime be disengaged from the respective disc 133 or 133'.

The gear 151 (FIGS. 74, 75 and 77) is freely rotatable on the control shaft 125 and provided with end teeth (at 151') adapted for cooperation with similar end teeth on the disc 133. A compression spring 152 surrounding the shaft 125 has its ends in engagement with the gear 151 and a hub connected with the disc 137, thereby biasing the gear towards the disc 133. The teeth at 151' are shaped to be active in one rotary direction only and to slip in the opposite rotary direction thanks to compression of the spring 152. The gear 151 is of sufficient length to maintain meshing engagement with the gear segment 146a in all longitudinal displacement positions of the control shaft 125. The gear segment 146a is provided with a laterally projecting bracket 153 (FIGS. 74, 77 and 83) which in the position of the lever 746 shown in FIG. 83 engages one of the edges of the pentagonal disc 133 and thereby prevents further rotary movement of the shaft 125.

The control shaft 125 carries a plurality of cam members adapted for actuation of various mechanisms in the machine. All of said cam members, except two, are fixedly secured to the control shaft 125 so as to participate in both rotary and longitudinal movements of said shaft 125 which always rotates in the clockwise direction (e.g. FIG. 74) and in rotary stages corresponding to the five sides of the pentagonal discs 133, 133', and 155, as further explained below.

The two exceptions mentioned above are the cam members 172 and 176 (FIG. 75) which are independently slidable along the shaft 125 but constrained to participate in the rotary motion of said shaft by means of key connections 175 and 177, respectively, (compare FIGS. 79 and 86). The cam member 172 is in rotary and non-slidable engagement with a knob member 158 (FIG. 79) which is slidably supported on a fixed rod 171 and extends upwardly through an aperture 158' (FIG. 72) in the keyboard cover plate 52. The cam member 176 has a similar rotary and non-slidable connection with a knob member 159 (FIG. 86) which is slidably supported on the fixed rod 171 and extends upwardly through an aperture 159' (FIG. 72) in the keyboard cover plate 52. The plate 43 is provided with apertures or recesses (not shown) corresponding to the apertures 158', 159'.

A cam member 167 (FIGS. 75 and 78) has two cams, both adapted for cooperation with the forward end of a slide 166 which is slidably mounted between the plates 43 and 44. It is believed to be obvious from FIG. 75 that one of said cams will be in position for cooperation with the slide 166 when the shaft 125 is displaced to the left and the other when the shaft 125 is displaced to the right. The slide 166 has an upright extension 166a provided with a laterally projecting pin 166b (see also FIG. 41) which is movable in a slot 169a in a lever 169. At its rear end the slide 169 is provided with a slot 169b receiving a pin 169' secured to the casing 90.

A tension spring 168 is secured to the slide 166 and the lever 169 and adapted to bias the lever 169 towards the left in FIGS. 41 and 78. At its rear end the lever 169 has an upwardly directed extension 169c with a shoulder 169d adapted for cooperation with a pin 86' which projects laterally from an arm of the bell crank 86. The extension 166a of the slide 166 is provided with a pin 166c carrying a pusher arm 660 adapted for cooperation with the latch 87 (FIGS. 38 and 41) and the latch 380 (FIG. 32).

The abovementioned pusher arm 660 is aligned with a slide 351 (FIG. 99) which is mounted in the casing 90 for longitudinal sliding movement. Said slide 351 has on its rear (lefthand in FIG. 99) end a projection 352 adapted for engagement with the front (righthand in FIG. 41) end of the pusher arm 660 under circumstances to be described. The slide 351 has an inclined slot 353 adapted for cooperation with a pin 354 which projects laterally from the stem of a key 355 serving as a return transfer key. On its front (righthand in FIG. 99) end the slide 351 is provided with a lug 356 in position to be engaged by a latch member 357 which is secured to the shaft 598 (FIG. 62) and, consequently, forced to participate in the rotary movements of said shaft caused by the connection 597, 577, 574, 571 between said shaft 598 and the drive shaft 32, as shown in FIG. 62.

A bell crank 358 is pivotally mounted on the slide 351 at 359 and has one arm connected with one end of a tension spring 361 the other end of which is secured to the slide 351 in such a manner as to urge rotation of the bell crank 358 in the clockwise direction (FIG. 99). Such movement is limited through engagement of the bell crank 358 with the guide bar 690 (compare FIG. 3). A pin 362 extending laterally from one arm of a bell crank 363 is in engagement with the upper edge of the bell crank 358, and said bell crank 363 is pivotally mounted on the shaft 360 (compare FIGS. 1 and 3). The other arm of the bell crank 363 is disposed in a position to be engaged by a pin 364 secured to the cam 140 (FIG. 1) which is indicated diagrammatically by a dotted line in FIG. 99. The bell crank 358 is adapted for engagement with the lower end of the pawl 49 (e.g. FIGS. 19 and 20) indicated diagrammatically in dotted lines in FIG. 99.

A cam member 201 on the control shaft 125 is also provided with two cams, one for cooperation with the rear end of a slide 200' when the shaft 125 is shifted to the left in FIG. 75 and the other when the shaft 125 is shifted to the right. The slide 200' is slidably mounted between the plates 43 and 44 (FIG. 87) and has pivotally connected to its rear end at 200a a lever 202 which is pivotally mounted on the casing 90 at 203 and has its other arm in engagement with a pin 490a which is secured to a pusher arm 490 (see also FIGS. 1, 32 and 33) disposed and adapted for cooperation with the latch 370. The pusher arm 490 is guided on the plate 43 and in a slot an a transverse guide bar 690, as shown in FIG. 87. Said guide bar 690 also serves to guide other slides as indicated, e.g., in FIG. 3. A tension spring 495 is secured to the pusher arm 490 and to the casing 90 to bias the pusher arm towards the left in FIG. 87.

The cam member 176 is provided with three cams, as shown in FIG. 75. Two of said cams 178 are selectively engageable with a slide 179' by shifting the knob member 159 to the right or to the left in FIG. 72, as described above. The third cam 180a is adapted for cooperation with a slide 181 when the knob member 159 is shifted to the left in FIG. 72, and the cam 180a remains inoperative in other positions.

Another cam member 193 has two cams 193a, 193b adapted for selective cooperation with a slide 179 in the two operative shifting positions of the shaft 125. The two slides 179, 179' are similar in arrangement and function and adapted for cooperation with the four keys in row I (FIG. 72) and the four keys in row II, respectively, as indicated in FIG. 3 in connection with the slide 179. The slide 179 is adapted to actuate the latch 182 (FIG. 3) and the slide 179' is adapted to actuate a similar latch (not shown).

As shown in FIG. 3, the slide 179 is provided with four slots each extending downwardly and forwardly from the upper edge thereof. Each of the keys 554, 555, 785, and 570 in key row I is provided with a laterally projecting pin 554', 555', 785', and 570', respectively, adapted to be received in the corresponding slot in the slide 179. Obviously, when one of said keys is depressed, the slide 179 is moved to the left in FIG. 3 sufficiently to place an edge portion of the slide below each of the pins of the other three keys, so as to prevent depression of any of said other three keys. For example, when the key 554 is depressed, the edge portion 179f will be placed below the pin 555' and prevent depression of the key 555, and so on. It is noted that the two cams 193a, 193b of cam member 193 are of different configuration (FIG. 3). The slide 179' is similar to the slide 179 in every respect.

The slide 181, adapted for cooperation with the cam 180a, has three slots 181b, 181c, and 181d (FIG. 86) which are similar to the slots in the slide 179 and adapted for cooperation with pins 787', 788', and 789', respectively, projecting laterally from the keys 787, 788, and 789, respectively. The fourth slot 181a of the slide 181, however, is sufficiently wide to render the pin 786' on the key 786 inoperative in every position of the slide 181. The slide 181 is disposed and arranged to actuate a latch (not shown) similar to the latch 182 in the same manner as the slide 179.

A further cam member 231 (FIG. 75) has a single cam adapted to cooperate with the lever 230' (FIGS. 71 and 89–91) when the control shaft 125 is shifted to the left in FIG. 75. The lever 230' is in engagement with a pin 232 projecting laterally from a slide 197 (FIGS. 85 and 89–91) which has four slots identical with those of the slide 181 and adapted for cooperation with the keys 554, 555, 785, and 570 in the key row I. The slide 197 is in position to actuate the latch 557 (FIG. 44).

Another cam member 196 is provided with two cams selectively engageable with the slide 194 (FIGS. 40, 75 and 84) depending upon the direction of shifting of the control shaft 125. The slide 194 has two inclined slots 194c and 194d similar to the slots 181c and 181d, respectively, of the slide 181 (FIG. 86) and adapted for similar cooperation with the keys 785 and 570, respectively, in the key row I. The slide 194 also has a laterally projecting member 198 which extends across the slide 197 in position to engage the righthand side (FIG. 85) of a lug 199 projecting upwardly from the slide 197. The slide 194 is adapted to actuate the lever 567 (FIGS. 39 and 49) through the slot and pin connection 195, 567' described above.

A cam member 211 has two cams 211a and 211b (FIG. 34) selectively adapted for cooperation with a slide 210a in the two end positions of the shaft 125 referred to above. The slide 210a is mounted for sliding movement between the plates 43 and 44 similarly to the other slides described above and in position for actuation of the latch 209.

A cam member 213 (FIGS. 35 and 75) is in both end positions of the shaft 125 adapted for cooperation with a lever 215 pivotally mounted on a shaft 214 which is supported in the casing 90 parallel with the drive shaft 32. The cams of the cam member 213 are of varying height, as shown, and the lever 215 is provided with shoulders at 215' which are engageable with a lateral extension 216' on a rack 216 in different rotary positions of the control shaft 125 for actuating the printing mechanism 770 for printing various signs in a well known manner. The rack 216 is slidably supported on the rods 230 and 250, as shown, and biased towards the left in FIG. 35 by a tension spring 217 secured to the rack 216 and the casing 90. The rack 216 has teeth engaging a gear in the printing mechanism 770. Lugs 216" on the rack 216 are provided for cooperation with corresponding sign keys in a way that is immaterial to the present invention. The lever 215 is biased towards the cam member 213 by a tension spring 215a secured to the lever 215 and to the plate 44.

The cam member 172 (FIGS. 75 and 79) has a single cam in position for cooperation with an arm 173 when the knob member 158 is moved to the left in FIG. 72. The arm 173 is guided in an aperture in the plate 44 and pivotally connected at 173a with a link 174 which extends through an opening 900b in the front end wall 900 of the casing 90 and is secured to the shaft 114 supported in the casing 90 parallel with the shaft 32.

A further cam member 225 (FIGS. 75 and 88) has a single cam which in the lefthand operating position of the control shaft 125 is in position to engage a bell crank 224 pivotally mounted on a shaft 226 parallel with the drive shaft 32 and supported in the casing 90. The bell crank 224 is biased in the counterclockwise direction (FIG. 88) by a tension spring 227 secured to the bell crank 224 and the casing 90. An arm of the bell crank 224 is in engagement with the upper edge of an arm of a lever 221 which is pivotally mounted on the drive rod 230 and biased by a leaf spring 223 towards the upper edge of the other arm of the lever 221.

The spring 223 is secured to the plate 44, and the lever 221 is disposed adjacent to a tooth rack 218 provided with slots 218' and 218" through which the rod 250 and the drive rod 230, respectively, extend. The teeth on the rack 218 are engageable by a gear 220' in the accumulator mechanism 157. The rack 218 is provided with a laterally projecting member 222 which in a certain position of the lever 221 is engageable by the latter.

Finally, a cam member 162 on the control shaft 125 has two cams separately in position to actuate the slide 161 (FIGS. 66 and 75) in the two end positions of the shaft 125. Said cams of the cam member 162 have cam surfaces of varying height, as shown in FIG. 66.

In operation, when one of the keys 146 is depressed, its offset leg 42a moves down between two of the balls 53 (FIGS. 11 and 16) and thereby prevents depression of any of the other keys 146 or the zero key 81. Through the intermediary of the pin 41, the depression of the key 146 causes rotation of the corresponding key lever 40 in the clockwise direction on the shaft 39, whereby the auxiliary lever 48 is moved to the position shown in FIG. 16 with its arm 48a in close proximity to the control shaft 15. Another result of this rotary movement of the key lever 40 is that the extension 40a of said key lever 40 moves the lever 38 against the action of the spring 94 from the position shown in FIG. 11 to that indicated in FIG. 16, thereby withdrawing the projection 38a from engagement with the stop finger 17a on the control shaft 15 and releasing said shaft 15 for rotation in the counterclockwise direction under the action of the spring 18 which is permanently maintained in tensioned condition, as will be explained below. The rotation of the control shaft 15 continues until the stop finger 17 corresponding to the depressed key 146 engages the arm 48a and causes a slight further pivotal movement of the auxiliary lever 48 to the position shown in FIG. 17 where the arm 48b of the auxiliary lever 48 has caused the lever 50 to rotate slightly on the shaft 39 in the clockwise direction thereby causing a similar rotary motion of the pawl 49 through the engagement of the leg 50a with the projection 49a.

With the setting carriage 1 in its initial position farthest to the right, as shown in FIG. 22, the setting pinion 14 on the shaft 15 is in meshing engagement with the gear 6b which is in permanent meshing engagement with the gear 5b. Obviously, therefore, the abovementioned rotary movement of the shaft 15 will cause said gears 6b, 5b to rotate from their initial position which is shown in FIG. 25 where the suffix "b" has been omitted since the description of the operation applies to all the gears 5, 6. As this rotation of the control shaft 15 is in the counterclockwise direction, FIG. 25, the gear 6 rotates in the clockwise direction and the gear 5 rotates in the counterclockwise direction, while the shafts 3, 4 remain stationary. Each of the gears 14, 6 and 5 has ten teeth, and if the key 146 which was depressed is, for example, the number four key, the rotation of the gears 14, 6, and 5 is interrupted when the gears 6 and 5 occupy the position shown in FIG. 26 where the lugs 6a and 5a have obviously moved a distance corresponding to four teeth away from the position shown in FIG. 25.

The abovementioned rotary motion of the pawl 49 releases said pawl from its engagement with the rack 12 (see FIG. 17) which is thus free to move, together with the setting carriage 1, to the left in FIG. 19 under the action of the spring 76. This movement is discontinued by the engagement of the disc 51 with the next gear 6 (FIG. 14), the peripheral notch 51a in the disc 51 having been moved out of register with the adjacent tooth of the gear 6c by the rotation of the shaft 15 from its initial position. This sequence of events takes place regardless of whether the depressed key 146 is manually maintained in its depressed position or released since, as soon as the shaft 15 begins to rotate, the recessed surface 15c of the shaft 15 is moved out of engagement with the projection 54a of the lever 54 and forced to the left, FIG. 18, thereby placing the latch member 55 in position to prevent return of the key lever 40 and the depressed key 146 to their initial positions.

However, from a comparison of FIGS. 17 and 18 it is obvious that release of the manual pressure on the key 146 does permit the key and key lever to complete a portion of their return movements under the action of the spring 45 before they are stopped by the latch member 55, and this partial return movement of the key lever 40 is sufficient to disengage the arm 48a from the stop finger 17 on the shaft 15, the arm 48b from the lever 50, and the extension 40a from the lever 38. The shaft 15 then immediately resumes its rotation under the action of the spring 18 until the stop finger 17a again engages the projection 38a of the lever 38 in which position the projection 54a again engages the recessed surface 15a and permits release of the latch member 55 from the key lever 40 under the action of the spring 57. The key 146 returns to its initial undepressed position, and the notch 51a of the disc 51 is in register with the adjacent tooth of the gear wheel 6c (FIG. 14) so that the carriage 1 is free to move again under the action of the spring 76 (FIG. 19) until stopped by the returned pawl 49 when the gear 6c is in meshing engagement with the setting pinion 14, as shown in FIG. 23. In this position of the carriage 1 the flange 16b of the bar 16 engages between two teeth of each of the gears 6 and thus prevents rotation thereof.

If only one numeral is to be entered into the setting mechanism (e.g. the digit 4), the setting is now completed. However, if the value to be entered contains additional numerals (e.g. 634), the above described procedure is repeated as many times as required (e.g. for the value 634 twice) by depression of additional keys 146, one at a time, until the additional numerals have been set in successive pairs of the gears 6, 5, the carriage 1 for each setting moving one step further to the left (FIGS. 22, 23). For each setting of a numeral the control shaft 15 makes one complete revolution, and the spring 18 (FIG. 5) is constantly being tensioned through the intermediary of the gear chain connecting it with the motor 37. It is immaterial whether the periods of rotation of the shaft 15 coincide with those of the motor 37 since any "over-run" of the motor or the shaft is absorbed in the friction clutch between the gears 29 and 26. Obviously, the rotation of the gear 20 (FIGS. 4 and 5) in the counterclockwise direction brings the pin 24 back into engagement with the lever 62 and the stop member 25 whereby the contact at 60, 68 is interrupted and further rotation of the gear 20 is discontinued.

If depression of one of the keys 146 should occur when the machine is not connected to a source of electric current, the setting mechanism and associated parts will be operated as described above but the block 22a in the planet gear 22, through engagement with a tooth of the gear ring 21 on the shaft 15 (see FIG. 37), prevents said planet gear to complete a revolution, and as soon as current is admitted to the motor 37, the gear 20 is again rotated in the counterclockwise direction to tension the spring 18 and return the pin 24 to the position shown in FIG. 4. Accordingly, no error in the setting can be caused by such an occurrence.

Depression of the zero key 81 (FIG. 19) causes the pin 82 to enter the slot 79a to move the link, or slide, 79 to the left (FIG. 19). The lever 78, acting on the lateral projection 49a (see also FIG. 20), thereby releases the pawl 49 from the rack 12, and the carriage 1 is free to move to the left under the action of the spring 76. However, the pivotal movement of the lever 78 also releases the lever 84 which permits the spring 85', acting on the pawl 85, to rotate said pawl into engagement with the rack 12 thereby limiting the movement of the rack 12 to a distance less than the distance between two adjacent teeth 12a. Release of the key 81 reverses the movements of the members 79, 78, 49, and 85 under the action of the spring 93 so that the total effect of the depression of the key 81 is a movement of the rack 12 and the carriage 1 a distance equal to the distance between two adjacent teeth 12a to the left in FIG. 19. This distance, of course, is equal to the distance between two adjacent gears 6.

When the setting of the setting mechanism has been thus completed by entering all the numerals of the desired value, the carriage 1 has been shifted to the left (FIG. 1) as many steps as there are numerals in said value and a corresponding number of pairs of gears 5, 6 occupy a position right above the same number of computing racks 13 (three in FIG. 1; one, 13a, in FIG. 23). When now one of the function keys, e.g. the addition key 554 or multiplication key 129, is depressed, a number of operations take place. As stated above, each of the function keys is associated with one of the slides 588, FIG. 62, and depression of one of said function keys, therefore, causes the corresponding slide 588 to move towards the right in FIG. 62. As a result, the shaft 589 is rotated in the counterclockwise direction (FIG. 62) through the intermediary of the corresponding lever 590. The arm 599 is rotated correspondingly and causes the latch 592 to move towards the right against the action of its spring 593. The latch tooth 592a thereby engages the lateral projection 583$^I$ of the arm 583 and pivots said arm 583 on the pivotal connection at 583' in the clockwise direction against the action of the spring 587, whereby the shoulder 583a is withdrawn from below the pin 582 on the lever 597, thus permitting said lever 597 to pivot in the counterclockwise direction together with the shaft 598.

One result of said rotation of the shaft 598 is that the lever 699 on the arm 599 is moved down to the left of the tooth 588$^{III}$ of the slide 588 and thereby prevents return movement of said slide towards the left in FIG. 62. Another result of the rotation of the shaft 598 is that the pin 640 causes the lever 577 to rotate in the clockwise direction on its shaft 578, whereby the lever 58 is caused to rotate in the counterclockwise direction on its pivot 61 and thus close the contacts 60, 68 (compare FIG. 4) to start the motor 37. The pivotal movement of the lever 577 also disengages the same from the tooth 574b of the pawl 574, thereby permitting the tooth 574a to enter between two adjacent teeth of the tooth disc 571 under the action of the spring 575 and thus to cause rotation of the drive shaft 32 in the clockwise direction (FIG. 62) since the cam disc 572 that carries the pawl 574 is non-rotatably secured to said drive shaft 32.

When the cam disc 572 has rotated sufficiently to permit the arm 584c of the lever 584 to enter upon the lower portion of said cam disc 572 under the action of the spring 586, the arm 583 is pulled downwardly to disengage the lateral projection 583$^I$ from the latch 592 which rests on the pin 594. The spring 587 then pulls the arm 583 so as to place the shoulder 583a below the pin 582, and when the arm 583c is again raised onto the higher portion of the cam disc 572, the arm 583 is pushed upwardly, thereby restoring the members 598, 599, 699, 588, 590, 589, 592, 597, 577, 58, and 60 to their initial positions as shown in FIG. 62. Accordingly, the motor 37 is stopped when the drive shaft 32 has completed one full revolution.

Shortly after the beginning of the rotation of the drive shaft 32 the cam 130, FIGS. 1, 3 and 31, raises the roller 430 onto the higher portion of said cam 130 and thereby pivots the lever 410 in the clockwise direction on the shaft 360. As the pusher arm 490 (FIGS. 1, 32, 33, and 87) is held by its spring 495 in engagement with the latch 370, the projection 410' of the lever 410 engages the latch 370 and thereby causes a rotary movement of the bell crank 350 in the clockwise direction (FIG. 33) which through the intermediary of the members 340 and 330 results in a tilting movement of the cross-bar 2 on its pivots 2a in the clockwise direction (FIG. 33). The carriage 1 of the setting mechanism participates in this movement of the cross-bar 2 with the result that the gears 5, 6 are withdrawn from the position (FIG. 25) for engagement with the setting pinion 14 to a position (FIGS. 26 and 27) in which the gear, or gears, 5 disposed above a computing rack, or computing racks, 13 are brought into meshing engagement with said computing rack, or racks 13. At the same time the gear 540 (FIGS. 21-24) is brought into meshing engagement with the drive rack 240.

Following the action of the cam 130 on the lever 410 (compare the diagram in FIG. 36) the cam 110 causes the bell crank 170 to pivot on its shaft 220 in the counterclockwise direction (FIG. 2), thereby through the intermediary of the link 180 and the fork lever 190 moving the drive rod 230 towards the left in FIG. 2. This movement of the drive rod 230 has no direct effect on the computing racks 13 as the drive rod 230 is free to move in the slots 270 of said racks 13. However, the drive rack 240 is forced to follow the movement of the drive rod 230 towards the left (FIG. 21) and thereby rotates the gear 540 and the shaft 3 in the clockwise direction. The gear 540 has ten teeth, and the rotation thereof caused by the shifting of the drive rack 240 amounts to nine tenths of a complete revolution, thus covering a circumferential distance corresponding to nine of the ten teeth.

From FIG. 26 it will be seen that when the shaft 3 (together with the gear 540) has completed a rotation equal to five tenths of a revolution (five teeth) in the clockwise direction, the key 7 engages the lug 5a of the gear 5 which in the example previously referred to had been turned in the counterclockwise direction through an angle corresponding to four teeth. During the remaining movement of the drive rack 240 the gear wheel 5 is thus caused to rotate with the shaft 3 which causes a shifting of the corresponding computing rack 13 a corresponding distance to the left in FIG. 26. The gear 6 being in meshing engagement with the gear 5 rotates the same amount in the counterclockwise direction until the lug 6a engages the key 8 secured to the non-rotatable shaft 4 which occurs at the end of the movement of the drive rod 230 to the left. Similarily, each rack 13 in meshing engagement with a gear 5 is shifted a distance in the direction of the arrow A in FIG. 26 corresponding to the numeral at which that particular gear 5 had previously been set. As the racks 13 are in permanent meshing engagement with the gears in the printing mechanism 770 (FIG. 3), said gears are set correspondingly and the value is automatically printed in a well known manner.

As indicated in the diagram of FIG. 36, the drive rod 230 has a dwelling period in its lefthand end position (approximately at from 160° to 200° of rotation of the cams 110 and 120). At the beginning of this dwelling period the low portion of the cam 130 moves into engagement with the roller 430, thereby causing the projection 410' to be returned to its initial position, whereby the spring 400 returns the bell crank 350 and thereby the setting carriage 1 to their initial positions with the gears 5 out of meshing engagement with the computing racks 13 and the gear 540 out of engagement with the drive rack 240. As soon as this occurs, the coil spring 95 snaps the shaft 3 back to its initial position (FIG. 25) with the tooth 540' of the gear wheel 540 in engagement with the projection 545'.

At the end of the abovementioned dwelling period of the drive rod 230 the cam 120 by acting upon the roller 160 (FIG. 2) begins to return the bell crank 170, the link 180, the fork lever 190, and the drive rod 230 towards their initial positions in an obvious manner. The drive rod 230 thereby engages the righthand ends of the slots 270 of the computing racks 13 which previously had been moved more or less to the left in FIG. 2. Said racks 13 are moved towards the right until they abut against the abutment member 280. During the dwelling period of the drive rod 230, the higher portion of the cam 140 arrives in engagement with the roller 440, thereby causing a rotary movement of the lever 420 in the clockwise direction. Unless the latch 380 (FIGS. 31 and 32) or the latch 87 (FIG. 38) is in position to be engaged by the projection 420′, this movement of the lever 420 is without effect. It will be explained below under what circumstances said latches 380 and 87 are in such engageable position.

At the end of the abovementioned dwelling period of the drive rod 230, the cam 75 (FIGS. 19 and 38), which until then has been rotating disengaged from the roller 74′, arrives into engagement therewith (compare FIG. 36). Through the intermediary of the members 74, 72 and 71 the gear 470 is thereby rotated in the counter-clockwise direction (FIG. 19) to return the rack 12 with the carriage 1 to their initial positions against the action of the spring 76 and with the pawl 49 slipping over the teeth 12a (see FIG. 20). The setting mechanism is now in condition and position to receive another value, as described.

As mentioned above, the described operations occurring during a revolution of the drive shaft 32 were initiated by the depression of a function key. The depression of such a key, e.g. the addition (+) key 554, also has other effects. In FIG. 3 it will be seen that depression of the key 554 causes the slide 179 to move the latch 182 into the path of the projection 410′ of the lever 410 against the action of the spring 182a. As a result the initial rotation of the cam 130 in acting upon the roller 430 as described above will cause the projection 410′ to rotate the lever 183 in the clockwise direction (FIG. 3), and through the intermediary of the members 189—192 the accumulator mechanism 740 will thereby be pivoted on the pins 188 to bring the gears 502 in said mechanism 740 into meshing engagement with the teeth on the bottom edges of the computing racks 13. The same effect is, of course, obtained by depression of any of the other keys 555, 785, 570 in the key row I, FIGS. 3 and 72.

If one of the keys in the key row II, FIG. 72, is depressed, the slide 179′ (FIG. 75) will actuate a latch similar to the latch 182 in a similar manner to place said latch in the path of movement of the projection 420′ of the lever 420 which through its cooperation with the cam 140, as described above, is actuated at a later stage of the rotation of the drive shaft 32 (compare FIG. 36) and thereby through the intermediary of the members 183′ and 184—187 rotates the accumulator mechanism 750 on its pins 188′ to place the gears 502 of said mechanism 750 in meshing engagement with the computing racks 13. The direction of rotation of the gears 502 in the mechanisms 740, 750 will, of course, be dependent upon the direction of movement of the racks 13 during the respective periods of engagement. As the setting of the gears 5, 6 in the setting mechanism determines the movements of the racks 13, as described above, it is obvious that the cooperation of the racks 13 with the gears 502 in the mechanisms 740, 750 causes transfer of the values in the setting mechanism to the respective accumulator mechanisms 740, 750.

When one of the accumulator mechanisms 740, 750 is pivoted to engage the gears 502 with the computing racks 13, as described above, the lever 539 (FIG. 45) rotates on its pivot pin 540a and thereby moves the pin 517 so that the levers 518 (FIG. 42) rotate on their shaft 519 in the counterclockwise direction and thereby disengage the levers 516 from the gears 502 to enable said gears 502 to be rotated by the racks 13. If the operation was initiated by depression of one of the addition, or plus (+), keys 554 or 786, it is obvious from FIGS. 85 and 86 that the slides 197 and 181 remain stationary in which case the gears 508 are in meshing engagement with the gears 502, as shown in FIG. 42. If, however, the operation was initiated by one of the subtraction, or minus (−), keys 555 or 787, the respective slide 197 or 181 is moved to the left in FIG. 85 or 86, respectively. The effect of such a movement will be understood from FIG. 44 where the slide 197 is shown in engagement with the latch 557. Movement of the slide 197 towards the left in FIG. 44 obviously places the latch 557 in position to be engaged by the projection 410′ of the lever 410, and pivotal movement of said lever 410, as described above, will cause rotation of the lever 512 on its pin 515 through the intermediary of the members 557, 558, 559 and 562, thereby causing the plates 503 to pivot on their pin 510 to withdraw the gears 508 from engagement with the gears 502 and at the same time causing meshing engagement to be established between the gears 509 and 502. In this manner the accumulator mechanisms 740, 750 are conditioned to effect addition or subtraction, as desired. The shape and arrangement of the levers 513 are such as to permit said levers 513 to slide on the levers 523 during the movement of the plates 503 without causing any change of the position of said levers 523.

As mentioned above, the gear 535 is in meshing engagement with the drive rack 240 (compare FIG. 47) and thanks to the claw coupling at 538 movement of the drive rack 240 to the left, FIG. 47, leaves the shaft 530 stationary while movement of the drive rack 240 to the right causes rotation of the shaft 530 through 360°. Thereby the cam discs 528 successively swing the levers 527 in the clockwise direction (FIG. 42). When one of the intermeshing pairs of gears 508, 509 has been rotated by the corresponding rack 13 through almost a revolution (ten units) the wide tooth 508a of the respective gear 508 engages the nose 513a of the lever 513, and the completion of said revolution causes said lever 513 to pivot the lever 523 on the pin 520 in the clockwise direction against the action of the springs 523b and 524. This rotary movement of the lever 523 places its shoulder 529 in position to be engaged by the corresponding lever 527 whereby the lever 523 is pulled towards the left in FIG. 42 against the action of the spring 524. The lever 521 is thereby caused to rotate in the counter-clockwise direction which brings the lever 516 registering with the adjacent gear 502 into engagement with said gear and causes rotation thereof through a tenth of a revolution (one decade step).

The rotary movement of the lever 523 also brings the end of said lever into engagement with the shoulder 532a of the support arm 532 whereby return movement of the lever 523 is prevented even when the lever 527 is restored to its initial position during the continued rotation of the shaft 530. At the same time, the latch member 542c has by its spring 542b been brought into engagement with the righthand edge (FIGS. 42 and 45) of the nose 523′ of the lever 523 to prevent return movement of the lever 523 towards the right. Rotation of the lever 539 during renewed coupling of the accumulator mechanism to the racks 13 brings the extension 539c into engagement with the pin 543 to cause counterclockwise rotation of the bell crank 542 against the action of the spring 542b and thereby to release the nose 523′. Continued rotation of the drive shaft 32 (FIG. 48) brings the arm 745 into engagement with the bell crank 546 which through the intermediary of the members 548, 549 and 544 causes rotation of the shaft 531 in the counterclockwise direction to enable the key 534 to rotate the support arm (or arms) 532 in the counterclockwise direction sufficiently to withdraw the shoulder 532a from its engagement with the lever 523, whereby the members 523, 521, 518 and 516 are restored to their initial positions, as shown in FIG. 42.

Subsequent depression of the "sub-total" ( ◇ ) key 785 or 788, or of the "total" ( * ) key 570 or 789 (FIGS.

40, 72 and 84–86) causes one or the other of the slide pairs 194, 197 or 194', 181 (compare FIG. 75) to move towards the left (FIGS. 40, 84–86) whereby, in the case of the slide 194, the movement of the pin 567' (FIGS. 39 and 40) in the slot 195, through the intermediary of the members 567 and 556, causes the the lever 566 (FIG. 49) to engage the square pin 565. Accordingly, when the drive rod 230 is moved to the left in FIG. 49, the rack 564 is caused to move in the same direction and thereby to rotate the gear 563 in the counterclockwise direction. At the same time the slide 197 has again moved the plates 503 (FIG. 44) so as to bring the (minus) gear 550 (FIG. 49) into meshing engagement with the gear 563, and, therefore, the rotation of the gear 563 causes the shaft 507 to be rotated in the clockwise direction (FIG. 49).

This rotation of the shaft 507 brings the edge 551$^{II}$ of the key 551 into engagement with one after the other of the interior projections 509$^I$ depending upon the angular positions of the individual gears 509, and said gears 509 are thereby rotated to their initial position as shown in FIG. 51. As the accumulator mechanism in question (740 or 750) is at this time coupled to the racks 13, said racks are moved to the left (FIG. 3) each in accordance with the restoration movement of the respective gear 509 (and 508, 502) and the resulting setting of the racks represents the desired total or subtotal which is printed as described above. When the accumulator mechanism is then released from the racks 13, the spring 552 snaps the shaft 507 back to its initial position with the edge 551' in the recess 503c, as shown in FIG. 54. Accordingly, the accumulator mechanism is ready for another operation.

To summarize briefly, an addition e.g. in the accumulator mechanism 740 is initiated by depression of the plus key 554 when the amount to be added has been set in the setting mechanism. Through the intermediary of the slide 179 the latch 182 is thereby pivoted into the path of the projection 410' which during the ensuing rotation of the drive shaft 32 causes the gears 502 to be brought into engagement with the racks 13. Through the described restoration of the gears 5, 6, the individual racks 13 are then moved to the left (FIG. 3) a distance corresponding to the setting of said gears 5, 6, and the gears 502, 508, 509 are rotated accordingly so that the amount in the setting mechanism is transferred to the accumulator mechanism 740 and also printed. When during this procedure one or more of the gears 508 move from "9" to "0," the corresponding lever 513 is pivoted by the wide tooth 508a and causes a rotary movement of the corresponding lever 523 in the clockwise direction so as to permit the support arm 532 to swing in below the lever 523 and prevent restoration thereof.

The continued rotation of the drive shaft 32 causes disengagement of the gears 502 from the racks 13 (compare FIG. 36). When the drive rod 230 returns towards the right (FIG. 3), the cam discs 528, driven by the members 535, 536, 538, and 530, pivot the levers 527 in the clockwise direction (FIG. 42) one after the other beginning from the right in FIG. 47 so that those of the levers 523 which have previously been rotated by a gear 508 are pulled towards the left (FIG. 42) and retained there by the support arms 532 and the latch member 542c. This movement of the levers 523 also causes the corresponding levers 516 to engage the gears 502 in the next higher decade positions and thereby to rotate said gears together with the corresponding gears 508, 509 by one tooth.

In a subtraction the operation is similar with the exception that, as mentioned above, the plates 503 are pivoted so as to disengage the gears 508 from the gears 502 and to bring the gears 509 in meshing engagement with the gears 502. Therefore, regardless of whether the gears 502 are rotated by the racks 13 or by the levers 516, the gears 508, 509 will rotate in the opposite direction to their direction of rotation during addition.

In either case (addition or subtraction) and the restoration of the gears 508, 509 to their zero position and the transfer of the value therein to the racks 13 are accomplished through the intermediary of the rack 564 and gear 563, as described above, upon depression of a "total" or "subtotal" key. During the previous phase of addition or subtraction the rack 564 was, of course, not moved since the lever 566 was not in position to engage the square pin 565. The drive rod 230 simply slides back and forth in the slots 564a. The transfer of the value (total or subtotal, as the case may be) to the racks 13 enables the printing of said value, and the restoration of said racks 13 to their initial position is accomplished through the completion of the return movement of the drive rod 230. The setting mechanism is returned to its initial position through the action of the cam 75 as described above and is ready to receive another value to be entered by means of the numeral keys.

When a multiplication is to be performed, the multiplier is entered into the setting mechanism by means of the digit keys 146, 81 and immediately transferred to the computing racks 13 as described, and then the multiplication key 129 is depressed whereby the motor 37 is started through closing of the contacts at 60, 68 as described above with reference to FIG. 62. Another immediate result of the depression of the key 129 is that its pin 131 (FIGS. 75, 76, 77) through cooperation with the slot 132a in the slide 132 moves said slide 132 towards the right in FIGS. 76 and 77 and downwards in FIG. 75 so that the inclined surface 132' engages the inclined surface 133a on the disc 133 and thereby displaces the control shaft 125 towards the right in FIG. 75 against the action of the righthand leaf spring 128. Obviously, the depression of the key 129 does not move the slide 135 (FIG. 73) since the pin 131 simply moves down in the straight slot 135b without moving said slide 135. Said pin 131 does, however, lock the slide 135 against movement, as evident from FIG. 73, thereby preventing depression of the division key 730.

A further immediate effect of the depression of the key 129 is that the pin 131 moves the slide 138 with the lever 139 towards the left (FIG. 74) against the action of the spring 139", thereby causing the latch 712 to rotate in the clockwise direction into position for engagement by the arm 143b of the bell crank 143 when the arm 143a of said bell crank 143 is engaged by the arm 710 during the rotation of the drive shaft 32. The resulting clockwise rotation (FIG. 74) of the lever 141 causes a swift counterclockwise rotation of the lever 746 through the intermediary of the link 145 and against the action of the spring 148. As a result the gear 151 is rapidly rotated in the clockwise direction (FIG. 74) until stopped by the engagement between the bracket 153 and one of the edges of the pentagonal disc 133. The shaft 125 is forced to participate in this rotation of the gear 151 through one fifth of a revolution due to the engagement of the teeth at 151', and the engagement between bracket 153 and disc 133 prevents the rapid rotation of the shaft 125 from exceeding one fifth of a revolution. Thus, the control shaft 125 is stopped in the new position while the members 151, 746, 145, 141, and 143 are free to return to their initial positions under the action of the springs 148 and 143' thanks to slippage of the teeth at 151' against the action of the spring 152 and as soon as the arm 710 during the continued rotation of the drive shaft 32 becomes disengaged from the arm 143a.

As evident from FIGS. 34 and 35, the rotation through one fifth of a revolution in the clockwise direction of the control shaft 125 causes the cam members 211a and 213 to become active upon the slide 210a and the lever 215, respectively. The lever 215 is rotated thereby in the clockwise direction (FIG. 35) sufficiently to place the lefthand shoulder at 215' in the path of movement of the projection 216' of the rack 216, so that when the drive rod 230 is subsequently moved to the left (FIG. 35), as described above in connection with addition and subtraction, the spring 217 is free to move the rack 216 towards the left until engagement occurs between the extension 216' and the aforesaid shoulder at 215'. This stops the gear in the printing mechanism 770 in position for the sign × (for multiplication) to be printed.

In the meantime, the cam 211a (FIG. 34) has caused movement of the slide 210a towards the left so as to place the latch 209 in the path of movement of the projection 410' of the lever 410. When said projection 410' is moved downwardly (FIG. 34), as described above in connection with addition and subtraction, the members 208, 206, and 205 are caused to rotate in an obvious manner to move the gears 480 (FIG. 59) of the accumulator mechanism 157 into meshing engagement with the computing racks 13. The appropriate racks 13 are then moved towards the left (FIG. 34) by the restoration of the corresponding gears 5, 6 in the setting mechanism and thereby the multiplier is entered into the accumulator mechanism 157 by corresponding rotation of the respective gears 480 in the clockwise direction (FIG. 34). As described above, the setting mechanism is returned to its initial position (FIG. 22) by the action of the cam 75 (FIG. 19), and the computing racks 13 are restored to their initial position by the return movement of the drive rod 230 after the accumulator mechanism 157 has been disengaged from the racks 13 by the spring 208a following the return movement of the projection 410'.

Next, the multiplicand is entered into the setting mechanism by means of the digit keys 146, 81 and the knob member 159 is moved to the right in FIG. 72, whereby the lefthand cam 178 (FIG. 75) on the cam member 176 is moved into register with the slide 179' which through the members 183' and 184–187 (FIG. 3) is operatively connected with the accumulator mechanism 750, corresponding to key row II (FIGS. 72 and 75). The depression of the multiplication key 129 also causes the slide 260 to move to the left (FIGS. 65, 67 and 68) which prior to the rotary movement of the control shaft 125 has no effect upon the link 266 since the lever 261 is maintained out of register with the end of the link 266 by the extension 263a of the lever 263, as shown in FIG. 68. However, the initial rotation of the control shaft 125 causes the cam portion 162' (FIG. 66) to move the slide 161 to the left until the bell crank 264 occupies the position 264' whereby the lever 263 slides in the slot 161' and is raised sufficiently to permit the spring 252 to place the lever 261 in register with the link 266, as shown in FIG. 67.

The next step is to again depress the multiplication key 129 whereby the motor 37 is again started, as described with reference particularly to FIG. 62, and the control shaft 125 is rotated through another fifth of a revolution as described with reference to FIG. 74 which leaves the lever 215 (FIG. 35) in an unchanged position, viz. for printing of × (multiplication sign). After the printing, the rack 216 is retracted by a mechanism not shown without altering the position of the lever 215, and the accumulator mechanism 760 is moved to active position by the cam 172 acting through the intermediary of members 173, 174, 114 against the action of the spring 115 and without altering the position of the slide 111. Another effect of this second rotary movement of the control shaft 125 is that the cam 193a (FIGS. 3 and 75) actuates the slide 179 which through the intermediary of the members 182, 183, 189—192, and 410' causes the accumulator mechanism 740 to be coupled to the computing racks 13 during the period determined by the rotation of the cam 130.

A further effect of the same rotary movement of the control shaft 125 to its third position is that the cam member 162 (FIGS. 66 and 75) moves the slide 161 further towards the left (FIG. 66) and thereby causes the bell crank 264 to occupy the position 264'', thereby causing the lateral projection 602a of the bell crank 602 (FIG. 62) to engage the arm 583 and prevent the same from returning to the position shown in FIG. 62. Accordingly, the contacts at 60, 63 are maintained closed and the pawl 574 is maintained in driving engagement with the drive shaft 32 causing said drive shaft to rotate continuously through repeated revolutions.

As it is essential that during this continuous rotation of the drive shaft 32 the setting mechanism not be returned to its initial position (FIG. 22), the cam member 167 (FIGS. 75 and 78) also becomes active in the second rotary movement of the control shaft 125 in that it moves the slide 166 towards the left (FIGS. 41 and 78) against the action of the spring 168. The pusher arm 660 (FIGS. 38 and 41) participates in the motion of the slide 166 and brings the latch member 87 into the path of movement of the projection 420' of the lever 420. Accordingly, every time the projection 420' is moved downwardly through the action of the cam disc 140, the bell crank 86 is rotated in the clockwise direction (FIGS. 38 and 41) and through the intermediary of the members 86a, 99, 98, 97 and 74a moves the bell crank 74 towards the left in FIG. 38 against the action of the springs 97a and 96, thus bringing the roller 74' out of the path of movement of the cam 75. Accordingly, the carriage 1 with the setting mechanism remains stationary during the continuous rotation of the drive shaft 32. The arm 710 (FIG. 74) engages the bell crank 143 once for every revolution of the drive shaft 32 but since the latch 712 is out of the path of movement of the arm 143b, this has no effect upon the control shaft 125 which, therefore, remains in its angular position. Said control shaft 125 is prevented from longitudinal displacement through side engagement between the members 136 and 137 (FIGS. 75, 81 and 82) as long as the rotary position of the disc 137 is such that the lug 136 is out of register with the recess 137a.

At the beginning of the continuous rotation of the drive shaft 32 (the multiplication proper), the multiplicand is thus set up in the setting mechanism and the multiplier is in the accumulator mechanism 157. Each revolution of the drive shaft 32 enters the multiplicand in the accumulator mechanism 740 from the setting mechanism in the manner described in connection with addition, and the setting mechanism is then re-set by the return movement of the computing racks 13. At the same time, the respective gears 480 in the accumulator mechanism 157 are rotated in the counterclockwise direction (FIG. 59), one tooth for each revolution of the drive shaft 32, until the multiplier has been exhausted, and this action will now be described with reference particularly to FIGS. 56–61, 67 and 68.

When the lever 261 is rotated to the position shown in FIG. 67, as described above, and the multiplicator key 129 is depressed the second time, said lever 261 causes the link 266 to slide towards the left (FIGS. 67 and 68) on the support pin 641'. Thereby the lever 641 is pivoted in the counterclockwise direction against the action of the spring 648, and the roller 643 is moved towards the left (FIG. 68) allowing the latch arm 644 to rotate in the clockwise direction under the action of the spring 645 so as to place the shoulder 644b in the path of movement of the bell crank 618. The rotation of the drive shaft 32 in the clockwise direction (FIG. 68) causes the cam disc 617 to rotate so as to permit the spring 619$^I$ to rotate the lever 619 in the counterclockwise direction, thereby through the intermediary of the lever 620 causing the lever 621 to rotate in the clockwise direction and to press downwardly on the extension 626a of the arm 626 which rotates the shaft 411 (compare FIGS. 57 and 61) in the counterclockwise direction (FIGS. 57 and 68) against the action of the spring 411$^I$. As evident from FIG. 57, this will cause the members 410 and 412 to press against the peripheral edges of those of the discs 403 that are not in the position shown in FIG. 57, i.e. those that were rotated when the multiplier was entered in the accumulator mechanism 157.

Continued rotation of the drive shaft 32 causes the cam disc 610 to rotate the bell crank 618 in the clockwise direction (FIG. 68) against the action of the spring 618', and thereby the slide 622 is moved towards the right through the intermediary of the members 644 and 623. The slide 622 moves the slide 630 towards the right (FIG. 68), and through the intermediary of the members 628, 672, 659, and 775 the shaft 404 is rotated in the clockwise direction (FIGS. 59 and 68) together with the member 405 which rotates the respective gear 480 in the counterclockwise direction (FIG. 59) one tooth at a time as many times as it had previously been rotated in the clockwise direction. At the end of this procedure the gap 403a in the disc member 403 is in register with the extension 410a of the lever 410 which drops into said gap 403a and locks the gear 480 in its zero position. The sensing rack 412 is prevented from entering the gap 403a as long as there are other disc members 403 (with gears 480) in angular positions other than the zero position, i.e. as long as the accumulator mechanism 157 still contains a portion of the multiplier.

The entrance of the lever 410 in the gap 403a causes a rotary motion of the shaft 411 which allows the end of the slide 622 (FIG. 68) to drop into register with the slide 633, and when the latter is thereby moved to the right the shaft 39 rotates the pawl 49 (e.g. FIG. 64) out of engagement with the rack 12 so that the carriage 1 moves one step towards the left (FIG. 64). This is repeated once for each revolution of the drive shaft 32 until all the gear wheels 480 which had been moved from zero position are restored and the sensing rack 412 is permitted to enter the gaps 403a. The required stepwise longitudinal displacements of the lever 410 together with the setting mechanism during this procedure are effected through the described movements of the link 266 to the left in FIGS. 67 and 68. The lug 266'' of said link 266 engages the lever 415 (FIGS. 59, 61 and 67) and rotates the same with the shaft 414 in the counterclockwise direction (FIGS. 59 and 67), whereby the blade 413 swings the lever 408 in the clockwise direction to place the lower edge of said lever 408 in one of the spaces 1' between two of the teeth on the carriage 1 and to disengage the lever 408 from the latch 416 (FIGS. 59 and 60). The member 409, being freely rotatably connected with the member 405, has its arm 409b in a slot in the lever 410 so that the lever 410 and the members 405, 406, 407 obviously participate in the stepwise displacements of the setting mechanism (carriage 1).

When the multiplication is completed and the sensing rack 412 enters the gaps 403a, as described, the shaft 411 is rotated so as to place the slide 622 in register with the slide 631 (FIG. 68) which is then moved to the right in FIG. 68. Thereby the members 636, 635 and 236 are rotated in the clockwise direction against the action of the spring 637, and the bell crank 236 engages the shoulder 632a when the lever 632 is rotated by the spring 639. Accordingly, return movement of the bell crank 236 and connected parts is prevented. The pin 236a, moving down, permits the spring 160c to rotate the latch lever 790 accordingly which brings the end portion 160' into position for engagement with the lateral extension 141a (FIG. 74) of the lever 141 to enable said lever 141 to cause a further fifth of a revolution of the control shaft 125 when the arm 710 again engages the bell crank 143, as described above.

During this phase of the operation, the cam member 167 (FIG. 78) permits restoration of the pusher arm 660 so that the cam 75 (FIG. 38) again becomes effective to cause restoration of the setting mechanism in an obvious manner. The cam member 201 (FIGS. 75 and 87) also becomes effective to cause withdrawal of the pusher arm 490 from the latch 370 (FIG. 33) whereby further operation of the accumulator mechanism 740 by the racks 13 is prevented. The accumulator mechanism 740 is then restored and the product is added in the accumulator mechanism 750 and printed as previously described. The cam member 196 (FIGS. 75 and 84) becomes active and pushes the slide 194 towards the left in FIG. 84, whereby the projection member 198 through engagement with the lug 199 causes the slide 197 to participate in its movement to cause restoration of the accumulator mechanism, as described above. The last fifth of a revolution of the control shaft 125 releases the slide 161 (FIG. 66) so that the arm 583 (FIG. 62) is released by the bell crank 602 and enabled to interrupt the machine operation in the obvious manner. Thereby the pin 640 (FIGS. 62 and 68) is moved upwardly to rotate the lever 632 and release the bell crank 236, whereby the members 636, 635, 631, and 790 are restored to their initial positions together with other members associated therewith, as described.

In carrying out a division, the dividend is entered in the setting mechanism by depressing the proper digit keys 146, 81, as described. It will be noted that in the stepwise movement of the setting mechanism to the left (FIG. 64) the lug 12' thereby causes a corresponding movement of the arm 247 in the same direction against the action of the spring 241. When the entering of the dividend has been completed and the machine again has come to a standstill, the division key 730 is depressed which has several effects. The motor 37 is started by closing of the contacts at 60, 68 through the operation of the mechanism described particularly with reference to FIG. 62 which also causes rotation of the drive shaft 32, as described. The carriage 1 is tilted by the cross-bar 2 to bring the setting mechanism into operative engagement with the computing racks 13, and the accumulator mechanism 740 is engaged with said racks 13 as described above, whereby the dividend is transferred from the setting mechanism to the accumulator mechanism 740. The accumulator mechanism 740 is then disengaged from the racks 13 which are restored to their initial position and the setting mechanism is shifted back to its initial position, as described.

However, the depression of the division key 730 also causes displacement of the slide 243 towards the left in FIG. 64 against the action of the spring 244, and at the proper time an arm of the bell crank 246 enters the recess 243' under the action of the spring 246', whereby the slide 243 is locked in the shifted position. The shifting of the slide 243 causes rotation of the shaft 239 and thereby the arm 247 is entered into one of the recesses 245 in the edge of the cross-plate 100 and thus prevented from following the lug 12' when the setting mechanism is returned to its initial position.

The depression of the key 730 also causes shifting of the slide 260 (FIGS. 65 and 67) which, however, at this time is without effect since the lever 261 has not yet been moved to proper position for engagement with the link 266. Such movement of the lever 261 is now accomplished by the cam member 162 (FIG. 66) and associated parts during the rotation of the control shaft 125 through its first fifth of a revolution, as explained in connection with the multiplication operation. This rotary movement of the control shaft 125 is, of course, effected through the operation of the slide 138 and associated parts as described with particular reference to FIG. 74.

Another effect of the depression of the division key 730 is that the slide 670 (FIG. 71) is shifted to the left, thereby through the intermediary of the link 669 causing rotation of the lever 620 in the clockwise direction on the pivot 620b. The pin 620c thus slides in the slot 619b to the position shown in FIG. 71 and thereby the lever 621 is swung in the counterclockwise direction until the end of the slide 622 is in register with the slide 629, as shown. As mentioned above, the lever 261 (FIG. 68)

has not yet been placed in position to actuate the link 266 and, therefore, the ensuing rotation of the cam disc 610 and bell crank 618 is without effect on the slide 622.

When the first revolution of the drive shaft 32 has thus been completed, the divisor is entered in the setting mechanism and the division key 730 is again depressed. The lever 261, now being in register with the link 266, moves said link 266 to the left (FIG. 67) whereby the latch 271 causes a rotary movement of the lever 272 and the shaft 39 in the clockwise direction so as to disengage the pawl 49 (FIG. 64) from the rack 12 and permit the spring 76 to shift the setting mechanism until the lug 12' abuts against the arm 247. Thereby the gears 5, 6 containing the first digit of the divisor have automatically been brought to the position previously occupied by the gears 5, 6 which contained the first digit of the dividend, and the machine is thus in condition for beginning the division proper.

The shifting of the link 266 also moves the rod 267 (FIGS. 63 and 67) into position for engagement by the arm 268a of the bell crank 268 so that when, shortly before the completion of one revolution of the drive shaft 32, the arm 269 actuates the bell crank 268, the rod 267 is moved upwardly to disengage the latch 271 from the lever 272 through the intermediary of the lever 273. The spring 93 (FIG. 64) is then free to return the pawl 49 into engagement with the rack 12. The rotary movement of the lever 273 also brings the bell crank 246 (FIGS. 63 and 64) out of the recess 243' of the slide 243 so that, at a later stage, when the key 730 is released from its depressed position, the arm 247 is permitted to return to its initial position under the action of the spring 241.

The abovementioned second depression of the division key 730 also causes engagement of the coupling 89 (FIG. 62), rotation of the control shaft 125 through another fifth of a revolution, and through the intermediary of the members 266", 415, and 414 (FIGS. 59–61) connection between the accumulator mechanism 157 and the setting mechanism, as explained in connection with multiplication. Through the intermediary of the cam member 162, the slide 161 and associated members, the bell crank 602 (FIG. 62) is engaged with the arm 583 so as to permit continuous rotation of the drive shaft 32, as explained, and by means of the cam member 231 (FIGS. 89 and 90) acting on the lever 230' and thereby on the slide 197 the accumulator mechanism 740 is changed to minus position through the means described particularly in connection with FIG. 44, i.e. the gears 508 (FIG. 42) are brought out of engagement with the gears 502 and the gears 509 are brought into engagement with said gears 502. The accumulator mechanism 740 is coupled to the computing racks 13 as described previously.

For each revolution of the drive shaft 32 the divisor contained in the setting mechanism is now subtracted in the accumulator mechanism 740 which at the beginning of this operation contains the dividend. Each of said revolutions is registered in the accumulator mechanism 157 in a manner that will now be explained. The cam disc 617 (FIG. 71) rotates to permit the lever 619 to respond to the action of the spring $619^I$ so that the guide member 621 is pulled down to the position in which the slides 622 and 630 are in register. As explained previously, the cam disc 610 then causes the slide 622 to shift the slide 630 to the right and thereby to rotate the first gear 480 one step in the counterclockwise direction (FIG. 59) through the intermediary of the members 628, 672, 659, 775, 404, and 406. This is repeated until the accumulator mechanism 740 passes below "zero" when the gear 508 (FIG. 42) of the highest decade in the accumulator mechanism 740 initiates a shifting of the lever 523 through the corresponding lever 527 and thereby a movement of the arm 661 to the left (FIG. 71).

The minus coupling of the accumulator mechanism 740 (compare FIG. 44) causes the lever 560 to rotate in the clockwise direction whereby the inclined surface 560a permits the spring 684 to shift the shaft 662 towards the right (FIG. 71) so as to bring the lateral extension $663^I$ of the bell crank 663 into the path of movement of the arm 661. Accordingly, the arm 661 is now rotated in the counterclockwise direction and presses the latch lever 664 downwards against the action of the spring $664^I$ until the shoulder 664a engages the projection $665^I$ of the latch lever 665. At the end of the revolution of the drive shaft 32, the cam disc 572 (FIG. 62) rotates the lever 584 in the counterclockwise direction, and thereby the latch lever 664 is shifted to the right (FIG. 71) causing the latch lever 665 to latch over the pin $619^{II}$ so that during the continued rotation of the cam disc 617 the lever 619 is prevented from responding to the action of its spring $619^I$. Therefore, the slide 622 shifts the slide 629 to the right and causes the shaft 404 to rotate in the opposite direction so that the pawl 407 (FIG. 59) rotates the gear 480 one step in the clockwise direction.

The excessively subtracted divisor must also be added again in the accumulator mechanism 740, and this is accomplished by the latch lever 665 at the same time through the intermediary of the link 667, the arm 668, the shaft 228, the arm 729 and the lever 230' in association with the cam member 231 and slide 197 (compare FIGS. 89–91). Obviously, the abovementioned counterclockwise rotation of the latch lever 665 causes the lever 230' to be pulled downwardly to the position shown in FIG. 91, thereby permitting the slide 197 to move to the right (FIG. 44) to release the latch 557 from the lever 410 so that the accumulator mechanism 740 in this rotation of the drive shaft 32 is conditioned for addition.

The abovementioned shifting of the slide 629 to the right (FIGS. 68, 70 and 71) causes the slide 630 to move in the opposite direction and thereby to rotate the lever 679 in the clockwise direction into the bend 681' of the spring 681. During the revolution of the drive shaft 32 following the addition operation, therefore, the lever 621 is prevented from passing the shoulder 679' in the downwardly direction, and the slide 622 shifts the slide 671 so that through the intermediary of the members 673, 676, 678, and 470 the setting mechanism is shifted one step to the right (FIG. 64).

During the abovementioned addition revolution also the last gear 508 effected a decade shifting and thereby moved the arm 661 to the left (FIG. 71), but this movement is without effect since in the initial position of the lever 560 the shaft 662 occupies its lefthand end position (FIG. 71) so that the lateral extension $663^I$ no longer is in the path of movement of the arm 661. Therefore, the members 665, 667, 668, 228, 729 and 230' remain in the position shown in FIG. 71 and the subtraction revolutions continue in the lower decade, or decades.

The described procedure is automatically repeated until the lowest decade position has been reached in the accumulator mechanism 157. The last step in this repeated shifting causes the lever 408 to shift the shaft 682 (FIG. 71) and lever 675 into position for engagement between said lever 675 and the bell crank 636. When, following the subtraction operation, the addition revolution is carried out, the slide 622 again engages the slide 671 and through the ensuing shifting of the setting mechanism another step to the right (FIG. 64) the lever 675 is rotated in the counterclockwise direction and rotates the bell crank 636 in the clockwise direction together with the shaft 635 and the bell crank 236 (FIG. 68) thereby, as during multiplication, causing rotation of the control shaft 125 through another fifth of a revolution.

Since the control shaft 125 is displaced towards the left (FIG. 75), the effect of the following stepwise rotations of the control shaft is to some extent different from that occurring during multiplication. In the third position, the restoration of the accumulator mechanism 740 is first effected through the intermediary of the members 196, 194, 567, 566, 564, 563, 550, 507, and 551 in an obvious manner, and any "rest" remaining therein from the division is removed and printed. In the fourth position, the accumulator mechanism 157 is coupled into active position through the members 211, 210a, 209, 208, 206, and 205, and the quotient standing therein is removed through the mechanism of FIG. 88 and printed. In the final phase the control shaft 125 is restored to its initial position and all operated parts are also restored and the machine brought to a standstill as in a multiplication.

If in a computation it is desired to store a certain value for future use, the accumulator mechanism 760 is brought into operation. Such storing becomes necessary, for example, in the performance of a multiple multiplication of the type $a \times b \times c$.

If the value to be stored stands in the setting mechanism, a function key (e.g. + or −) is depressed. The depression of the function key causes the setting mechanism to move into proper position above the computing racks 13 and initiates the rotation of the drive shaft 32, as described above. Thereby, the proper gears 5 are moved into meshing engagement with the corresponding computing racks 13, and during the ensuing movement of the drive rod 230 towards the left (FIG. 3) the value is effaced from the setting mechanism and inserted into the computing racks, as described above.

At the same time, as soon as this movement of the drive rod 230 begins, said drive rod 230 depresses the arm 339 (FIG. 97) and thereby also the stop lever 323 through the intermediary of the lug 341 and the projection 342. Accordingly, the stop lever 323 is rotated in the counterclockwise direction (FIG. 97) against the action of the spring 325, and this rotation causes the stop lever 323 to move from the position shown in FIG. 92 to that shown in FIG. 94, thereby releasing the gears 314 and enabling the spring 321 to rotate them to "zero" position, as shown in FIG. 94, with the wider teeth 317 in engagement with the cross-bar 318, if they were not already in this position. Thus, any value that may have been standing in the mechanism 760 is erased at the very beginning of the movement of the drive rod 230.

When the drive shaft 32 has rotated close to 180°, the projection 420′ is moved downwardly, as described above, and since the latch 327 is maintained in operative position by the member 345 due to the action of the spring 346, which is stronger than the counteracting spring 332, the bell crank 305 is caused to rotate in the clockwise direction (FIG. 97), thereby through the intermediary of the link 303 and arm 302 causing the shaft 301 to rotate in the same direction which brings the gears 314 and 322 into meshing engagement with the computing racks 13 and the drive rack 240, respectively. Accordingly, the return stroke of the drive rod 230 and drive rack 240 causes rotation of the gear 322 through nine tenths of its circumference (nine teeth) against the action of the spring 321, while the gears 314 are rotated by the racks 13 in accordance with the value standing in said racks.

Towards the end of said return stroke of the drive rod 230, the spring 325 becomes free to return the stop lever 323 to its original position in engagement with the pin 101, and shortly thereafter the projection 420′ is released by its actuating cam so that the spring 308 is free to restore the bell crank 305 and thereby rotate the shaft 301 to bring the gears 314, 322 out of engagement with the racks and into locking engagement with the edge 324, as shown in FIG. 92.

If now the storage key 109 is depressed, the slide 111 is caused to move towards the left in FIG. 97, thus causing rotation of the shaft 114 in the counterclockwise direction through the intermediary of the spring 115. The key 109 is automatically locked in depressed condition by the lever 349. Through the intermediary of the members 116—119 and 344 said rotation of the shaft 114 causes withdrawal of the member 345 from its engagement with the latch 327 which thereby is rotated in the counterclockwise direction through the spring 332 out of the path of movement of the projection 420′. Obviously, the drive rod 230 and the projections 410′ and 420′ may then be moved at will for other computing operations without any effect upon the accumulator mechanism 760 since the arm 339 through the aforementioned rotation of the shaft 114 has been moved to the left (FIG. 97) sufficiently to permit the lug 341 to drop down from the projection 342, and since both latches 326, 327 are out of the paths of movement of the projections 410′, 420′.

When the storage key 109 is thus locked in depressed position and a value is stored in the mechanism 760, said mechanism may nevertheless be used in other computations without permanent erasure of the stored value. One of said uses occurs when it is desired to repeat, or re-insert, the stored value into some other accumulator mechanism of the machine, e.g. the mechanism 740 or 750. In order to accomplish this the repeater key 102 is depressed together with the proper function key. The depression of the repeater key 102 causes in the obvious way the slide 104 to be moved to the left in FIG. 97 whereby the latch 326 is moved into the path of the projection 410′ through the intermediary of the members 105, 106, 107, and 108 and against the action of the spring 331.

The aforementioned rotation of the shaft 114 through depression of the storage key 109 placed the arm 121 in immediate vicinity of the inclined surface 102′ on the repeater key 102 and, therefore, the depression of said key 102 now forces the arm 121 and the shaft 114 back to the position shown in FIG. 97 which means that the member 345 again pushes the latch back into the path of the projection 420′ through the intermediary of the obvious connections. It is obvious, therefore, that the accumulator mechanism 760 will be engaged with the computing racks 13 and the drive rack 240 in the manner described above both during the period when the projection 410′ is moved down by the cam 130 and the period when the projection 420′ is moved down by the cam 140, or, in other words, both during the movement of the drive rod 230 to the left and to the right in FIG. 97. Consequently, whatever value stands in the accumulator 760 at the beginning of this operation will be transferred by the computing racks 13 to whatever other accumulator mechanism is in operative connection therewith and then restored to the accumulator mechanism 760. This operation may be repeated at will without loss of the value from the accumulator mechanism 760.

By at the same time depressing the return transfer key 355 (FIG. 99) it is obvious that the value standing in the accumulator mechanism 760 may also be transferred to the setting mechanism and printed in the printing mechanism 770. Through the mechanism connecting the latch member 357 with the drive shaft 32, as shown in FIG. 62, the slide 351 will be locked in its lefthand position (FIG. 99) during the obvious period upon depression of the key 355. Accordingly, the previously described mechanisms operated by the slide 351 through the intermediary of the pusher arm 660 will be in operative position during said period. Also, said movement of the slide 351 will cause disengagement of the pawl 49 and engagement of the pawl 85 with the combined tooth and gear rack 12, as is obvious from FIGS. 19 and 20 together with the corresponding description. This means that the gears 5 will be offset from the computing racks 13 and then upon engagement of the pin 364 with the bell crank 363 restored to engagement with said racks in the next higher decade position in that the movement of said bell crank 363 causes the pin 362 to move the bell crank 358 out of engagement with the pawl 49 against the action of the spring 361.

When in a chain computation it is desired to insert a sum or an intermediate sum in the accumulator mechanism 760 without disturbing the stored value, the proper key 124 is depressed after the lever 122 has first been moved so as to place the arms 123 in register with the keys 124. These arms 123 are at that time similarly to the arm 121 in the immediate vicinity of the inclined surfaces 124a of the keys 124, and since the pin and slot connection 114', 347 prevents turning of the arms 123 without turning the shaft 114 the effect of the depression of one of said keys 124 is exactly the same as described above in connection with the repeater key 102.

Naturally, the repeater key 102 is effective for its particular described purpose even if the storage key 109 is not depressed, the only difference being that the arm 121 and the cooperating inclined surface 102' of the key 102 then have no function. It is also evident from FIG. 79 that the rocking of the shaft 114 when the storage key 109 is depressed may be accomplished by the cam member 172 on the control shaft 125 (compare FIG. 75) through proper setting of the knob member 158.

While a machine embodying the present invention has been shown and described, it will be understood that the embodiment is capable of modification and variation while still employing the principles of the invention. It is to be understood, therefore, that the scope of the invention should be limited only by the scope and proper interpretation of the claims appended hereto.

What I claim is:

1. In a ten key computing machine, a frame structure supporting a ten key keyboard, a slidable setting mechanism, at least one accumulator mechanism, a repeater mechanism, a printing mechanism, transmission means selectively connectible to said mechanisms for operation thereof, a transfer mechanism for transferring numerical values back from the repeater mechanism and the accumulator mechanism to the setting mechanism, a clutch means for coupling the transmission means with the setting mechanism, and means associated with said transfer mechanism for moving the setting mechanism in a two stage switching movement from a first operative position to an inoperative position and from said inoperative position to a second operative position corresponding to the next higher decade position, said means associated with said transfer mechanism including a switch lock adapted to control said stagewise switching movement of the setting mechanism, a repeater key controlling the repeater mechanism, a pawl operatively connected with said repeater key and switch lock and adapted upon actuation by said repeater key to stop the setting mechanism in said inoperative position, and a transfer key in said transfer mechanism adapted to engage said clutch means.

2. In a ten key computing machine, a frame structure supporting a ten key keyboard, a slidable setting mechanism, at least one accumulator mechanism, a repeater mechanism, a printing mechanism, transmission means selectively connectible to said mechanisms for operation thereof, a transfer mechanism for transferring numerical values back from the repeater mechanism and the counting mechanism to the setting mechanism, transmission means for transmitting numerical values from the setting mechanism to the repeater mechanism, control means operatively connected to the repeater mechanism and having an engagement position for automatic repetition of said numerical values and a disengagement position for at least partly preventing said automatic repetition, a storage key operatively connected with the repeater mechanism, spring means urging the repeater mechanism towards said disengagement position upon depression of said storage key, a repeater key, a total key, a subtotal key, and means operatively connecting each of said repeater key, total key, and subtotal key to the repeater mechanism to restore the repeater mechanism to said engagement position upon depression of at least one of said three last-mentioned keys.

3. The computing machine as set forth in claim 2, in which said control means include a manually operable control lever, an axially slidable two-armed transmission lever, means connecting said control lever and said transmission lever whereby shifting of said control lever causes said transmission lever to be shifted between positions in which it engages and disengages said total key and subtotal key, and means operatively connecting said transmission lever to the repeater mechanism.

4. In a ten key computing machine of the type including a frame structure supporting a ten key keyboard, a slidable setting mechanism, at least one accumulator mechanism, a repeater mechanism, a printing mechanism, and transmission means selectively connectible to said mechanisms for operation thereof, the improvement comprising a transfer mechanism for transferring numerical values back from the repeater mechanism and the accumulator mechanism to the setting mechanism, means associated with said transfer mechanism for moving the setting mechanism in a two stage switching movement from a first operative position to an inoperative position and from said inoperative position to a second operative position corresponding to the next higher decade position, a switch lock included in said means and adapted to control said stagewise switching movement of the setting mechanism, a repeater key controlling the repeater mechanism, a pawl operatively connected with said repeater key and switch lock and adapted upon actuation by said repeater key to stop the setting mechanism in said inoperative position, a clutch means for coupling the transmission means with the setting mechanism, a transfer key in said transfer mechanism adapted to engage said clutch means, transmission means for transmitting numerical values from the setting mechanism to the repeater mechanism, control means operatively connected with the repeater mechanism and having an engagement position for automatic repetition of said numerical values and a disengagement position for at least partly preventing said automatic repetition, a storage key operatively connected with the repeater mechanism, spring means urging the repeater mechanism towards said disengagement position upon depression of said storage key, a repeater key, a total key, a subtotal key, means operatively connecting each of said repeater key, total key, and subtotal key to the repeater mechanism to restore the repeater mechanism to said engagement position upon depression of at least one of said three last-mentioned keys, a manually operable control lever in said control means, an axially slidable two-armed transmission lever, means connecting said control lever and said transmission lever whereby shifting of said control lever causes said transmission lever to be shifted between positions in which it engages and disengages said total key and subtotal key, and means operatively connecting said transmission lever to the repeater mechanism.

References Cited in the file of this patent

UNITED STATES PATENTS

| | | |
|---|---|---|
| 2,681,765 | Hopkins | June 22, 1954 |
| 2,834,542 | Sundstrand | May 13, 1958 |
| 2,922,574 | Matthew | Jan. 26, 1960 |